(12) United States Patent
Chen et al.

(10) Patent No.: US 11,151,463 B2
(45) Date of Patent: Oct. 19, 2021

(54) DISTRIBUTABLE EVENT PREDICTION AND MACHINE LEARNING RECOGNITION SYSTEM

(71) Applicant: SAS Institute Inc., Cary, NC (US)

(72) Inventors: Xu Chen, Apex, NC (US); Jorge Manuel Gomes da Silva, Durham, NC (US); Brett Alan Wujek, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 17/178,798

(22) Filed: Feb. 18, 2021

(65) Prior Publication Data

US 2021/0287116 A1 Sep. 16, 2021

Related U.S. Application Data

(63) Continuation-in-part of application No. 17/093,917, filed on Nov. 10, 2020, now Pat. No. 11,010,691, and
(Continued)

(51) Int. Cl.
*G06N 5/04* (2006.01)
*G06N 20/00* (2019.01)

(52) U.S. Cl.
CPC .............. *G06N 5/04* (2013.01); *G06N 20/00* (2019.01)

(58) Field of Classification Search
CPC .................................. G06N 5/04; G06N 20/00
(Continued)

(56) References Cited

U.S. PATENT DOCUMENTS 10,354,204 B2 * 7/2019 Chen .................... G06K 9/6223
10,360,517 B2 * 7/2019 Koch .................... G06N 3/126
(Continued)

OTHER PUBLICATIONS

E. Adeli, et al., Semi-Supervised Discriminative Classification Robust to Sample-Outliers and Feature-Noises, IEEE Transactions on Pattern Analysis and Machine Intelligence Feb. 2019; 41(2) 515-522.
(Continued)

*Primary Examiner* — Kamran Afshar
*Assistant Examiner* — Ryan C Vaughn
(74) *Attorney, Agent, or Firm* — Bell & Manning, LLC

(57) ABSTRACT

Data is classified using semi-supervised data. Sparse coefficients are computed using a decomposition of a Laplacian matrix. (B) Updated parameter values are computed for a dimensionality reduction method using the sparse coefficients, the Laplacian matrix, and a plurality of observation vectors. The updated parameter values include a robust estimator of a decomposition matrix determined from the decomposition of the Laplacian matrix. (B) is repeated until a convergence parameter value indicates the updated parameter values for the dimensionality reduction method have converged. A classification matrix is defined using the sparse coefficients and the robust estimator of the decomposition of the Laplacian matrix. The target variable value is determined for each observation vector based on the classification matrix. The target variable value is output for each observation vector of the plurality of unclassified observation vectors and is defined to represent a label for a respective unclassified observation vector.

28 Claims, 33 Drawing Sheets
(8 of 33 Drawing Sheet(s) Filed in Color)

Related U.S. Application Data a continuation-in-part of application No. 16/904,818, filed on Jun. 18, 2020, now Pat. No. 10,956,825.

(60) Provisional application No. 63/086,401, filed on Oct. 1, 2020, provisional application No. 63/049,473, filed on Jul. 8, 2020, provisional application No. 62/991,973, filed on Mar. 19, 2020, provisional application No. 62/990,399, filed on Mar. 16, 2020.

(58) Field of Classification Search
USPC .......................................................... 706/12
See application file for complete search history.

(56) References Cited

U.S. PATENT DOCUMENTS

| | | | | |
|---|---|---|---|---|
| 10,402,741 | B2 * | 9/2019 | Hunt | G06F 17/16 |
| 10,430,690 | B1 * | 10/2019 | Chen | G06K 9/6289 |
| 10,474,959 | B2 * | 11/2019 | Hunt | G16H 10/00 |
| 10,521,734 | B2 * | 12/2019 | Chen | G06N 7/005 |
| 10,565,528 | B2 * | 2/2020 | Lokare | G06F 17/16 |
| 10,635,947 | B2 * | 4/2020 | Chen | G06K 9/6272 |
| 10,699,207 | B2 * | 6/2020 | Hunt | G16H 10/00 |
| 10,832,174 | B1 * | 11/2020 | Chen | G06F 16/285 |
| 10,867,253 | B1 * | 12/2020 | Wang | G06N 20/00 |
| 10,929,762 | B1 * | 2/2021 | Chen | G06N 5/04 |
| 10,956,825 | B1 * | 3/2021 | Chen | G06N 20/00 |
| 2020/0151603 | A1 | 5/2020 | Chen | |

OTHER PUBLICATIONS

X. Zhu et al., Robust Graph Dimensionality Reduction, International Joint Conference on Artificial Intelligence (2018).
Dewancker et al., A Stratified Analysis of Bayesian Optimization Methods, arXiv:1603.09441v1 [cs.LG], Mar. 31, 2016.
Wujek et al., Best Practices for Machine Learning Applications, Available Jun. 26, 2017, pp. 1-21.
Gomes et al., Combining Meta-Learning and Search Techniques to Select Parameters for Support Vector Machines, Neurocomputing, Mar. 18, 2011.
Sacks et al., Design and Analysis of Computer Experiments, Statistical Science, vol. 4, No. 4, Nov. 1989, pp. 409-423.
Lorena et al., Evolutionary Tuning of SVM Parameter Values in Multiclass Problems, Neurocomputing 71, Jul. 16, 2008, pp. 3326-3334.
M. McKay, Latin Hypercube Sampling as a Tool in Uncertainty Analysis of Computer Models, In Proceedings of the 1992 Winter Simulation Conference, edited by J. J. Swain et al., 1992, pp. 557-564.
Sutskever et al., On the importance of initialization and momentum in deep learning, Proceedings of the 30th International Conference on Machine Learning, Atlanta, Georgia, 2013.
Bottou et al., Optimization Methods for Large-Scale Machine Learning, arxiv:1606.04838v2 [stat.ML], Jun. 15, 2016.
Renukadevi et al., Performance Analysis of Optimization Techniques for Medical Image Retrieval, Journal of Theoretical and Applied Information Technology, vol. 59, No. 2, Jan. 20, 2014, pp. 390-399.
Bergstra et al., Random Search for Hyper-parameter Optimization, Journal of Machine Learning Research 13, Feb. 2012, pp. 281-305.
D. Wolpert, The Lack of a Priori Distinctions Between Learning Algorithms, Neural Computation 8,, 1996, pp. 1341-1390.
LeCun et al., The MNIST Database of Handwritten Digits, http://yann.lecun.com/exdb/mnist/, Accessed Apr. 8, 2016.
Konen et al., Tuned Data Mining: A Benchmark Study on Different Tuners, In Proceedings of the 13th Annual Conference on Genetic and Evolutionary Computation, Jul. 12, 2011, pp. 1995-2002.
Auto-Weka, Available Jun. 5, 2017.
Weka (machine learning), Available Mar. 22, 2017.
Hyperopt, Available Jun. 9, 2017.
LIBSVM—Wikipedia, https://en.wikipedia.org/wiki/LIBSVM, Available Apr. 10, 2017.
GitHub—mlr-org/mlr: mlr: Machine Learning in R, https://github.com/mlr-org/mlr?_sm_au_=iVV31J5w7f4vfk5N, Available Jun. 9, 2017.
R (programming language)—Wikipedia, https://en.wikipedia.org/wiki/R_(programming_language), Available Jun. 8, 2017.
MOE, Available Jun. 9, 2017.
3.2. Tuning the hyper-parameters of an estimator, Available Jun. 9, 2017.
About SigOpt, Available Jun. 9, 2017.
Spearmint, Available Jun. 9, 2017.
SUMO—SUrrogate MOdeling Lab, Available Jun. 5, 2017.
Surrogate model, https://en.wikipedia.org/w/index.php?title=Surrogate_model&oldid=772207388, Available Mar. 25, 2017.
TPOT, Available Jun. 5, 2017.
Gray et al., Hybrid Optimization Schemes for Simulation-Based Problems, Procedia Computer Science 1, 2012, pp. 1349-1357.
Gray, G. A., and Fowler, K. R. (2011). "The Effectiveness of Derivative-Free Hybrid Methods for Black-Box Optimization." International Journal of Mathematical Modeling and Numerical Optimization 2:112-133.
Gray, G. A., and Kolda, T. G. (2006). "Algorithm 856: APPSPACK 4.0—Asynchronous Parallel Pattern Search for Derivative-Free Optimization." ACM Transactions on Mathematical Software 32:485-507.
Griffin, J. D., Fowler, K. R., Gray, G. A., and Hemker, T. (2011). "Derivative-Free Optimization via Evolutionary Algorithms Guiding Local Search (EAGLS) for MINLP." Pacific Journal of Optimization 7:425-443.
Griffin, J. D., and Kolda, T. G. (2010a). "Asynchronous Parallel Hybrid Optimization Combining Direct and Gss." Optimization Methods and Software 25:797-817.
Griffin, J. D., and Kolda, T. G. (2010b). "Nonlinearly Constrained Optimization Using Heuristic Penalty Methods and Asynchronous Parallel Generating Set Search." Applied Mathematics Research Express 2010:36-62.
Griffin, J. D., Kolda, T. G., and Lewis, R. M. (2008). "Asynchronous Parallel Generating Set Search for Linearly Constrained Optimization." SIAM Journal on Scientific Computing 30:1892-1924.
Kolda, T. G., Lewis, R. M., and Torczon, V. (2003). "Optimization by Direct Search: New Perspectives on Some Classical and Modern Methods." SIAM Review 45:385-482.
Taddy, M. A., Lee, H. K. H., Gray, G. A., and Griffin, J. D. (2009). "Bayesian Guided Pattern Search for Robust Local Optimization." Technometrics 51:389-401.
Sindhwani, Vikas, "On Semi-Supervised Kernel Methods," Dec. 2007, Dissertation University of Chicago, pp. i-190.
Wu et al., "A Quest for Structure: Jointly Learning the Graph Structure and Semi-Supervised Classification," *CIKM '18* Oct. 22-26, 2018, arXiv:1909.12385v1 [cs.LG] Sep. 26, 2019.
Berikov et Litvinenko, "Semi-Supervised Regression using Cluster Ensemble and Low-Rank Co-Association Decomposition Under Uncertainties" Jan. 13, 2019.
M. Nikolova and M. Ng, Analysis of half-quadratic minimization methods for signal and image recovery, SIAM Journal on Scientific computing (2005).
Sebastian Raschka, "Model evaluation, model selection, and algorithm selection in machine learning, Part III—Cross-validation and hyperparameter tuning," https://sebastianraschka.com/blog/2016/model-evaluation-selection-part3.html, Oct. 2, 2016.
C. Cong and H. Zhang, Learning with Inadequate and Incorrect Supervision, International Conference on Data Mining (ICDM) (2017).
R. He, et al., Maximum correntropy criterion for robust face recognition, IEEE Transactions on Pattern Analysis and Machine Intelligence vol. 33, No. 8, Aug. 2011.
Y. Yan, et al., Robust Semi-Supervised Learning through Label Aggregation, Association for the Advancement of Artificial Intelligence (AAAI) Conference on Artificial Intelligence (ACAI) (2016).
Y. F. Li et al., Semi-supervised learning using label mean, International Conference on Machine Learning (ICML) (2009).

(56) References Cited

OTHER PUBLICATIONS

W. Liu, et al., Large graph construction for scalable semisupervised learning, ICML (2010).
Y. Wang, et al., Trend filtering on graphs, JMLR (2016) 1-41.
W. Ha and R. Barber, Robust PCA with compressed data, Neural Information Processing Systems (2015).
Zhang, et al., Robust Adaptive Embedded Label Propagation With Weight Learning for Inductive Classification, IEEE Transactions on Neural Networks and Learning Systems (2018).
Lu et al., "Noise-Robust Semi-Supervised Learning by Large-Scale Sparse Coding," ResearchGate, Conference Paper, Jan. 2015.

\* cited by examiner

| Dataset | Dataset 4 | Dataset 4 | Dataset 5 | Dataset 5 | Dataset 6 | Dataset 6 | Dataset 6 | Dataset 6 |
|---|---|---|---|---|---|---|---|---|
| Label Noise, Outliers | 15%, 10% | 30%, 10% | 15%, 10% | 30%, 10% | 15%, 10% | 30%, 10% | 15%, 20% | 30%, 20% |
| PVM | 73.1(1.4) | 64.3(2.1) | 14.2(0.6) | 11.6(0.4) | 62.1(0.8) | 60.9(0.7) | 58.3(0.5) | 56.7(0.6) |
| LGC | 83.5(1.6) | 74.4(2.8) | 15.6(0.4) | 12.6(0.3) | 75.3(0.2) | 70.5(0.4) | 71.3(0.5) | 69.2(0.4) |
| GTF | 88.7(1.6) | 61.9(4.0) | 16.8(0.4) | 12.9(0.6) | 80.1(0.7) | 75.9(0.7) | 77.2(0.6) | 74.8(0.5) |
| AELP-WL | 90.7(0.9) | 87.2(0.6) | 16.1(0.5) | 14.3(0.5) | 85.3(0.7) | 78.3(0.8) | 81.6(0.3) | 76.9(0.4) |
| SIIS | 91.2(0.7) | 90.3(3.2) | 16.7(0.5) | 14.8(0.5) | 82.7(0.8) | 79.8(0.5) | 79.2(0.6) | 75.6(0.5) |
| LSSC | 90.9(1.5) | 89.0(3.6) | 16.8(0.6) | 14.6(0.4) | 77.5(0.6) | 73.8(0.7) | 71.2(0.4) | 68.7(0.5) |
| RPCA-LSSC | 91.2(0.4) | 90.7(0.6) | 17.1(0.4) | 14.7(0.3) | 79.4(0.6) | 76.7(0.6) | 77.5(0.6) | 75.2(0.3) |
| RGDR-LSSC | 91.6(0.7) | 90.3(0.5) | 17.3(0.5) | 14.8(0.6) | 81.5(0.5) | 79.3(0.6) | 77.3(0.6) | 75.4(0.5) |
| System 300 | 94.9 (0.6) | 94.6(0.7) | 18.4(0.6) | 18.1(0.4) | 87.5(0.2) | 85.7(0.5) | 85.3(0.4) | 83.1(0.2) |

1400

DISTRIBUTABLE EVENT PREDICTION AND MACHINE LEARNING RECOGNITION SYSTEM

CROSS-REFERENCE TO RELATED APPLICATIONS

The present application claims the benefit of and priority based on 35 U.S.C. § 119(e) to U.S. Provisional Patent Application No. 63/086,401 filed Oct. 1, 2020, the entire contents of which are hereby incorporated by reference. The present application claims the benefit of and priority based on 35 U.S.C. § 119(e) to U.S. Provisional Patent Application No. 63/049,473 filed Jul. 8, 2020, the entire contents of which are hereby incorporated by reference. The present application also claims the benefit of and priority based on 35 U.S.C. § 119(e) to U.S. Provisional Patent Application No. 62/991,973 filed Mar. 19, 2020, the entire contents of which are hereby incorporated by reference. The present application also claims the benefit of and priority based on 35 U.S.C. § 119(e) to U.S. Provisional Patent Application No. 62/990,399 filed Mar. 16, 2020, the entire contents of which are hereby incorporated by reference.

The present application is also a continuation-in-part of U.S. patent application Ser. No. 17/093,917 that was filed Nov. 10, 2020, the entire contents of which are hereby incorporated by reference. U.S. patent application Ser. No. 17/093,917 claims the benefit of and priority based on 35 U.S.C. § 119(e) to U.S. Provisional Patent Application No. 63/049,473 filed Jul. 8, 2020, to U.S. Provisional Patent Application No. 62/991,973 filed Mar. 19, 2020, and to U.S. Provisional Patent Application No. 62/990,399 filed Mar. 16, 2020.

The present application is also a continuation-in-part of U.S. patent application Ser. No. 16/904,818 that was filed Jun. 18, 2020, the entire contents of which are hereby incorporated by reference. U.S. patent application Ser. No. 16/904,818 claims the benefit of and priority based on 35 U.S.C. § 119(e) to U.S. Provisional Patent Application No. 62/991,973 filed Mar. 19, 2020 and to U.S. Provisional Patent Application No. 62/990,399 filed Mar. 16, 2020.

BACKGROUND

Facilitating effective decision making requires the transformation of relevant data to high-quality classification models. Machine learning defines models that can be used to predict occurrence of an event, for example, from sensor data or signal data, or recognize/classify an object, for example, in an image, in text, in a web page, in voice data, in sensor data, etc. Machine learning algorithms can be classified into three categories: unsupervised learning, supervised learning, and semi-supervised learning. Unsupervised learning does not require that a target (dependent) variable y be classified in training data to indicate occurrence or non-occurrence of the event or to recognize/classify the object. An unsupervised learning system predicts the class, target variable y, in training data by defining a model that describes hidden structure in the training data. Supervised learning requires that the target (dependent) variable y be labeled in training data so that a model can be built to predict the label of new unlabeled data. A supervised learning system discards an observation in the training data that is not labeled. While supervised learning algorithms are typically better predictors/classifiers, labeling training data often requires a physical experiment or a statistical trial, and human labor is usually required. As a result, it may be very complex and expensive to fully label an entire training dataset. A semi-supervised learning system only requires that the target (dependent) variable y be labeled in a small portion of the training data and uses the unlabeled training data in the training dataset to define the classification (data labeling) model.

Semi-supervised learning systems have many application areas such as image analysis tasks and microarray gene expression classification where measurements require expensive machinery and labels take significant time-consuming analysis and human effort. Due to the subjective nature of manual classification, human fatigue, and the difficulty of the classification task, class labels obtained from various sources such as crowdsourcing, synthetic labeling, and data programming inevitably contain noise. However, traditional learning techniques are not particularly designed for noise reduction. As a result, the semi-supervised classification performance is reduced dramatically when the class labels are inaccurate. Additionally, due to the existence of sample outliers, traditional learning techniques that use the raw data result in inaccurate similarity measure and can lead to severe performance degradation.

Determining hyperparameters associated with the classification model to determine the best model configuration is a complex optimization problem. Though the classification model solutions are influenced by the hyperparameters, there are typically no clear default values for the hyperparameters that generate a satisfactory classification model for a wide range of applications. Not only do the input values used for the hyperparameters dictate the performance of the training process, but more importantly they influence the quality of the resulting classification models. Even with expertise in setting the hyperparameters, the best values of these hyperparameters change with different data. As a result, it is difficult to define the hyperparameter values based on previous experience. However, there is an inherent expense in training numerous candidate models to evaluate various values and combinations of values for the hyperparameters in terms of computing resources, computing time, and user time.

SUMMARY

In an example embodiment, a non-transitory computer-readable medium is provided having stored thereon computer-readable instructions that when executed by a computing device, cause the computing device to predict occurrence of an event or to classify an object using semi-supervised data to label unlabeled data in a dataset. (A) A plurality of sparse coefficients is computed using a decomposition of a Laplacian matrix. The Laplacian matrix is computed using a kernel function with a plurality of observation vectors. The plurality of observation vectors includes a plurality of unclassified observation vectors and a plurality of classified observation vectors. A target variable value is defined to represent a label for each respective observation vector of the plurality of classified observation vectors. The target variable value is not defined to represent the label for each respective observation vector of the plurality of unclassified observation vectors. (B) Updated parameter values are computed for a dimensionality reduction method using the computed plurality of sparse coefficients, the Laplacian matrix, and the plurality of observation vectors. The updated parameter values include a robust estimator of a decomposition matrix determined from the decomposition of the Laplacian matrix. (C) (B) is repeated until a convergence parameter value indicates the updated parameter values for the dimensionality reduction method have converged. (D) A classification matrix is defined using the plurality of sparse coefficients and the robust estimator of the decomposition of the Laplacian matrix. (E) The target variable value is determined for each observation vector of the plurality of unclassified observation vectors based on the defined classification matrix. (F) The target variable value is output for each observation vector of the plurality of unclassified observation vectors. The target variable value selected for each observation vector of the plurality of unclassified observation vectors is defined to represent the label for a respective unclassified observation vector.

In another example embodiment, a computing device is provided. The computing device includes, but is not limited to, a processor and a non-transitory computer-readable medium operably coupled to the processor. The computer-readable medium has instructions stored thereon that, when executed by the processor, cause the computing device to predict occurrence of an event or to classify an object using semi-supervised data to label unlabeled data in a dataset.

In yet another example embodiment, a method of predicting occurrence of an event or of classifying an object using semi-supervised data to label unlabeled data in a dataset is provided.

Other principal features of the disclosed subject matter will become apparent to those skilled in the art upon review of the following drawings, the detailed description, and the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Illustrative embodiments of the disclosed subject matter will hereafter be described referring to the accompanying drawings, wherein like numerals denote like elements.

DETAILED DESCRIPTION

Figure 1:
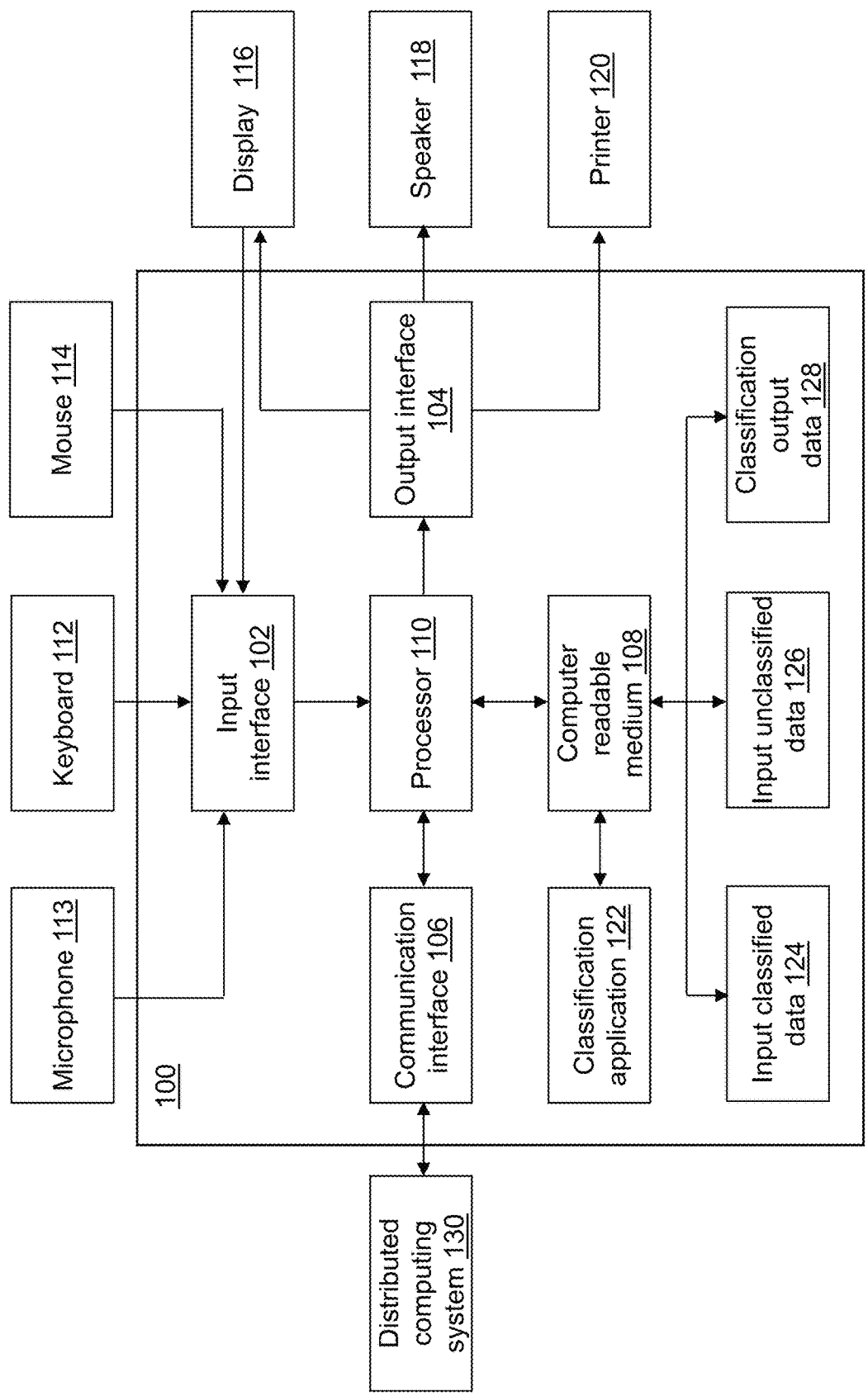
FIG. 1 depicts a block diagram of a classification device in accordance with an illustrative embodiment.

A classification application 122 more accurately classifies unclassified observation vectors using a relatively small number of classified observation vectors that may be noisy and include outliers in comparison with previous methods such as the method described in Z. Lu et al., *Noise-Robust Semi-Supervised Learning by Large-Scale Sparse Coding*, AAAI Conference on Artificial Intelligence (2015)(LSSC). Noisy labels indicate that some of the human classified observation vectors have been classified incorrectly. Outliers are generally distant from other data in the dataset used to train a classification model. Existing classification methods are not designed to work effectively when some of the classified observation vectors have been classified incorrectly and/or the data includes outliers. These methods assume that the classifications provided as input are correct as a basis for training the method to classify unclassified observation vectors. The incorrect classifications have various causes including poorly trained, careless, tired, or irresponsible human classifiers. In some cases, even well-trained expert human classifiers can make mistakes when classifying data. For example, a trained radiologist may miss a cancer indicator that is present in an image thus incorrectly classifying the image as non-cancerous. As another example, it is often challenging to distinguish images such as classifying an image as including a wolf or a dog such as a German shepherd.

Classification application 122 and/or a classification model tuning application 422 (shown referring to FIG. 4) simultaneously apply joint dimensionality reduction and sparse regularization on the graph Laplacian matrix so that the dimensionality reduction and sparse regularization benefit from each other. Classification application 122 and/or a classification model tuning application 422 (shown referring to FIG. 4) are capable of not only correcting corrupted labeled data, but also of achieving a higher classification accuracy on unclassified data as shown in FIGS. 11D to 11G despite the additional presence of outliers. The major contributions and desirable properties of classification application 122 and/or a classification model tuning application 422 include increased efficiency, the capability to automate hyperparameter selection, improved accuracy, and scalability based on application in a distributed computing system. Leveraging the elastic net graph to combine $L_1$-norm and $L_2$-norm penalties for graph Laplacian regularization and applying dimensionality reduction while jointly optimizing, classification application 122 and/or a classification model tuning application 422 provide an improved robustness of the classification performance. To reduce the influence from noisy data and sample outliers, a semi-supervised robust dimensionality reduction is applied to the graph Laplacian matrix relying on robust estimators to assign small or even zero weights to outliers. The denoised graph similarity information is encoded into a mixed norm sparse regularization.

By minimizing a total graph loss for semi-supervised learning, classification application 122 and/or a classification model tuning application 422 can further overcome the difficulty of hyperparameter selections in the process of obtaining optimal solutions. Classification application 122 and/or a classification model tuning application 422 can further exploit distributed computing resources for scalability to big data. There are applications for classification application 122 in many areas such as process control and equipment health monitoring, image processing and classification, data segmentation, data analysis, etc.

Referring to FIG. 1, a block diagram of a classification device 100 is shown in accordance with an illustrative embodiment. Classification device 100 may include an input interface 102, an output interface 104, a communication interface 106, a non-transitory computer-readable medium 108, a processor 110, classification application 122, input classified data 124, input unclassified data 126, and classification output data 128. Fewer, different, and/or additional components may be incorporated into classification device 100.

Input interface 102 provides an interface for receiving information from the user or another device for entry into classification device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into classification device 100 or to make selections presented in a user interface displayed on display 116. The same interface may support both input interface 102 and output interface 104. For example, display 116 comprising a touch screen provides a mechanism for user input and for presentation of output to the user. Classification device 100 may have one or more input interfaces that use the same or a different input interface technology. The input interface technology further may be accessible by classification device 100 through communication interface 106.

Output interface 104 provides an interface for outputting information for review by a user of classification device 100 and/or for use by another application or device. For example, output interface 104 may interface with various output technologies including, but not limited to, display 116, a speaker 118, a printer 120, etc. Classification device 100 may have one or more output interfaces that use the same or a different output interface technology. The output interface technology further may be accessible by classification device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Classification device 100 may have one or more communication interfaces that use the same or a different communication interface technology. For example, classification device 100 may support communication using an Ethernet port, a Bluetooth® antenna, a telephone jack, a USB port, etc. Data and/or messages may be transferred between classification device 100 and another computing device of a distributed computing system 130 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Classification device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Classification device 100 also may have one or more drives that support the loading of a memory media such as a CD, DVD, an external hard drive, etc. One or more external hard drives further may be connected to classification device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming languages, scripting languages, assembly languages, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Classification device 100 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Classification application 122 performs operations associated with classifying each observation vector included in input unclassified data 126. Some or all of the operations described herein may be embodied in classification application 122. The operations may be implemented using hardware, firmware, software, or any combination of these methods.

Referring to the example embodiment of FIG. 1, classification application 122 is implemented in software (comprised of computer-readable and/or computer-executable instructions) stored in computer-readable medium 108 and accessible by processor 110 for execution of the instructions that embody the operations of classification application 122. Classification application 122 may be written using one or more programming languages, assembly languages, scripting languages, etc. Classification application 122 may be integrated with other analytic tools. As an example, classification application 122 may be part of an integrated data analytics software application and/or software architecture such as that offered by SAS Institute Inc. of Cary, N.C., USA. Merely for illustration, classification application 122 may be implemented using or integrated with one or more SAS software tools such as JMP®, Base SAS, SAS® Enterprise Miner™, SAS® Event Stream Processing, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services (CAS), SAS/OR®, SAS/ETS®, SAS® Visual Analytics, SAS® Viya™, SAS In-Memory Statistics for Hadoop®, etc. all of which are developed and provided by SAS Institute Inc. of Cary, N.C., USA. Data mining, statistical analytics, and response prediction are practically applied in a wide variety of industries to solve technical problems.

Classification application 122 may be implemented as a Web application. For example, classification application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java® applet, an extensible markup language (XML) file, or any other type of file supported by HTTP.

Input classified data 124 and input unclassified data 126 may include, for example, a plurality of rows and a plurality of columns. The plurality of rows may be referred to as observation vectors or records (observations), and the columns may be referred to as variables. In an alternative embodiment, input classified data 124 and input unclassified data 126 may be transposed. The plurality of variables define a vector $x_i$ for each observation vector i=1, 2, . . . , N, where N is a number of the observation vectors included in input classified data 124 and input unclassified data 126. Input classified data 124 includes a target variable value $y_i$ for each observation vector that indicates a label or class or other characteristic defined for the respective observation vector $x_i$ for i=1, 2, . . . , l, where l is a number of the observation vectors included in input classified data 124. Input classified data 124 includes observation vectors that have been labeled or classified, for example, by a human or other machine learning labeling process. For example, the label or classification may indicate a class for the observation vector or otherwise indicate an identification of a characteristic of the observation vector. For example, a $y_i$ value may indicate the label determined for the observation vector $x_i$ such as what the observation vector $x_i$ in the form of text means, what the observation vector $x_i$ in the form of image data does or does not represent (i.e., text, a medical condition, an equipment failure, an intrusion, a terrain feature, etc.), what the observation vector $x_i$ in the form of sensor signal data does or does not represent (i.e., voice, speech, an equipment failure, an intrusion, a terrain feature, etc.), etc.

Input unclassified data 126 includes observation vectors $x_i$ that have not been labeled such that the $y_i$ value has not been determined though a value such as zero may be included in a column associated with the $y_i$ values. Input classified data 124 and input unclassified data 126 may be stored in a single database, file, etc. where the $y_i$ value may indicate whether the associated observation vector has been labeled or classified. For example, a $y_i$ value of zero may indicate an unclassified observation vector though in other embodiments, the $y_i$ value of zero may indicate a label, and therefore, a classified observation vector.

Input classified data 124 and input unclassified data 126 may include additional variables that are not included in the plurality of variables. One or more variables of the plurality of variables may describe a characteristic of a physical object. For example, if input classified data 124 and input unclassified data 126 include data related to operation of a vehicle, the variables may include a type of vehicle, an oil pressure, a speed, a gear indicator, a gas tank level, a tire pressure for each tire, an engine temperature, a radiator level, etc.

A sensor may measure a physical quantity in an environment to which the sensor is associated and generate a corresponding measurement datum that may be associated with a time that the measurement datum is generated. Illustrative sensors include a microphone, an infrared sensor, a radar, a pressure sensor, a temperature sensor, a position or location sensor, a voltage sensor, a current sensor, a frequency sensor, a humidity sensor, a dewpoint sensor, a camera, a computed tomography machine, a magnetic resonance imaging machine, an x-ray machine, an ultrasound machine, etc. that may be mounted to various components used as part of a system. For example, input classified data 124 and input unclassified data 126 may include image data captured by medical imaging equipment (i.e., computed tomography image, magnetic resonance image, x-ray image, ultrasound image, etc.) of a body part of a living thing. A subset of the image data is labeled and captured in input classified data 124, for example, as either indicating existence of a medical condition or non-existence of the medical condition. Input classified data 124 and input unclassified data 126 may include a reference to image data that may be stored, for example, in an image file or in a video file, and the existence/non-existence label associated with each image file or video file. Input classified data 124 and input unclassified data 126 may include a plurality of such references. The existence/non-existence label or other label may be defined by a clinician or expert in the field to which data stored in input classified data 124 relate.

In data science, engineering, and statistical applications, data often consist of multiple measurements (across sensors, characteristics, responses, etc.) collected across multiple time instances (patients, test subjects, etc.). These measurements may be collected in input classified data 124 and input unclassified data 126 for analysis and processing or streamed to classification device 100 as it is generated. Input classified data 124 and input unclassified data 126 may include data captured as a function of time for one or more physical objects. The data stored in input classified data 124 and input unclassified data 126 may be captured at different time points periodically, intermittently, when an event occurs, etc. Input classified data 124 and input unclassified data 126 may include data captured at a high data rate such as 200 or more observation vectors per second for one or more physical objects. One or more columns of input classified data 124 and input unclassified data 126 may include a time and/or date value. Input classified data 124 and input unclassified data 126 may include data captured under normal and abnormal operating conditions of the physical object.

The data stored in input classified data 124 and input unclassified data 126 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. For example, data stored in input classified data 124 and input unclassified data 126 may be generated as part of the Internet of Things (IoT), where things (e.g., machines, devices, phones, sensors) can be connected to networks and the data from these things collected and processed within the things and/or external to the things before being stored in input classified data 124 and input unclassified data 126. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in input classified data 124 and input unclassified data 126.

The data stored in input classified data 124 and input unclassified data 126 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art.

Input classified data 124 and input unclassified data 126 may be stored on computer-readable medium 108 or on one or more computer-readable media of distributed computing system 130 and accessed by classification device 100 using communication interface 106, input interface 102, and/or output interface 104. Input classified data 124 and input unclassified data 126 may be stored in various compressed formats such as a coordinate format, a compressed sparse column format, a compressed sparse row format, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

Input classified data 124 and input unclassified data 126 may be stored using various data structures as known to those skilled in the art including one or more files of a file system, a relational database, one or more tables of a system of tables, a structured query language database, etc. on classification device 100 or on distributed computing system 130. Classification device 100 may coordinate access to input classified data 124 and input unclassified data 126 that is distributed across distributed computing system 130 that may include one or more computing devices. For example, input classified data 124 and input unclassified data 126 may be stored in a cube distributed across a grid of computers as understood by a person of skill in the art. As another example, input classified data 124 and input unclassified data 126 may be stored in a multi-node Hadoop® class. For instance, Apache™ Hadoop® is an open-source software framework for distributed computing supported by the Apache Software Foundation. As another example, input classified data 124 and input unclassified data 126 may be stored in a cloud of computers and accessed using cloud computing technologies, as understood by a person of skill in the art. The SAS® LASR™ Analytic Server may be used as an analytic platform to enable multiple users to concurrently access data stored in input classified data 124 and input unclassified data 126. The SAS Viya open, cloud-ready, in-memory architecture also may be used as an analytic platform to enable multiple users to concurrently access data stored in input classified data 124 and input unclassified data 126. SAS CAS may be used as an analytic server with associated cloud services in SAS Viya. Some systems may use SAS In-Memory Statistics for Hadoop® to read big data once and analyze the big data several times by persisting the big data in-memory for the entire session. Some systems may be of other types and configurations.

Figure 2A:
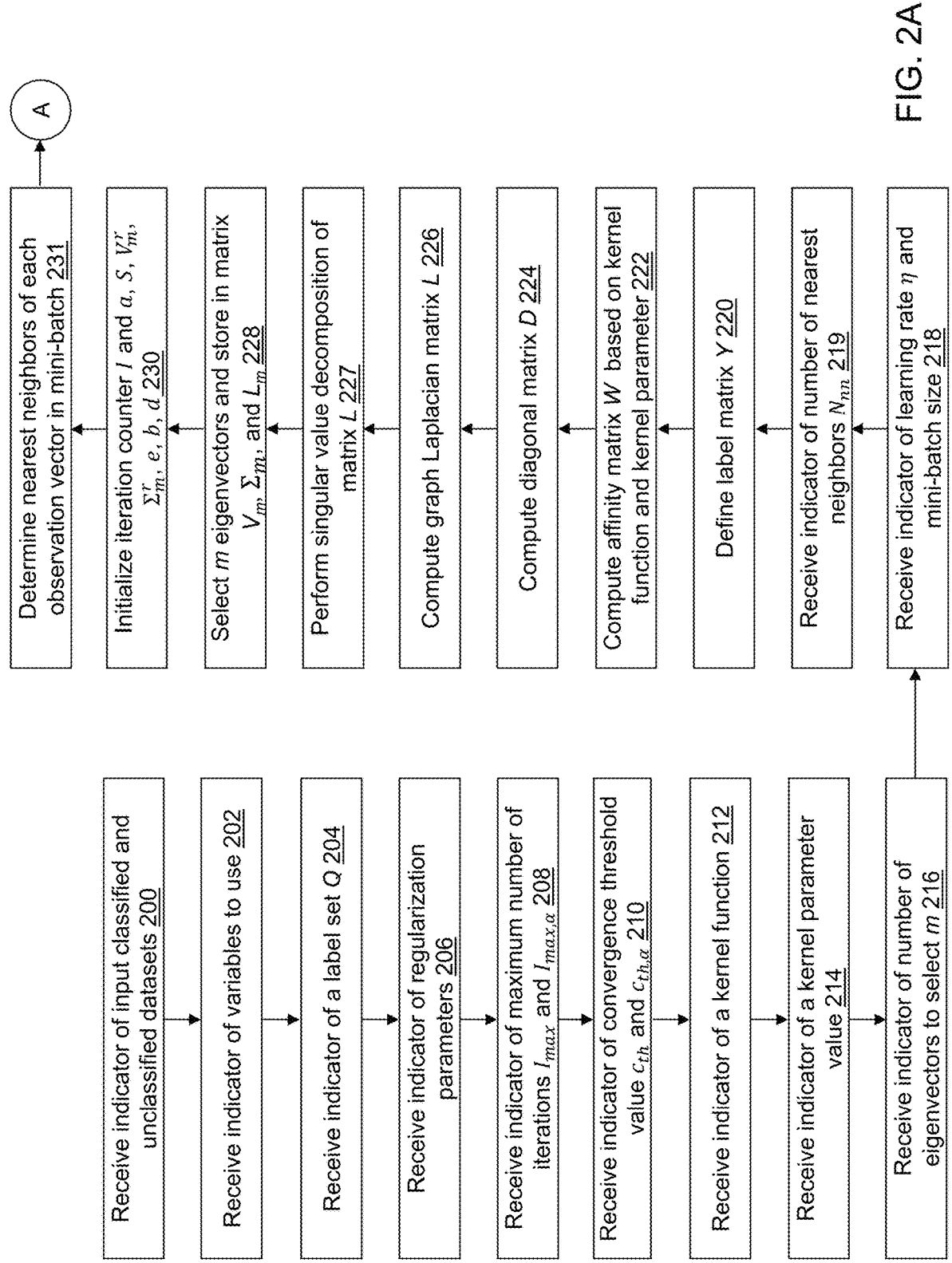
FIGS. 2A, 2B, and 2C depict a flow diagram illustrating examples of operations performed by a classification application of the classification device of FIG. 1 in accordance with an illustrative embodiment.
Figure 2B:
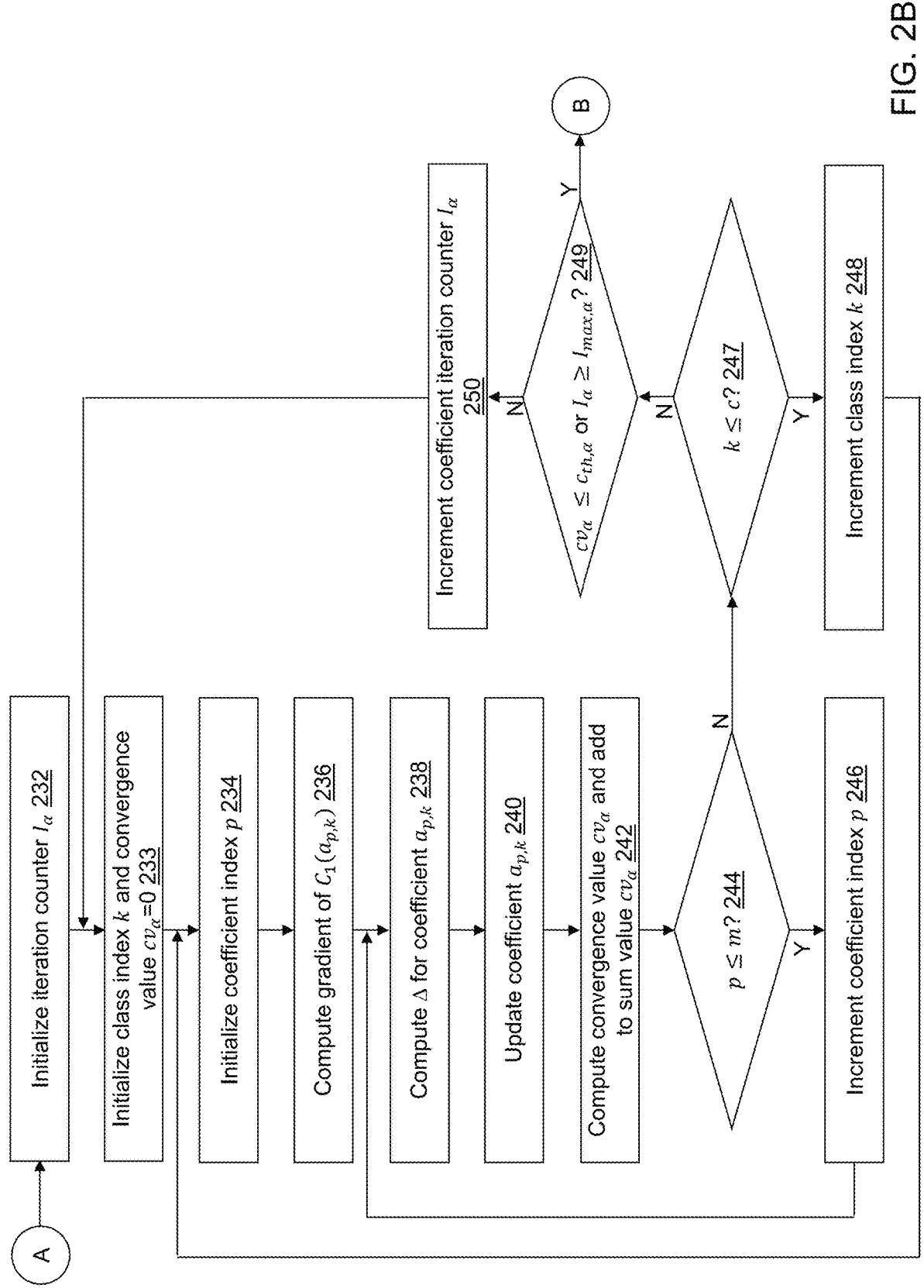
Figure 2C:
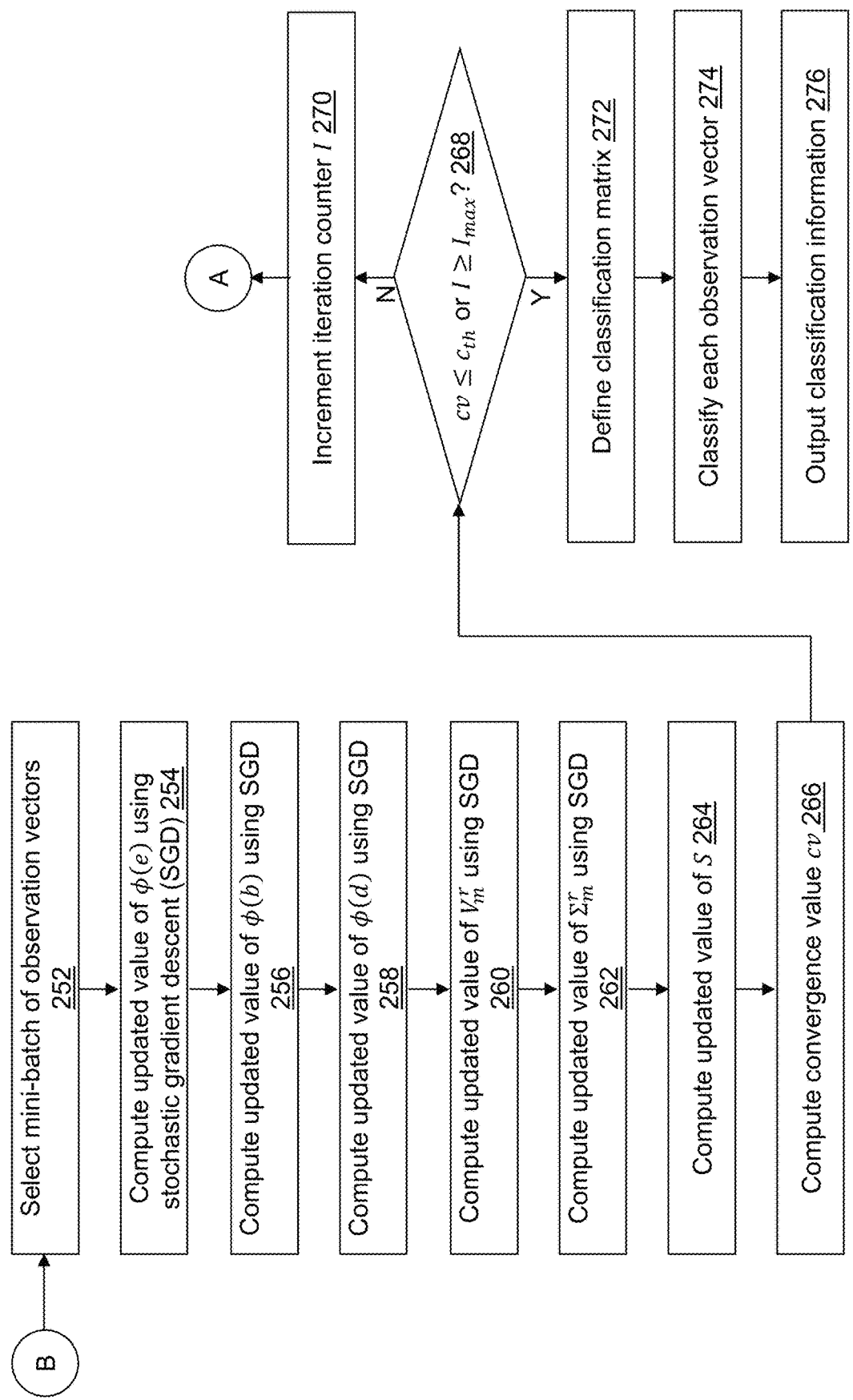

Referring to FIGS. 2A, 2B, and 2C, example operations associated with classification application 122 are described when input classified data 124 and input unclassified data 126 are stored on classification device 100 and accessed by a single thread of classification device 100. Additional, fewer, or different operations may be performed depending on the embodiment of classification application 122. The order of presentation of the operations of FIGS. 2A, 2B, and 2C is not intended to be limiting. Some of the operations may not be performed in some embodiments. Although some of the operational flows are presented in sequence, the various operations may be performed in various repetitions and/or in other orders than those that are illustrated. For example, a user may execute classification application 122, which causes presentation of a first user interface window, which may include a plurality of menus and selectors such as drop-down menus, buttons, text boxes, hyperlinks, etc. associated with classification application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by classification application 122.

Referring to FIG. 2A, in an operation 200, a first indicator may be received that indicates input classified data 124 and input unclassified data 126. For example, the first indicator indicates a location and a name of input classified data 124 and input unclassified data 126 that may be stored together or separately though they are described herein as separate for simplicity. As an example, the first indicator may be received by classification application 122 after selection from a user interface window or after entry by a user into a user interface window. In an alternative embodiment, input classified data 124 and input unclassified data 126 may not be selectable. For example, a most recently created dataset may be used automatically.

In an operation 202, a second indicator may be received that indicates the plurality of variables to use from input classified data 124 and input unclassified data 126 to define observation vectors. For example, the second indicator may indicate one or more column numbers or one or more column names. As another option, all of the columns of input classified data 124 and input unclassified data 126 except a first or a last column may be assumed to be the plurality of variables. The plurality of variables are the variables that define each observation vector $x_i$. A number of the plurality of variables may be indicated by N. The second indicator may further indicate a column number or a column name that stores the value for $y_i$ in input classified data 124 and/or input unclassified data 126. As another option, the first or the last column may be assumed to include the value for $y_i$.

In an operation 204, a third indicator may be received that indicates a label set Q associated with input classified data 124 and input unclassified data 126. For example, the label set Q includes a list of permissible values that the $y_i$-variable (target) value of each observation vector $x_i$ may have. For illustration, if input classified data 124 and input unclassified data 126 include text images of numeric digits, the label set Q includes c=10 permissible values that may be indicated as Q={1, . . . , c}, where Q=1 may be associated with the digit "0", Q=2 may be associated with the digit "1", Q=3 may be associated with the digit "2", . . . , Q=10 may be associated with the digit "9". c is a number of classes in label set Q. No $y_i$-variable (target) value or a variable value of zero may indicate that the associated observation vector $x_i$ is not classified when input classified data 124 and input unclassified data 126 are stored together in memory or in a single dataset. The label set Q further may be a binary indicator that indicates the existence or non-existence of a characteristic of each observation vector resulting in c=1. For example, a $y_i$-variable (target) value of −1 may indicate no fraud for a transaction, a $y_i$-variable (target) value of 1 may indicate that the transaction is fraudulent, and a $y_i$-variable (target) value of 0 may indicate that the transaction has not been classified.

When input classified data 124 and input unclassified data 126 are stored together in memory or in a single dataset, input classified data 124 may be extracted. Input classified data 124 and input unclassified data 126 together define a point set $\chi = \{x_1, \ldots, x_l, x_{l+1}, \ldots, x_N\}$, where N indicates a total number of data points or observation vectors $x_i$, where the observation vectors $x_i$ (i≤l) are labeled such that $y_i \in Q$, and the remaining observation vectors $x_i$ (l<i≤N) are unlabeled such that $y_i \notin Q$. Thus, l indicates a number of classified data points or observation vectors $x_i$ included in input classified data 124. For illustration, l may be a small percentage, such as less than 1% of the total number of observation vectors N.

In an operation 206, a fourth indicator of regularization parameter values may be received. For example, a first regularization parameter value $\lambda_1$, a second regularization parameter value $\lambda_2$, a third regularization parameter value $\lambda_3$, and a fourth regularization parameter value $\lambda_4$ may be received. In an alternative embodiment, the fourth indicator may not be received. For example, default values may be stored, for example, in computer-readable medium 108 and used automatically. In another alternative embodiment, the values of one or more of the first regularization parameter value $\lambda_1$, the second regularization parameter value $\lambda_2$, the third regularization parameter value $\lambda_3$, and the fourth regularization parameter value $\lambda_4$ may not be selectable. Instead, fixed, predefined values may be used. For illustration, a default value for each regularization parameter may be 0.7 though other values may be used. The first regularization parameter $\lambda_1$, the second regularization parameter value $\lambda_2$, the third regularization parameter value $\lambda_3$, and the fourth regularization parameter value $\lambda_4$ may be greater than zero.

In an operation 208, a fifth indicator of a maximum number of iterations $I_{max}$ and a maximum number of coefficient iterations $I_{max,\alpha}$ may be received. In an alternative embodiment, the fifth indicator may not be received. For example, default values may be stored in computer-readable medium 108 and used automatically. In another alternative embodiment, the value of the maximum number of iterations $I_{max}$ and/or the maximum number of coefficient iterations $I_{max,\alpha}$ may not be selectable. Instead, fixed, predefined values may be used. For illustration, a default value of the maximum number of iterations $I_{max}$ may be 100 and default value of the maximum number of iterations $I_{max,\alpha}$ may be 100 though other values may be used.

In an operation 210, a sixth indicator of a convergence threshold value $c_{th}$ and a coefficient convergence threshold value $c_{th,\alpha}$ may be received. In an alternative embodiment, the sixth indicator may not be received. For example, default values may be stored in computer-readable medium 108 and used automatically. In another alternative embodiment, the value of the convergence threshold value $c_{th}$ and/or the coefficient convergence threshold value $c_{th,\alpha}$ may not be selectable. Instead, fixed, predefined values may be used. For illustration, a default value of the convergence threshold value $c_{th}$ may be 0.02 and a default value of the convergence threshold value $c_{th,\alpha}$ may be 0.01 though other values may be used.

In an operation 212, a seventh indicator of a kernel function may be received. For example, the seventh indicator indicates a name of a kernel function. The seventh indicator may be received by classification application 122 after selection from a user interface window or after entry by a user into a user interface window. A default value for the kernel function may further be stored, for example, in computer-readable medium 108. As an example, a kernel function may be selected from "Gaussian", "Exponential", "Linear", "Polynomial", "Sigmoid", "Radial Basis", etc. For example, a default kernel function may be the Gaussian kernel function though any positive definite kernel function may be used. Of course, the kernel function may be labeled or selected in a variety of different manners by the user as understood by a person of skill in the art. In an alternative embodiment, the kernel function may not be selectable, and a single kernel function is implemented in classification application 122. For example, the Gaussian kernel function may be used by default or without allowing a selection. The Gaussian kernel function may be defined as:

$$\exp\frac{-\|x_i - x_j\|^2}{2s^2}$$

where s is a kernel parameter that is termed a Gaussian bandwidth parameter.

In an operation 214, an eighth indicator of a kernel parameter value to use with the kernel function may be received. For example, a value for s, the Gaussian bandwidth parameter, may be received for the Gaussian kernel function. In an alternative embodiment, the eighth indicator may not be received. For example, a default value for the kernel parameter value may be stored in computer-readable medium 108 and used automatically or the kernel parameter value may not be used. In another alternative embodiment, the value of the kernel parameter may not be selectable. Instead, a fixed, predefined value may be used.

In an operation 216, a ninth indicator of a number of eigenvectors to select m may be received. In an alternative embodiment, the number of eigenvectors to select m may not be received. For example, a default value for the number of eigenvectors to select m may be stored in computer-readable medium 108 and used automatically. In another alternative embodiment, the value of the number of eigenvectors to select m may not be selectable. Instead, a fixed, predefined value may be used.

In an operation 218, a tenth indicator of a learning rate $\eta$ and a mini-batch size for stochastic gradient descent (SGD) computations may be received. In an alternative embodiment, the learning rate $\eta$ and the mini-batch size $N_b$ may not be received. For example, default values for the learning rate $\eta$ and/or the mini-batch size $N_b$ may be stored in computer-readable medium 108 and used automatically. In another alternative embodiment, the value of the learning rate $\eta$ and/or a mini-batch size $N_b$ may not be selectable. Instead, fixed, predefined values may be used. For illustration, a default value for the learning rate $\eta$ may be 0.005. The mini-batch size $N_b$ may be any value between one, which processes each observation vector separately, and the number of observation vectors included in input classified data 124 and input unclassified data 126, which processes the observations in a single batch.

In an operation 219, an eleventh indicator of a number of nearest neighbors may be received. In an alternative embodiment, the number of nearest neighbors $N_{nn}$ may not be received. For example, a default value for the number of nearest neighbors $N_{nn}$ may be stored in computer-readable medium 108 and used automatically. In another alternative embodiment, the value of the number of nearest neighbors $N_{nn}$ may not be selectable. Instead, a fixed, predefined value may be used. For illustration, a default value for the number of nearest neighbors $N_{nn}$ may be 5.

In an operation 220, a label matrix Y is defined from input classified data 124 and input unclassified data 126. Label matrix Y is an n×c matrix with $Y_{ik}=1$ if $x_i$ is labeled as $y_i=k$. Otherwise, $Y_{ik}=0$, where k=1, . . . , c. As another option for binary data, $Y_{ik}=1$ if $y_i$ indicates true; $Y_{ik}=-1$ if $y_i$ indicates false; otherwise, $Y_{ik}0$.

In an operation 222, an affinity matrix W is computed based on the kernel function and the kernel parameter value indicated in operations 212 and 214. For example, using the Gaussian kernel function, the affinity matrix W is defined as $$W_{ij} = \exp\frac{-\|x_i - x_j\|^2}{2s^2} \text{ if } i \neq j$$

and $W_{ii}=0$ for i=j, where s is the kernel parameter value, $x_i$ and $x_j$ are observation vectors selected from input classified data 124 and input unclassified data 126, the affinity matrix W is an N×N matrix such that i=1, . . . , N and j=1, . . . , N.

In an operation 224, a diagonal matrix D is computed based on the affinity matrix W. For example, using the Gaussian kernel function, the diagonal matrix D is an N×N matrix and is defined as $D_{ii}=\Sigma_{j=1}^{N} W_{ij}$ and $D_{ij}=0$ if $i \neq j$.

In an operation 226, a normalized graph Laplacian matrix L is computed based on the affinity matrix W and the diagonal matrix D. For example, the normalized graph Laplacian matrix L is an N×N matrix and is defined as $L=I-D^{-1/2}WD^{-1/2}$, where I is an N×N identity matrix.

In an operation 227, a singular value decomposition of the normalized graph Laplacian matrix L is performed to define eigenvectors with associated eigenvalues. For example, a normalized similarity matrix A is defined using $A=D^{-1/2}WD^{-1/2}$ such that the normalized graph Laplacian matrix L is defined using L=I−A. Because the normalized graph Laplacian matrix L is a positive semi-definite matrix, a symmetrical decomposition is performed to decompose the normalized graph Laplacian matrix L into $L=V\Sigma V^\tau = (\Sigma^{0.5}V^\tau)^\tau \Sigma^{0.5}V^\tau = B^\tau B$, where each column of V is an eigenvector of the normalized similarity matrix A, $\Sigma$ is a diagonal matrix whose diagonal entries are the eigenvalues of the normalized similarity matrix A, $B=\Sigma^{0.5}V^\tau$, and T indicates a transpose. B is calculated with all of the eigenvectors of the normalized graph Laplacian matrix L capturing the information relying on the manifold structure of the input dataset.

In an operation 228, m eigenvectors having the smallest eigenvalues are selected from the singular value decomposition V and stored in a matrix $V_m$, m eigenvectors having the smallest eigenvalues are selected from the diagonal matrix $\Sigma$ and stored in a matrix $\Sigma_m$. $V_{.i}$ indicates an $i^{th}$ eigenvector of V, and $L_m = V_m \Sigma_m V_m^\tau$ is further stored. The matrix $V_m$ may be referred to as a reverse graph embedding matrix. Matrix $V_m$ has dimension N×m. Matrix $\Sigma_m$ has dimension m×m.

An optimization is applied to define a classification matrix F using $F=V_{m,op}^r \alpha_{op}$, where $V_{m,op}^r$ is an optimized robust estimator of $V_m$, $\alpha$ is an optimized plurality of sparse coefficients, where the plurality of sparse coefficients include a coefficient value defined for each of the m eigenvectors and for each class. Thus, $\alpha$ is an m×1 vector defined for each class of the number of classes c. Given $L_m$, the goal is to learn a reverse graph embedding $V_{m,op}^r$, a transformation matrix Z such that $L_m^r = V_{m,op}^r Z$, and a second similarity matrix S in addition to $L_m^r$ under the fitting constraints guided by observations included in input classified data 124, where $L_m^r$ is a robust estimator of $L_m$. Second similarity matrix S is a similarity matrix of the normalized similarity matrix A.

A semi-supervised robust graph dimensionality reduction (SRGDR) is defined as $$\min_{S,V_m^r,Z} P(S, V_m^r, Z) = \sum_{k=1}^{c} \psi_1(\|V_m^r \alpha_k - y_k\|_2) +$$

$$\psi_2\left(\|L_m - V_m^r Z\|_F + \lambda_3 \sum_{i=1}^{N} \sum_{j=1}^{N_{nn}} s_{i,j}\psi_3(\|V_m^r z_i - V_m^r z_j\|_2) + \lambda_4 \|s_i\|_2^2\right),$$

subject to $(V_m^r)^\tau V_m^r = I$ and $\Sigma_{i=1}^{N} s_i^\tau = 1$, where 1 is a column vector where all the elements are 1, $\psi_1$, $\psi_2$, and $\psi_3$ are predefined robust estimators, $\alpha_k$ is an m×1 vector defined for the $k^{th}$ class computed using a mixed norm sparse regularization, $y_k$ is a $k^{th}$ column of the label matrix Y, $s_{i,j}$ is an i,j$^{th}$ element of the second similarity matrix S, $s_i$ is an $i^{th}$ row of the second similarity matrix S, $z_i$ is an $i^{th}$ row of the transformation matrix Z, $z_j$ is an $j^{th}$ row of the transformation matrix Z, $\|\ \|_2$ indicates an $l_2$ or Euclidean norm, and $\|\ \|_F$ indicates a Frobenius norm, and $\|s_i\|_2^2$ indicates a squared Euclidean norm of $s_i$. The second similarity matrix S has dimension N×$N_{nn}$. The first term guarantees a fitness with the noisy labels relying on robust estimators. The second term serves as a minimization of the error from dimensionality reduction. The third term aims at keeping the similarity between two samples if each of them is one of the $k_{nn}$-nearest neighbors of the other. The fourth term avoids trivial solutions. The rest of the constraints on $s_i$ guarantee different samples have different nearest neighbors. $\Sigma_{i=1}^{N} s_i^\tau = 1$ preserves a shift invariant similarity.

Unlike a robust graph dimensionality reduction as described in a paper by X. Zhu et al., *Robust Graph Dimensionality Reduction*, International Joint Conference on Artificial Intelligence (2018)(RGDR), which does not use input classified data 124, SRGDR is driven by input classified data 124 and minimizes a residual between $V_m^r \alpha_k$ and $y_k$ using robust estimators. RGDR is applied only for dimensionality reduction while SRGDR is coupled with sparse regularization to jointly learn the parameters in robust semi-supervised learning (RSSL), for example, LSSC, and a paper by C. Cong and H. Zhang, *Learning with Inadequate and Incorrect Supervision*, International Conference on Data Mining (ICDM)(2017)(SIIS).

To simplify SRGDR, $\phi(x)$ is defined as a conjugate function of $\psi(x)$ that can be either an explicit or an implicit function. For illustration, as described in a paper by M. Nikolova and M. Ng, *Analysis of half-quadratic minimization methods for signal and image recovery*, SIAM Journal on Scientific computing (2005), the optimization of the robust estimator can be transformed into $$\min_{x} \sum_{i=1}^{N} \psi(x_i) \Rightarrow \min_{x,p} \sum_{i=1}^{N} px_i^2 + \phi(p),$$

which indicates that the optimization of $\psi(x_i)$ is equivalent to the optimization of $px_i^2$ and $\phi(p)$, where p is an auxiliary variable. There are many choices for robust estimators such as linear combination of order statistics, repeated median and rank transformation, etc. The minimization function $\delta(x)$ is the function that optimizes $\phi(p)$. For example, the following robust estimator and corresponding minimization function may be chosen for simplicity $$\psi(x) = \frac{x^2}{2(1+x^2)}, \delta(x) = \frac{1}{(1+x^2)^2}.$$

Relying on SRGDR on the graph Laplacian matrix to group highly correlated samples in the sparse regularization, a mixed norm regularization is used with its $k^{th}$ subproblem defined as $Q(f_k) = 0.5\|f_k - y_k\|_2^2 + \lambda_1 \|Bf_k\|_1 + \lambda_2 \|Bf_k\|_2^2 = 1, \ldots, c.$ The significance of the third term is that it groups highly correlated samples and pulls away the outliers to enhance classification performance. Substituting $B=\Sigma^{0.5}V^\tau$ and $f_k = V_m \alpha_k$ results in $Q(a_k) = 0.5\|V_m \alpha_k - y_k\|_2^2 + \lambda_1 \Sigma_{i=1}^{m}((\Sigma_{ii})^{0.5}|\alpha_{i,k}|) + \lambda_2 \Sigma_{i=1}^{m}((\Sigma_{ii})^{0.5}\alpha_{i,k})^2 = C_1(\alpha_k) + C_2(\alpha_k), k=1, \ldots, c,$ $L^r$ may be defined as the robust estimator of L, and $\Sigma^r$ may be defined as the robust diagonal matrix obtained from the eigenvector decomposition of $L^r$. The robust eigenvalues from $\Sigma^r$ are adapted into the sparse regularization via SRGDR. $Q(a_k)$ can be simplified as $Q(a_k) = 0.5\|V_m \alpha_k - y_k\|_2^2 + \lambda_1 \Sigma_{i=1}^{m}((\tau_{ii}^r)^{0.5}|\alpha_{i,k}|) + \lambda_2 \Sigma_{i=1}^{m}((\Sigma_{ii}^r)^{0.5}\alpha_{i,k})^2 = C_1(\alpha_k) + C_2(\alpha_k), k=1, \ldots, c.$ where $C_1(\alpha_k) = 0.5\|V_m^r \alpha_k - y_k\|_2^2 + \lambda_2 \Sigma_{i=1}^{m}((\Sigma_{ii}^r)^{0.5}\alpha_{i,k})^2$ includes the differentiable terms from $Q(\alpha)$, and $C_2(\alpha) = \lambda_1 \Sigma_{i=1}^{m}((\Sigma_{ii}^r)^{0.5}|\alpha_{i,k}|)$ includes the non-differentiable terms from $Q(\alpha)$. The first term, $0.5\|V_m^r \alpha_k - y_k\|_2^2$, defines a fitting constraint primarily to ensure the classification function is close enough to the initial classification labels defined by Y. The second term, $\lambda_1 \Sigma_{i=1}^{m}((\Sigma_{ii}^r)^{0.5}|\alpha_{i,k}|)$, provides an $l_1$-norm smoothness constraint for Laplacian regularization. The third term, $\lambda_2 \Sigma_{i=1}^{m}((\Sigma_{ii}^r)^{0.5}\alpha_{i,k})^2$, provides an $l_2$-norm constraint for Laplacian regularization. The significance of the third term is two-fold. First, the third term characterizes correlations between variables to fully utilize the interdependency along different dimensions to enhance the classification performance. Second, it makes the loss function strongly convex, which ensures the unique solution to be Lipschitz with respect to classification matrix F.

A robust truncated diagonal matrix with the m smallest eigenvalues may be defined as $\Sigma_m^r \in R^{m \times m}$. From $L_m^r = V_m^r Z = V_m^r \Sigma_m^r (V_m^r)^\tau$, $Z = \Sigma_m^r (V_m^r)^\tau$. To combine $Q(\alpha_k)$ with $P(S, V_m^r, Z)$, $Z = \Sigma_m^r (V_m^r)^\tau$ in $P(S, V_m^r, Z)$ is substituted and the robust estimator $\psi$ is replaced with the conjugate function $\phi$ resulting in the following full optimization problem $$\min J\left(S, V_m^r, \sum_m^r, \alpha, e, b, d\right) =$$

$$\sum_{k=1}^{c} e_k \|V_m^r \alpha_k - y_k\|_2^2 + \sum_{i=1}^{N} b_i \left\| L_m - V_m^r \sum_m^r (V_m^r)^\tau \right\|_2^2 +$$

$$\lambda_3 \sum_{i=1}^{N} \sum_{j \in NN(x_i)} s_{i,j} d_{i,j} \left\| V_m^r \left( \sum_m^r (V_m^r)^\tau \right)_i - V_m^r \left( \sum_m^r (V_m^r)^\tau \right)_j \right\|_2^2 +$$

$$\phi(e) + \phi(b) + \phi(d) + \lambda_4 \sum_{i=1}^{N} \|s_i\|_2^2 +$$

$$\lambda_1 \sum_{i=1}^{m} \left( \left( \sum_{ii}^{r} \right)^{0.5} |\alpha_{i,k}| \right) + \lambda_2 \sum_{i=1}^{m} \left( \left( \sum_{ii}^{r} \right)^{0.5} \alpha_{i,k} \right)^2$$

subject to $(V_m^r)^\tau V_m^r = I$ and $\Sigma_{i=1}^{N} s_i^\tau 1 = 1$, where $(\Sigma_m^r (V_m^r)^\tau)_i$ represents an $i^{th}$ column of the estimated matrix Z, $e \in R^{c \times 1}$ is a first auxiliary vector, $b \in R^{N \times 1}$ is a second auxiliary vector, and $d \in R^{N_{nn} \times N_{nn}}$ is a first auxiliary matrix. Again, c is the number of classes in label set Q, N is the number of observation vectors included in input classified dataset 124 and input unclassified dataset 126, and $N_{nn}$ is the number of nearest neighbors. $j \in NN(x_i)$ indicates an index to one of the nearest neighbors of $x_i$, where $\Sigma_{j \in NN(x_i)}$ indicates a summation over each of the $N_{nn}$ nearest neighbors of $x_i$. The optimization focuses on directly minimizing the residual of the graph Laplacian relying on the estimated robust eigenvectors $V_m^r$, and eigenvalues $\Sigma_m^r$ using two-steps. First, S, $V_m^r, \Sigma_m^r$, e, b, d are fixed while a is optimized by solving c independent minimization problems $e_1 J_1(\alpha_1), \ldots, e_c J_1(\alpha_c)$. The optimization of the $k^{th}$ problem is equivalent to $$J_1(\alpha_k) = e_k \|V_m^r \alpha_k - y_k\|_2^2 + \lambda_1 \sum_{i=1}^{m} \left( \left( \sum_{ii}^{r} \right)^{0.5} |\alpha_{i,k}| \right) + \lambda_2 \sum_{i=1}^{m} \left( \left( \sum_{ii}^{r} \right)^{0.5} \alpha_{i,k} \right)^2$$

where $k=1, \ldots, c$ to define each optimization problem.

As described above, to minimize $J_1(\alpha_k)$, $J_1(\alpha_k)$ is rearranged to a sum of a differentiable function $C_1(\alpha_k)$ and a non-differentiable function $C_2(\alpha_k)$ $$J_1(\alpha_k) = C_1(\alpha_k) + C_2(\alpha_k), k=1, \ldots, c$$

where $C_1(\alpha_k) = e_k \|V_m^r \alpha_k - y_k\|_2^2 + \lambda_2 \Sigma_{i=1}^{m} ((\Sigma_{ii}^r)^{0.5} \alpha_{i,k})^2$, and $C_2(\alpha) = \lambda_1 \Sigma_{i=1}^{m} ((\Sigma_{ii}^r)^{0.5} |\alpha_{i,k}|)$ includes the non-differentiable terms.

After computing an optimized $\alpha_k$, S, $V_m^r, \Sigma_m^r$, e, b, d are successively optimized using a stochastic gradient descent algorithm while a is fixed to the optimized $\alpha_k$ based on $$J_2\left(S, V_m^r, \sum_m^r, e, b, d\right) =$$

$$\sum_{k=1}^{c} e_k \|V_m^r \alpha_k - y_k\|_2^2 + \sum_{i=1}^{N} b_i \left\| L_m - V_m^r \sum_m^r (V_m^r)^\tau \right\|_2^2 +$$

$$\lambda_3 \sum_{i=1}^{N} \sum_{j \in NN(x_i)} s_{i,j} d_{i,j} \left\| V_m^r \left( \sum_m^r (V_m^r)^\tau \right)_i - V_m^r \left( \sum_m^r (V_m^r)^\tau \right)_j \right\|_2^2 +$$

$$\phi(e) + \phi(b) + \phi(d) + \lambda_4 \sum_{i=1}^{N} \|s_i\|_2^2$$

subject to $(V_m^r)^\tau V_m^r = I$ and $\Sigma_{i=1}^{N} 1 = 1$. As described in a paper by R. He, et al., *Maximum correntropy criterion for robust face recognition*, IEEE Transactions on Pattern Analysis and Machine Intelligence (2011), the results of optimization of e, b, d are related to the residuals of $V_m^r \alpha_k - y_k$, $L_m - V_m^r \Sigma_m^r (V_m^r)^\tau$, and $V_m^r (\Sigma_m^r (V_m^r)^\tau)_i - V_m^r (\Sigma_m^r (V_m^r)^\tau)_j$, respectively. When the residuals are large, the weights are small. By using this formulation, the sample outliers are suppressed or removed.

In an operation 230, an iteration counter I is initialized, for example, as I=1, the plurality of sparse coefficients α are each initialized, for example, to zero values, where α is an m×1 vector. S, $V_m^r$, and $\Sigma_m^r$ are each initialized to the identity matrix, and e, b, d are each initialized to a unit vector, a unit vector, and an identity matrix, respectively, though they may be initialized using other values.

In an operation 231, $N_{nn}$ nearest neighbors are determined for each observation vector included in input classified dataset 124 and input unclassified dataset 126. Referring to FIG. 2B, processing continues in an operation 232.

In operation 232, a coefficient iteration counter $I_\alpha$ is initialized, for example, as $I_\alpha = 1$.

In an operation 233, a class index k is initialized, for example, as k=1, and a convergence value $cv_\alpha$ is initialized, for example, as $cv_\alpha = 0$.

In an operation 234, a coefficient index p is initialized, for example, as p=1.

In an operation 236, a gradient of $C_1(\alpha_{p,k})$ is computed with respect to the coefficient $\alpha_{p,k}$. For example, the gradient of $C_1(\alpha_{p,k})$ is computed as $$\nabla_{a_{p,k}}(C_1(\alpha_{p,k})) = C_{3,i} + 2\lambda_2 (\Sigma_{pp}^r)^{0.5} \Sigma_{i=1}^{m} ((\Sigma_{ii}^r)^{0.5} \alpha_{i,k}),$$

where $C_3 = 2e_k(V_m^r)^\tau (V_m^r \alpha_k - Y_k)$ where $C_3$ is an m×1 vector, $C_{3,i}$ is an $i^{th}$ element of $C_3$, and T indicates a transpose.

In an operation 238, a difference value $\Delta_{p,k}$ is computed for the sparse coefficient $\alpha_{p,k}$ using $$\Delta_{p,k} = \alpha_{p,k} - \frac{\nabla_{a_{p,k}}(c_1(\alpha_{p,k}))}{\|V_m^r\|_s^2},$$

where $\|V_m^r\|_s$ is a spectral norm of the matrix $V_m^r$.

In operation 240, coefficient $\alpha_{p,k}$ is updated, for example, using $\alpha_{p,k}=$max $$\alpha_{p,k} = \max\left\{\Delta_{p,k} - \frac{\lambda_1\left(\sum_{pp}^r\right)^{0.5}}{\|V_m^r\|_s}, 0\right\}$$

when $\Delta_{p,k}>0$, and $\alpha_{i,k}=$min $$\alpha_{i,k} = \min\left\{-\Delta_{p,k} - \frac{\lambda_1\left(\sum_{pp}^r\right)^{0.5}}{\|V_m^r\|_s}, 0\right\}$$

when $\Delta_{p,k}=0$.

In operation 242, a coefficient convergence value $cv_\alpha$ is computed, for example, using $cv_\alpha = cv_\alpha + \alpha_{p,k} - \alpha_{p,k}'$, where $\alpha_{p,k}'$ is a value of $\alpha_{p,k}$ prior to the update in operation 240. The convergence value $cv_\alpha$ is a sum of a difference between the current $\alpha_{p,k}$ and the previous $\alpha_{p,k}$ for each coefficient of the sparse coefficients.

In an operation 244, a determination is made concerning whether there is another coefficient of the sparse coefficients of the $k^{th}$ class to update, for example, using $p\leq m$. If $p\leq m$, processing continues in an operation 246. If $p>m$, processing continues in an operation 247.

In operation 246, the coefficient index p is incremented, for example, as $p=p+1$, and processing continues in operation 238 to process the next coefficient.

In an operation 247, a determination is made concerning whether there is another class for which to update the sparse coefficients, for example, using $k\leq c$. If $k\leq c$, processing continues in an operation 248. If $k>c$, processing continues in an operation 249.

In operation 248, the class index k is incremented, for example, as $k=k+1$, and processing continues in operation 234 to process the next class.

In an operation 249, a determination is made concerning whether convergence has been achieved for the sparse coefficients or the maximum number of iterations have been performed. If $cv_\alpha<cv_{th,\alpha}$ or $I_\alpha \geq I_{max,\alpha}$, processing continues in an operation 252 shown referring to FIG. 2C, in. If $cv_\alpha>c_{th,\alpha}$ and $I_\alpha<I_{max,\alpha}$, processing continues in an operation 250.

In operation 250, the coefficient iteration counter $I_\alpha$ is incremented, for example, as $I_\alpha=I_\alpha+1$, and processing continues in operation 233.

Referring to FIG. 2C, in operation 252, a mini-batch of observation vectors is selected randomly from input classified dataset 124 and input unclassified dataset 126. A number of the selected observation vectors is the mini-batch size $N_b$ indicated in operation 218.

In an operation 254, an updated value of $\phi(e)$ is computed using SGD with the learning rate $\eta$ indicated in operation 218 until a maximum number of iterations is exceeded or a convergence value satisfies a convergence threshold. For example, the updated value of $\phi(e)$ is computed using $\phi(e)=\phi(e)+\eta g(\phi(e))$, where $g(\phi(e))$ indicates a value of a gradient of $\phi(e)$. For example, when $$\phi(e) = \frac{1}{(1+e^2)^2}, g(e) = \frac{-4e}{(1+e^2)^3}.$$

An updated e vector can be computed using the updated value of $\phi(e)$.

In an operation 256, an updated value of $\phi(b)$ is computed using SGD with the learning rate $\eta$ indicated in operation 218 and the selected mini-batch of observation vectors until a maximum number of iterations is exceeded or a convergence value satisfies a convergence threshold. For example, the updated value of $\phi(b)$ is computed using $\phi(b)=\phi(b)+\eta g(\phi(b))$, where $q(\phi(b))$ indicates a value of a gradient of $\phi(b)$. For example, when $$\phi(b) = \frac{1}{(1+b^2)^2}, g(b) = \frac{-4b}{(1+b^2)^3}.$$

An updated b vector can be computed using the updated value of $\phi(b)$.

In an operation 258, an updated value of $\phi(d)$ is computed using SGD with the learning rate $\eta$ indicated in operation 218 and the selected mini-batch of observation vectors until a maximum number of iterations is exceeded or a convergence value satisfies a convergence threshold. For example, the updated value of $\phi(d)$ is computed using $\phi(d)=\phi(d)+\eta g(\phi(d))$, where $g(\phi(d))$ indicates a value of a gradient of $\phi(d)$. For example, when $$\phi(d) = \frac{1}{(1+d^2)^2}, g(d) = \frac{-4d}{(1+d^2)^3}.$$

An updated d matrix can be computed using the updated value of $\phi(d)$.

In an operation 260, an updated value of the estimated robust eigenvector matrix $V_m^r$ is computed using SGD with the learning rate $\eta$ indicated in operation 218 and the selected mini-batch of observation vectors until a maximum number of iterations is exceeded or a convergence value satisfies a convergence threshold. For example, the updated value of $V_m^r$ is computed using $V_m^r = V_m^r + \eta g(V_m^r)$, where $g(V_m^r)$ indicates a value of a gradient of $V_m^r$. For example, $g(V_m^r)=\Sigma_{k=1}^c 2e_k \alpha_k(V_m^r \alpha_k - y_k) + 2 \Sigma_{i=1}^{N_b} b_i (\Sigma_m^r (V_m^r)^\tau (L_m - V_m^r \Sigma_m^r (V_m^r)^\tau) + 2\lambda_3 \Sigma_{i=1}^{N_b} \Sigma_{j\in NN(x_i)} s_{i,j} d_{i,j} (\Sigma_m^r ((V_m^r)^\tau_i - \Sigma_m^r ((V_m^r)^\tau_j)(V_m^r \Sigma_m^r ((V_m^r)^\tau_i - V_m^r \Sigma_m^r ((V_m^r)^\tau_j)),$ where the summations from 1 to $N_b$ indicate that only the observations included in the selected mini-batch of observation vectors are updated.

In an operation 262, an updated value of the estimated robust eigenvalue matrix $E_m^r$ is computed using SGD with the learning rate $\eta$ indicated in operation 218 and the selected mini-batch of observation vectors until a maximum number of iterations is exceeded or a convergence value satisfies a convergence threshold. For example, the updated value of $E_m^r$ is computed using $\Sigma_m^r = \Sigma_m^r + \eta g(\Sigma_m^r)$, where $g(\Sigma_m^r)$ indicates a value of a gradient of $\Sigma_m^r$. For example, $g(\Sigma_m^r) = -2\Sigma_{i=1}^{N_b} b_i(V_m^r (V_m^r)^\tau (L_m - V_m^r \Sigma_m^r (V_m^r)^\tau) + 2\lambda_3 \Sigma_{i=1}^{N_b} \Sigma_{j\in NN(x_i)} s_{i,j} d_{i,j} (V_m^r ((V_m^r)^\tau)_i - V_m^r ((V_m^r)^\tau)_j)(V_m^r \Sigma_m^r ((V_m^r)^\tau)_i - V_m^r \Sigma_m^r ((V_m^r)^\tau)_j),$ where the summations from 1 to $N_b$ indicate that only the observations included in the selected mini-batch of observation vectors are updated.

In an operation 264, an updated value of the second similarity matrix S is computed using a method described in a paper by He et al., *Maximum Correntropy Criterion for Robust Face Recognition*, IEEE Transactions on Pattern Analysis and Machine Intelligence, 33(8), 1561-1576 (2011). For example, $$s_{i,j} = -\frac{\lambda_3 d_{i,j}}{2\lambda_4 \left\| V_m^r \sum_m ((V_m^r)^T)_i - V_m^r \sum_m ((V_m^r)^T)_j \right\|_2^2},$$

$$i = 1, \ldots, N, j = 1, \ldots, N_{rm}.$$

In operation 266, a convergence value cv is computed, for example, using $cv=\phi(e)-\phi(e)'+\phi(b)-\phi(b)'+\phi(d)-\phi(d)'+V_m^r-V_m^{r'}+\Sigma_m^r-\Sigma_m^{r'}+S-S'$, where $\phi(e)'$, $\phi(b)'$, $\phi(d)'$, $V'^r_m$, $\Sigma'^r_m$, $S'$ are values of $\phi(e)$, $\phi(b)$, $\phi(d)$, $V_m^r$, $\Sigma_m^r$, $S$ prior to the updates in operations 254, 256, 258, 260, 262, and 264, respectively. The convergence value cv is a sum of a difference between the current and the previous values for each parameter.

In operation 268, a determination is made concerning whether convergence has been achieved for the parameters or the maximum number of iterations have been performed. If $cv \leq c_{th}$ or $I \geq I_{max}$, processing continues in an operation 272. If $cv > c_{th}$ and $I < I_{max}$, processing continues in an operation 270.

In operation 270, the iteration counter I is incremented, for example, as I=I+1, and processing continues in operation 232.

In operation 272, the classification matrix F is defined using $F=V_m^r \alpha_k$, k=1, . . . , c.

In an operation 274, each of the unclassified observation vectors in input unclassified data 126 is classified and updated in label vector Y. $F(i)_k$ may be referred to as an $i^{th}$ element of the optimized classification function for the $k^{th}$ class. For example, for a binary label set, if $F(i)_k > 0$, the $y_i$-variable (target) value or class of the $i^{th}$ observation vector of input unclassified data 126 is predicted to be 1; whereas, if $F(i)_k \leq 0$, the $y_i$-variable (target) value or class of the $i^{th}$ observation vector of input unclassified data 126 is predicted to be −1. For a label set having c classes, $y_i$ is selected for each observation vector $x_i$ based on $$y_i = \underset{1 \leq k \leq c}{\mathrm{argmax}} F(i)_k.$$

As a result, a label with a highest classification value as indicated by $$\underset{1 \leq k \leq c}{\mathrm{argmax}} F(i)_k$$

is selected as the $y_i$-variable (target) value or class for the $i^{th}$ observation vector $x_i$ of input unclassified data 126. The classification or label for each observation vector $x_i$ of input unclassified data 126 may be extracted from label set Q using the value of $y_i$ as an index into label set Q, and label vector Y may be updated with these values.

In an operation 276, the class or label identified for each observation vector $x_i$ included in input unclassified data 126 may be stored in classification output data 128 possibly with the respective observation vector $x_i$.

Figure 3:
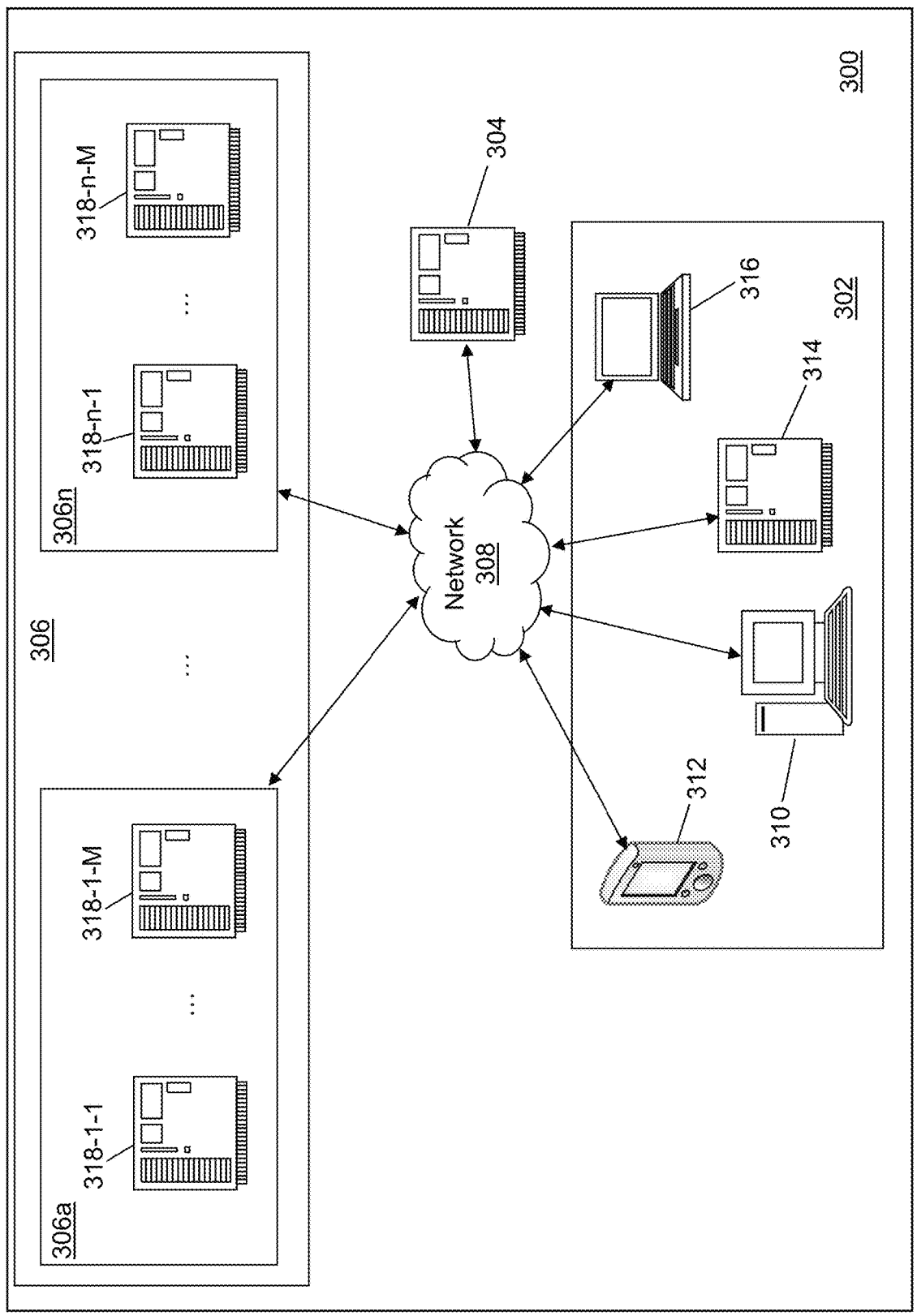
FIG. 3 depicts a block diagram of a classification system in accordance with an illustrative embodiment.

Referring to FIG. 3, a block diagram of a distributed classification system 300 is shown in accordance with an illustrative embodiment. Distributed classification system 300 provides an automated, distributed active machine learning system that jointly minimizes a loss value allowing users to select hyperparameters such as s, m, $\lambda_1$, $\lambda_2$, $\lambda_3$, and/or $\lambda_4$ automatically.

In an illustrative embodiment, distributed classification system 300 may include a user system 302, a selection manager device 304, a worker system 306, and a network 308. Each of user system 302, selection manager device 304, and worker system 306 may be composed of one or more discrete computing devices in communication through network 308. Alternatively, user system 302, selection manager device 304, and worker system 306 may be integrated into a single computing device capable of computing using a plurality of different threads.

Network 308 may include one or more networks of the same or different types. Network 308 can be any type of wired and/or wireless public or private network including a cellular network, a local area network, a wide area network such as the Internet or the World Wide Web, etc. Network 308 further may comprise sub-networks and consist of any number of communication devices.

The one or more computing devices of user system 302 may include computing devices of any form factor such as a desktop 310, a smart phone 312, a server computer 314, a laptop 316, a personal digital assistant, an integrated messaging device, a tablet computer, etc. User system 302 can include any number and any combination of form factors of computing devices that may be organized into subnets. In general, a "server" computer may include faster processors, additional processors, more disk memory, and/or more RAM than another computer form factor and support multi-threading as understood by a person of skill in the art. The computing devices of user system 302 may send and receive signals through network 308 to/from another of the one or more computing devices of user system 302 and/or to/from selection manager device 304. The one or more computing devices of user system 302 may communicate using various transmission media that may be wired and/or wireless as understood by those skilled in the art. The one or more computing devices of user system 302 may be geographically dispersed from each other and/or co-located.

Figure 4:
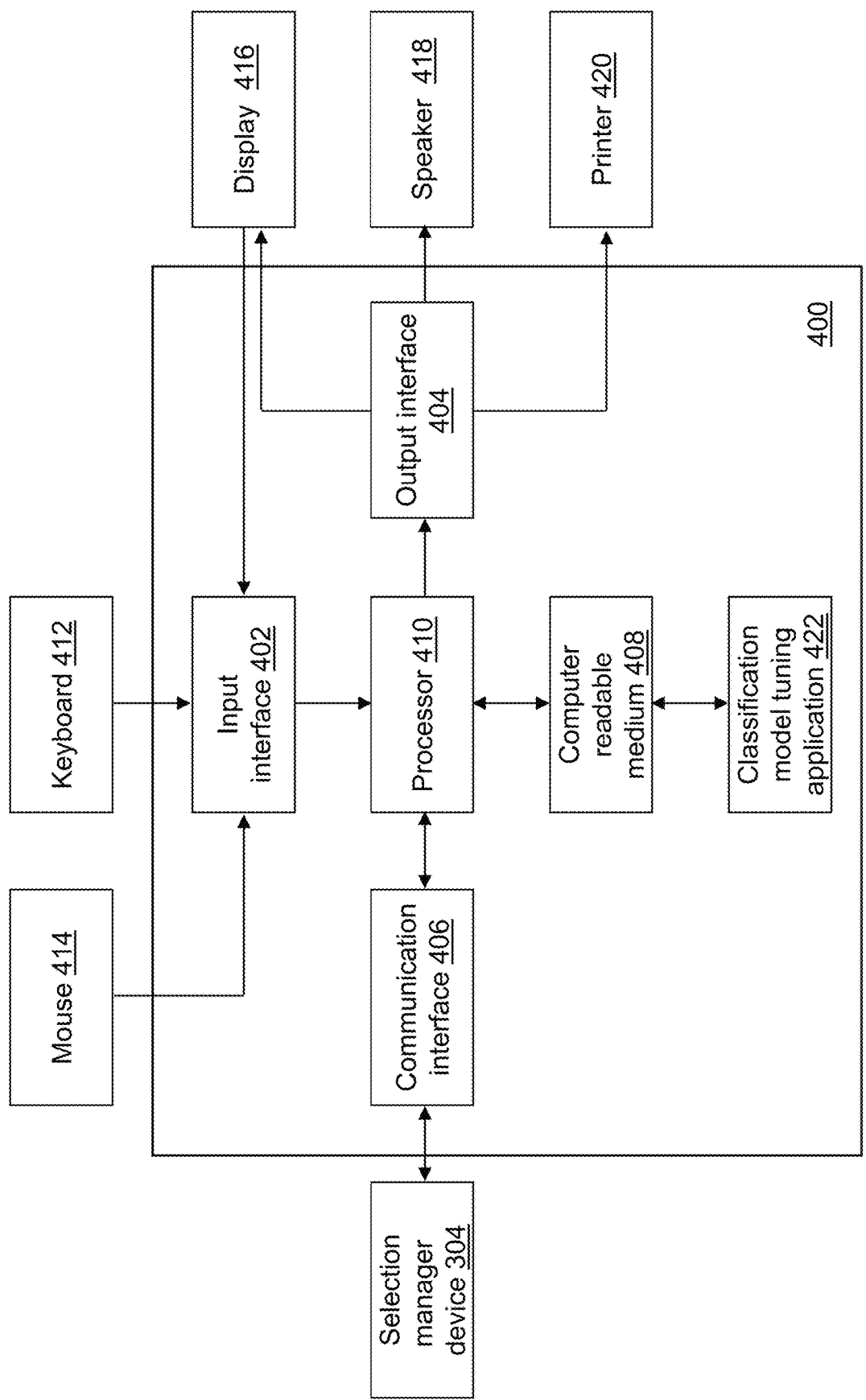
FIG. 4 depicts a block diagram of a user device of the classification system of FIG. 3 in accordance with an illustrative embodiment.

For illustration, referring to FIG. 4, a block diagram of a user device 400 is shown in accordance with an example embodiment. User device 400 is an example computing device of user system 302. For example, each of desktop 310, smart phone 312, server computer 314, and laptop 316 may be an instance of user device 400. User device 400 may include a second input interface 402, a second output interface 404, a second communication interface 406, a second computer-readable medium 408, a second processor 410, and a classification model tuning application 422. Each computing device of user system 302 may be executing classification model tuning application 422 of the same or different type.

Referring again to FIG. 3, selection manager device 304 can include any form factor of computing device. For illustration, FIG. 3 represents selection manager device 304 as a server computer. Selection manager device 304 may send and receive signals through network 308 to/from user system 302 and/or to/from worker system 306. Selection manager device 304 may communicate using various transmission media that may be wired and/or wireless as understood by those skilled in the art. Selection manager device 304 may be implemented on a plurality of computing devices of the same or different type. Distributed classification system 300 further may include a plurality of selection manager devices.

Figure 5:
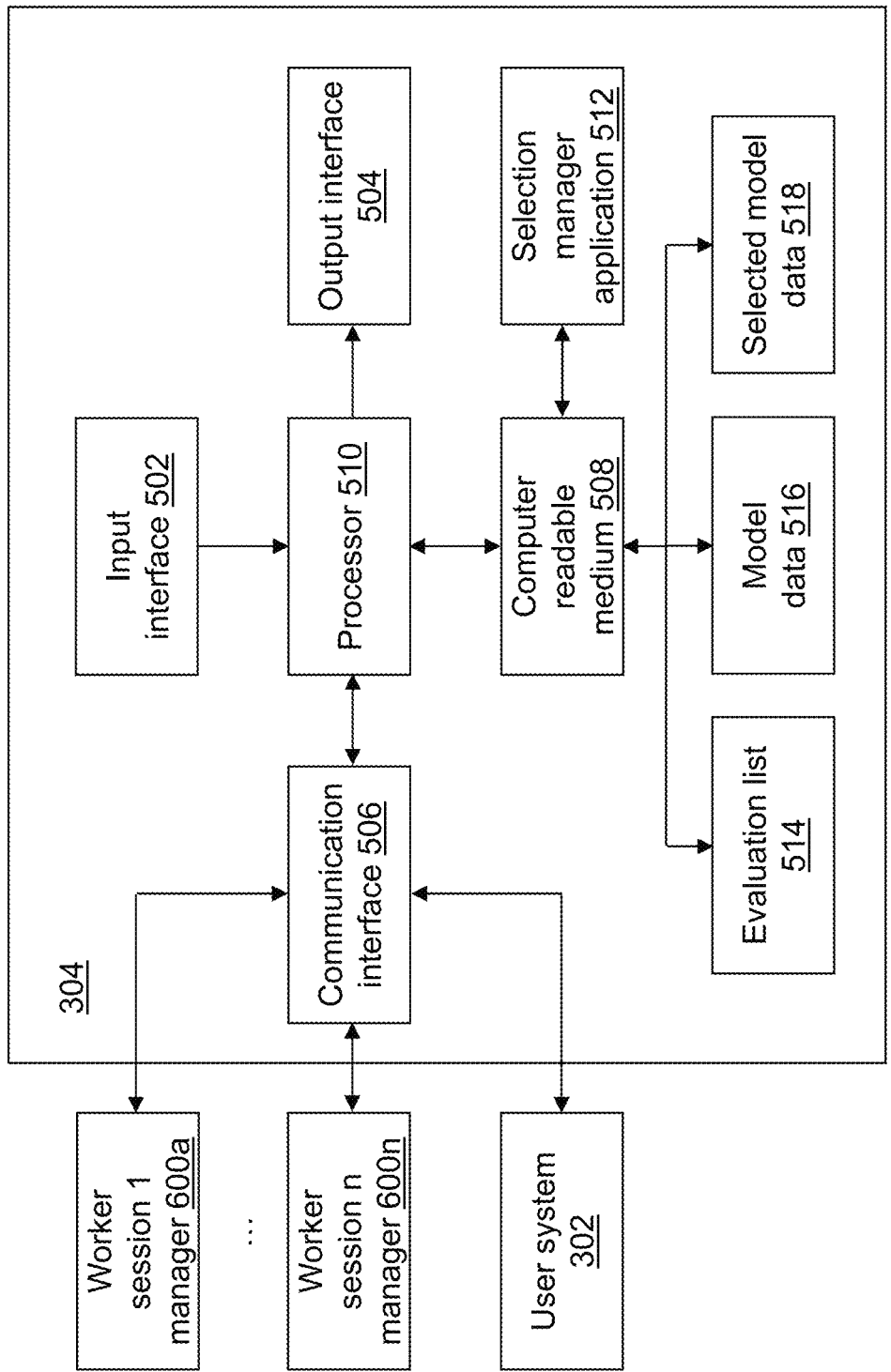
FIG. 5 depicts a block diagram of a selection manager device of the classification system of FIG. 3 in accordance with an illustrative embodiment.

For illustration, referring to FIG. 5, a block diagram of selection manager device 304 is shown in accordance with an illustrative embodiment. Selection manager device 304 may include a third input interface 502, a third output interface 504, a third communication interface 506, a third computer-readable medium 508, a third processor 510, a selection manager application 512, an evaluation list 514, model data 516, and selected model data 518. Evaluation list 514, model data 516, and selected model data 518 are created from results generated by worker system 306. Evaluation list 514 allows the hyperparameter tuning process to remain efficient by only evaluating "close" points once. Evaluation list 514 may be stored in memory using various data structures such as a list, an array, a tree, etc. For example, evaluation list 514 may be stored as a splay tree so that the points that are most recently added are near the root of the tree for faster searching.

Referring again to FIG. 3, the one or more computing devices of worker system 306 may include computers of any form factor that may be organized into one or more sessions, where a number of the one or more sessions is indicated by N. Worker system 306 may include a number of computing devices indicated by N. Worker system 306 may include computers of other form factors such as a desktop or a laptop, etc. Worker system 306 can include any number and any combination of form factors of computing devices organized into any number of sessions. For example, in the illustrative embodiment, worker system 306 includes a first worker session 306a, . . . , and an $N_s^{th}$ worker session 306n. Each session may include one or more computing devices, where a number of session computing devices in each session is indicated by M. In the illustrative embodiment, first worker session 306a may include a first computing device 318-1-1, . . . , and an $M^{th}$ computing device 318-1-M, and $N_s^{th}$ worker session 306n may include a first computing device 318-n-1, . . . , and an $M^{th}$ computing device 318-n-M. The number of computing devices indicated by $N_w$ may or may not also include selection manager device 304. A number of threads may be associated with each computing device of worker system 306.

The computing devices of worker system 306 may send and receive signals through network 308 to/from selection manager device 304 and/or to/from user system 302 and/or to/from another computing device of worker system 306. The one or more computing devices of worker system 306 may be geographically dispersed from each other and/or co-located. The one or more computing devices of worker system 306 may communicate using various transmission media that may be wired and/or wireless as understood by those skilled in the art.

Figure 6A:
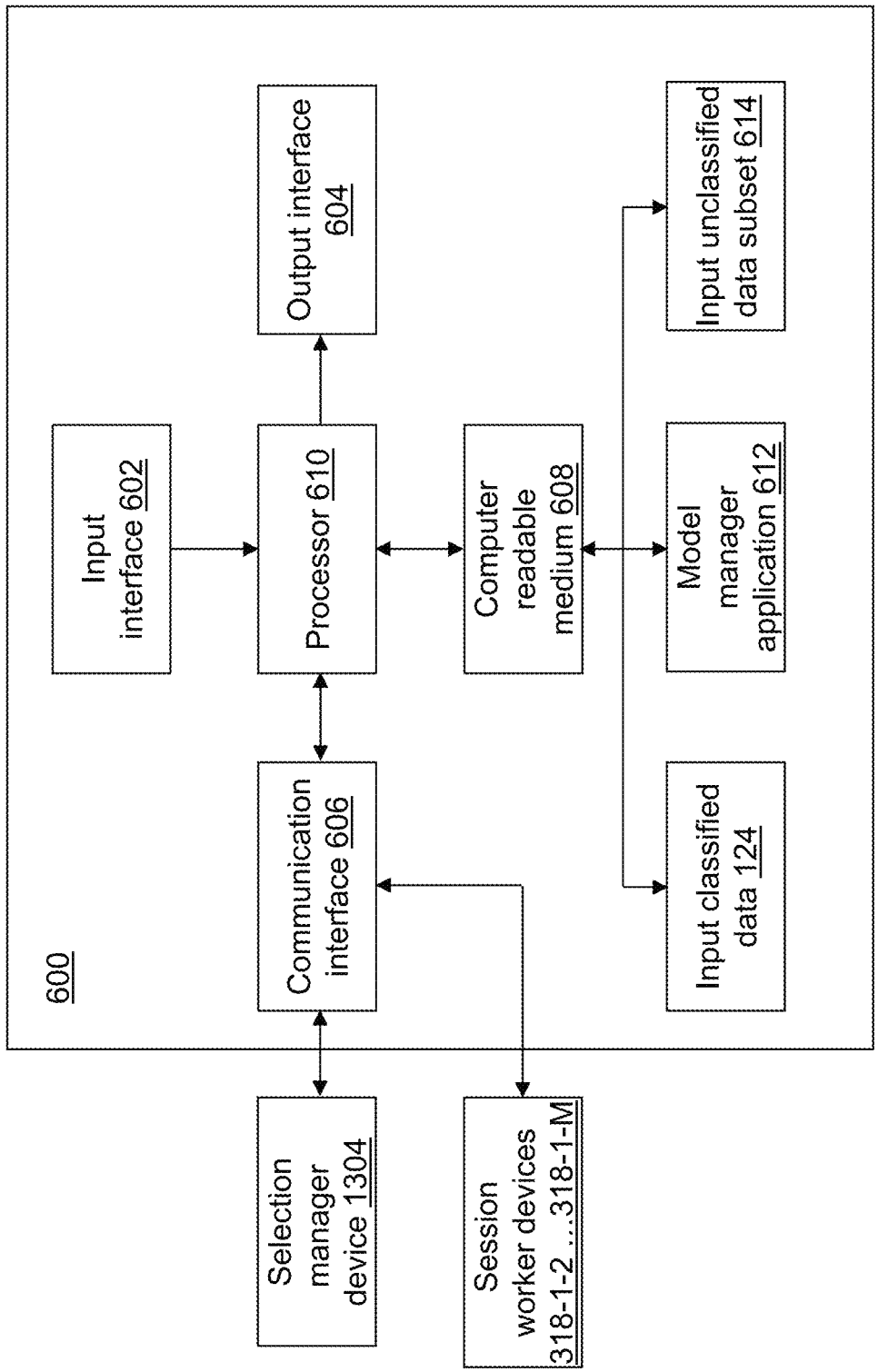
FIG. 6A depicts a block diagram of a session manager device of the classification system of FIG. 3 in accordance with an illustrative embodiment.

For illustration, referring to FIG. 6A, a block diagram of a session manager device 600 is shown in accordance with an example embodiment. Session manager device 600 is an example computing device selected from each session of worker system 306. For example, a first computing device of each session, such as first computing device 318-1-1 of first worker session 306a and first computing device 318-n-1 of $N_s^{th}$ worker session 306n may be an instance of session manager device 600. In the illustrative embodiment of FIG. 6A, session manager device 600 is the session manager device for first worker session 306a and may be referred to as first computing device 318-1-1 that communicates with second computing device 318-1-2, . . . , and $M^{th}$ computing device 318-1-M. Session manager device 600 may include a fourth input interface 602, a fourth output interface 604, a fourth communication interface 606, a fourth computer-readable medium 608, a fourth processor 610, a model manager application 612, input classified data 124, and an input unclassified data subset 614.

Figure 6B:
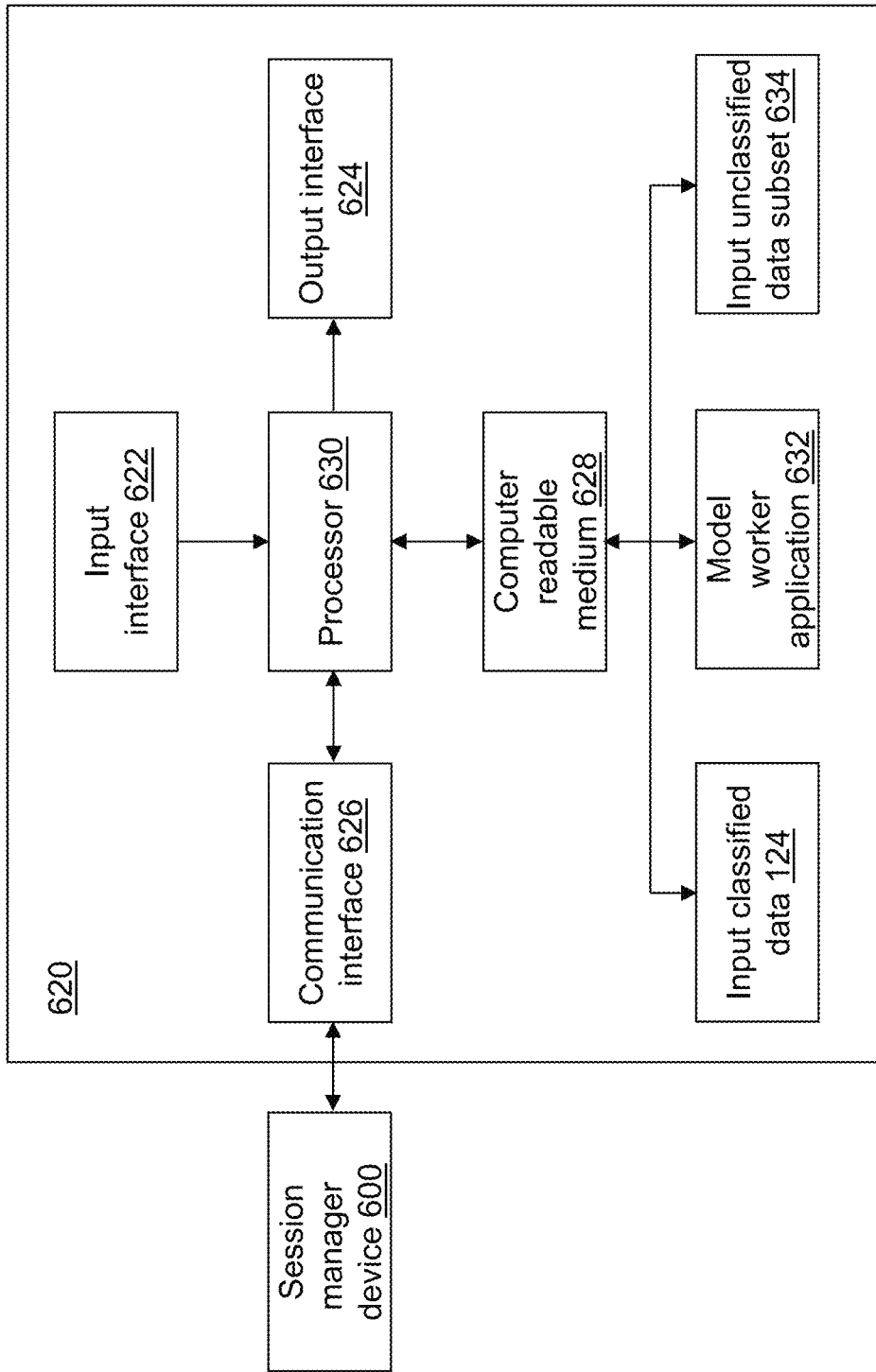
FIG. 6B depicts a block diagram of a session worker device of the classification system of FIG. 3 in accordance with an illustrative embodiment.

For illustration, referring to FIG. 6B, a block diagram of a session worker device 620 is shown in accordance with an example embodiment. Session worker device 620 is an example worker computing device of each session of worker system 306 excluding each session manager device 600. For example, remaining computing devices of each session, such as second computing device 318-1-2, . . . , and $M^{th}$ computing device 318-1-M of first worker session 306a and second computing device 318-n-2, . . . , and $M^{th}$ computing device 318-n-M of $N_s^{th}$ worker session 306n, may each be an instance of session worker device 620. Session worker device 620 may include a fifth input interface 622, a fifth output interface 624, a fifth communication interface 626, a fifth computer-readable medium 628, a fifth processor 630, a model worker application 632, input classified data 124, and an input unclassified data subset 634.

In some implementations, a distributed solution allows applications of big data. For example, scalability is provided with a distributed solution. A copy of input classified data 124 may be sent to each computing device of worker system 306. Because input unclassified data 126 may need to be distributed across a plurality of computing devices, each session may include a plurality of computing devices with one of the computing devices acting as the session manager and referred to as session manager device 600. Input unclassified data 126 first may be distributed into data subsets at each computing device included in a respective session, with each session distributing input unclassified data 126 in a similar manner among its computing devices. For example, if first worker session 306a includes three computing devices, input unclassified data 126 are distributed to each computing device of first worker session 306a that may or may not include a first session manager device 600a of first worker session 306a. $N_s^{th}$ worker session 306n similarly distributes input unclassified data 126 among the computing devices of nth worker session 306n so that each worker computing device has a subset of input unclassified data 126 stored thereon.

Evaluation list 514, model data 516, and selected model data 518 are created from results generated by worker system 306 executing model manager application 612 with input classified data 124 and input unclassified data subset 634. Model manager application 612 may coordinate generation of the classification model using model worker application 632 executing at the one or more session worker devices 620 assigned to the session with input classified data 124 and their allocated subset of input unclassified data 126 designated as input unclassified data subset 634. Session manager device 600 may or may not include input classified data 124 and a portion of input unclassified data 126 divided into input unclassified data subset 614. For example, session manager device 600 may coordinate the distribution of input unclassified data 126 with or without storing a portion of input unclassified data 126 on fourth computer-readable medium 608.

Referring again to FIG. 4, each user device 400 of user system 302 may include the same or different components and combination of components. Fewer, different, and additional components may be incorporated into user device 400. Second input interface 402 provides the same or similar functionality as that described with reference to input interface 102 of classification device 100 though referring to user device 400. Second output interface 404 provides the same or similar functionality as that described with reference to output interface 104 of classification device 100 though referring to user device 400. Second communication interface 406 provides the same or similar functionality as that described with reference to communication interface 106 of classification device 100 though referring to user device 400. Data and messages may be transferred between selection manager device 304 and user device 400 using second communication interface 406. Second computer-readable medium 408 provides the same or similar functionality as that described with reference to computer-readable medium 108 of classification device 100 though referring to user device 400. Second processor 410 provides the same or similar functionality as that described with reference to processor 110 of classification device 100 though referring to user device 400.

Classification model tuning application 422 performs operations associated with selecting a hyperparameter configuration for a classification model where the hyperparameter configuration defines a value for each hyperparameter used to train the classification model. The operations may be implemented using hardware, firmware, software, or any combination of these methods. Referring to the example embodiment of FIG. 4, classification model tuning application 422 is implemented in software (comprised of computer-readable and/or computer-executable instructions) stored in second computer-readable medium 408 and accessible by second processor 410 for execution of the instructions that embody the operations of classification model tuning application 422. Classification model tuning application 422 may be written using one or more programming languages, assembly languages, scripting languages, etc. Classification model tuning application 422 may be implemented as a Web application.

Referring again to FIG. 5, fewer, different, or additional components may be incorporated into selection manager device 304. Third input interface 502 provides the same or similar functionality as that described with reference to input interface 102 of classification device 100 though referring to selection manager device 304. Third output interface 504 provides the same or similar functionality as that described with reference to output interface 104 of classification device 100 though referring to selection manager device 304. Third communication interface 506 provides the same or similar functionality as that described with reference to communication interface 106 of classification device 100 though referring to selection manager device 304. Data and messages may be transferred between selection manager device 304 and/or user device 400 and session manager device 600 using third communication interface 506. Third computer-readable medium 508 provides the same or similar functionality as that described with reference to computer-readable medium 108 of classification device 100 though referring to selection manager device 304. Third processor 510 provides the same or similar functionality as that described with reference to processor 110 of classification device 100 though referring to selection manager device 304.

Selection manager application 512 performs operations associated with selecting sets of hyperparameter configurations to evaluate based on inputs provided by user device 400. Selection manager application 512 requests that the computing devices of worker system 306 generate a trained classification model for each hyperparameter configuration in the selected sets of hyperparameter configurations. The operations may be implemented using hardware, firmware, software, or any combination of these methods. Referring to the example embodiment of FIG. 5, selection manager application 512 is implemented in software (comprised of computer-readable and/or computer-executable instructions) stored in third computer-readable medium 508 and accessible by third processor 510 for execution of the instructions that embody the operations of selection manager application 512. Selection manager application 512 may be written using one or more programming languages, assembly languages, scripting languages, etc. Selection manager application 512 may be implemented as a Web application.

Referring again to FIG. 6A, fewer, different, and additional components may be incorporated into session manager device 600. Each session manager device 600 of each session of worker system 306 may include the same or different components or combination of components.

Fourth input interface 602 provides the same or similar functionality as that described with reference to input interface 102 of classification device 100 though referring to session manager device 600. Fourth output interface 604 provides the same or similar functionality as that described with reference to output interface 104 of classification device 100 though referring to session manager device 600. Fourth communication interface 606 provides the same or similar functionality as that described with reference to communication interface 106 of classification device 100 though referring to session manager device 600. Data and messages may be transferred between session manager device 600 and session worker device 620 using fourth communication interface 606. Fourth computer-readable medium 608 provides the same or similar functionality as that described with reference to computer-readable medium 108 of classification device 100 though referring to session manager device 600. Fourth processor 610 provides the same or similar functionality as that described with reference to processor 110 of classification device 100 though referring to session manager device 600.

Referring again to FIG. 6B, fewer, different, and additional components may be incorporated into session worker device 620. Each session worker device 620 of each session of worker system 306 may include the same or different components or combination of components.

Fifth input interface 622 provides the same or similar functionality as that described with reference to input interface 102 of classification device 100 though referring to session worker device 620. Fifth output interface 624 provides the same or similar functionality as that described with reference to output interface 104 of classification device 100 though referring to session worker device 620. Fifth communication interface 626 provides the same or similar functionality as that described with reference to communication interface 106 of classification device 100 though referring to session worker device 620. Data and messages may be transferred between session manager device 600 and session worker device 620 using fifth communication interface 626. Fifth computer-readable medium 628 provides the same or similar functionality as that described with reference to computer-readable medium 108 of classification device 100 though referring to session worker device 620. Fifth processor 630 provides the same or similar functionality as that described with reference to processor 110 of classification device 100 though referring to session worker device 620.

Model worker application 632 may be integrated with other analytic tools and may be integrated with model manager application 612 to generate a classification model using input classified data 124 and input unclassified data 126 distributed across the worker computing devices of each session. Classification model tuning application 422, selection manager application 512, model manager application 612, and/or model worker application 632 may be the same or different applications that are integrated in various manners to select a hyperparameter configuration for a classification model using input classified data 124 and input unclassified data 126 in a single computing device or a plurality of distributed computing devices. As an example, classification model tuning application 422, selection manager application 512, model manager application 612, and/or model worker application 632 may be integrated in a single computing device such as classification device 100. Classification model tuning application 422, selection manager application 512, model manager application 612, and/or model worker application 632 further may be part of an integrated data analytics software application and/or software architecture such as that offered by SAS Institute Inc. of Cary, N.C., USA. For example, classification model tuning application 422, selection manager application 512, model manager application 612, and/or model worker application 632 may be part of SAS® Enterprise Miner™ and/or SAS® Viya™ developed and provided by SAS Institute Inc. of Cary, N.C., USA that may be used to create highly accurate predictive and descriptive models based on analysis of vast amounts of data from across an enterprise. Merely for further illustration, classification model tuning application 422, selection manager application 512, model manager application 612, and/or model worker application 632 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Data Mining and Machine Learning, SAS® Visual Analytics, SAS In-Memory Statistics for Hadoop®, and SAS® Forecast Server, all of which are developed and provided by SAS Institute Inc. of Cary, N.C., USA. Data mining is applicable in a wide variety of industries.

Classification model tuning application 422, selection manager application 512, model manager application 612, and/or model worker application 632 may be used in a variety of industries. For example, a classification model trained using classification model tuning application 422, selection manager application 512, model manager application 612, and/or model worker application 632 may be used to recognize text, text meaning, a voice, speech, to recognize characteristics of images such as medical images, equipment diagnostic images, terrain images, etc., to recognize types of web pages, to predict whether or not an event has occurred, such as an equipment failure, to classify a microarray gene expression, etc. Classification model tuning application 422, selection manager application 512, model manager application 612, and/or model worker application 632 may automatically process data generated as part of operation of an enterprise, facility, system, device, etc., to classify the data and possibly provide a warning or alert associated with the classification using, for example, second input interface 402, second output interface 404, and/or second communication interface 406 so that appropriate action can be initiated in response to the labeling, recognition, or classification. For example, medical images that include a tumor may be recognized in input unclassified data 126 that triggers the sending of a notification message to a clinician that a tumor has been identified based on a "tumor" label determined for the image data.

Figure 7:
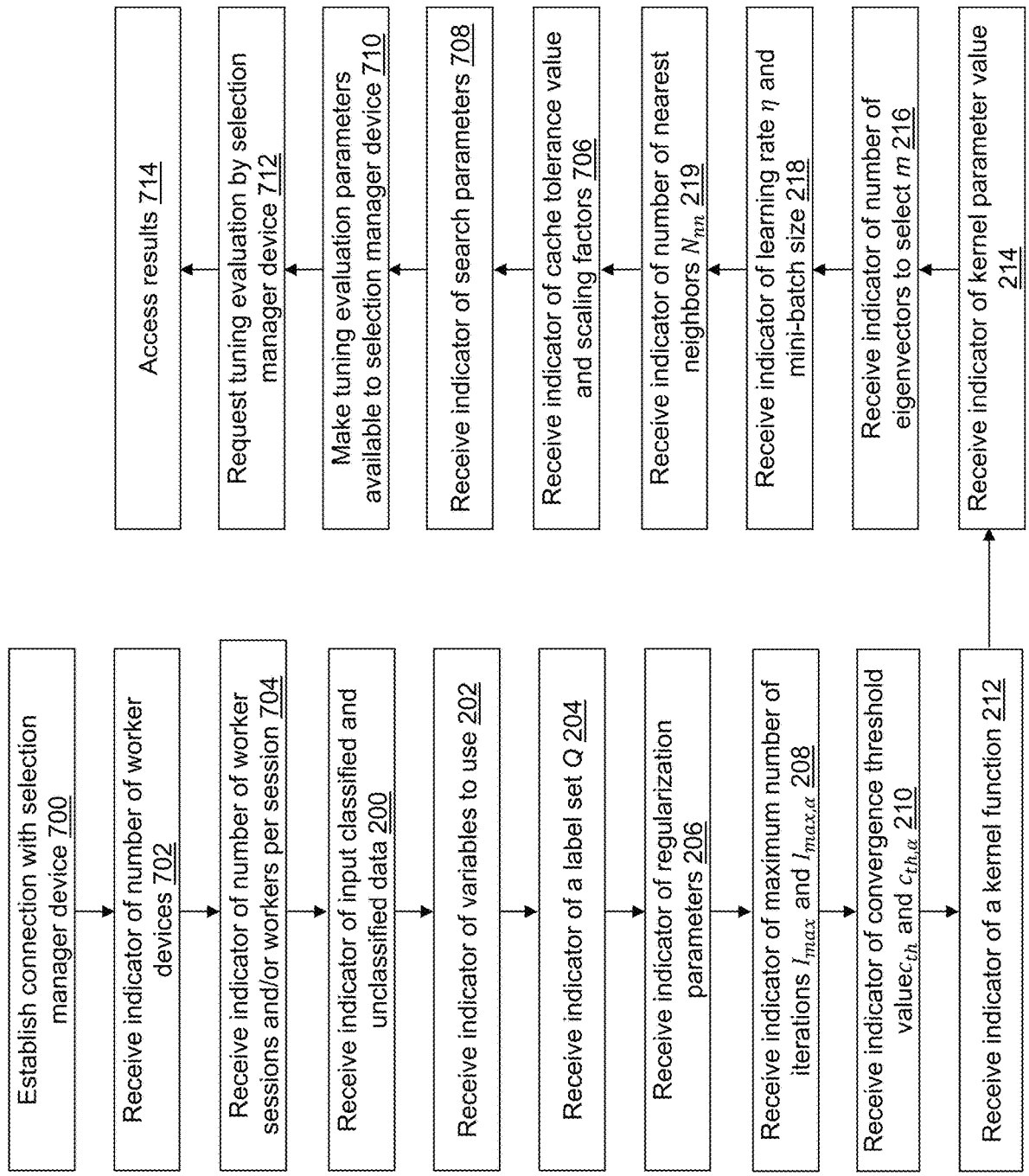
FIG. 7 depicts a flow diagram illustrating examples of operations performed by the user device of FIG. 4 in accordance with an illustrative embodiment.

Referring to FIG. 7, example operations associated with classification model tuning application 422 are described. Additional, fewer, or different operations may be performed depending on the embodiment. The order of presentation of the operations of FIG. 7 is not intended to be limiting. A user can interact with one or more user interface windows presented to the user in display 416 under control of classification model tuning application 422 independently or through a browser application in an order selectable by the user. Although some of the operational flows are presented in sequence, the various operations may be performed in various repetitions, concurrently, and/or in other orders than those that are illustrated. For example, a user may execute classification model tuning application 422, which causes presentation of a first user interface window, which may include a plurality of menus and selectors such as drop-down menus, buttons, text boxes, hyperlinks, etc. associated with classification model tuning application 422 as understood by a person of skill in the art.

In an operation 700, a connection is established with selection manager device 304. User device 400 accepts commands from a user and relays necessary instructions to selection manager device 304.

In an operation 702, a twelfth indicator may be received that indicates a value of $N_w$, the number of computing devices or nodes of worker system 306 that may include selection manager device 304 (for example, the same or another indicator may indicate whether or not to include selection manager device 304 or it may or may not be included by default). The twelfth indicator may further indicate whether selection manager device 304 is configured in a single-machine mode or a distributed mode. In an alternative embodiment, the twelfth indicator may not be received. For example, a default value may be stored, for example, in computer-readable medium 408 and used automatically. In another alternative embodiment, $N_w$ may not be selectable. Instead, a fixed, predefined value may be used. The value further may be automatically determined based on a number of computing devices connected to selection manager device 304.

Single-machine mode is a computing model in which multiple processors or multiple cores are controlled by a single operating system and can access shared resources, such as disks and memory. Single-machine mode refers to an application running multiple concurrent threads on a multi-core machine to take advantage of parallel execution on selection manager device 304. More simply, single-machine mode means multithreading on selection manager device 304. Single-machine mode uses the number of CPUs (cores) on selection manager device 304 to determine the number of concurrent threads. For example, one thread per core may be used though a number of threads on any computing device may be changed under control of the user. A grid host may be specified for a distributed mode and identify a domain name system (DNS) or IP address of selection manager device 304, when selection manager device 304 is a separate device from user device 400.

In an operation 704, a thirteenth indicator may be received that indicates the value of $N_s$, the number of the one or more sessions, and/or the value of M, the number of computing devices included in each session. Within each session, each computing device of that session may also use multiple threads. In an alternative embodiment, the thirteenth indicator may not be received. For example, default values may be stored, for example, in computer-readable medium 608 and used automatically. In another alternative embodiment, M or $N_s$ may not be selectable. Instead, a fixed, predefined value may be used. The value(s) further may be automatically determined based on W and other criteria as described further below such that the user does not specify either or only one of $N_s$ the number of the one or more sessions and M the number of computing devices included in each session.

Similar to classification device 100, user device 400 may request values to define the various input parameters/hyperparameters of operations 200 through 219. One or more values may be input for each hyperparameter such as the Gaussian bandwidth parameter s, the number of eigenvectors to select m, the first regularization parameter value $\lambda_4$, the second regularization parameter value $\lambda_2$, the third regularization parameter value $\lambda_3$, and the fourth regularization parameter value $\lambda_4$. The one or more values for each hyperparameter may be used to search for optimum hyperparameter values by selection manager device 304. For example, one or more values for s may be received. Alternatively, one or more default values for s may be stored, for example, in second computer-readable medium 408 and used automatically. In another alternative embodiment, the one or more values of s may not be selectable. Instead, one or more fixed, predefined values may be used. The one or more values of s may be defined in various manners such as using a list of possible values or using a minimum s value, a maximum s value, and an s step value. For example, a list of s values may be defined that includes the minimum s value and each subsequent value adding the s step value up to and including the maximum s value.

In an operation 706, a fourteenth indicator may be received that defines a cache tolerance value and a scaling factor value for each hyperparameter. The cache tolerance value is used to determine when a subsequent hyperparameter configuration is "close enough" to a previously executed configuration to not repeat execution with the subsequent hyperparameter configuration. The scaling factor value for each hyperparameter is used to scale the hyperparameters relative to each other. In an alternative embodiment, the fourteenth indicator may not be received. For example, a default value may be stored, for example, in second computer-readable medium 408 and used automatically. An illustrative default value for the cache tolerance value is 1.0e-9. An illustrative default value for the scaling factor value for each hyperparameter is one. In another alternative embodiment, the cache tolerance value and the scaling factor value for each hyperparameter may not be selectable. Instead, fixed, predefined values may be used.

In an operation 708, a fifteenth indicator may be received that defines values for one or more search parameters associated with a tuning search method. For example, a maximum number of configuration evaluations $n_b$, a population size $n_p$, a number of centers $n_c<n_p$, an initial step size value $\Delta$, and/or a decrease criterion value $\beta \in (0,1)$, etc. may be defined by the sixteenth indicator. The tuning search method may be "Grid" to execute a grid search. Other search methods such as those described in U.S. Pat. No. 10,360,517 may be used in alternative embodiments. For example, the tuning search method may be "LHS+GA/GSS" in which a Latin hypercube sampling (LHS) search method is used to generate a first set of hyperparameter configurations that are each executed to generate a cost function value. The cost function values and the hyperparameter configuration associated with each are used to initialize a genetic algorithm (GA). Each population of the GA search method may be enhanced with a "growth step" in which a genetic set search (GSS) search method is used to locally improve some of the more promising members of the GA population.

For illustration, the LHS search method generates uniform hyperparameter values across the range of each the one or more values of each hyperparameter and randomly combines them across hyperparameters. If the hyperparameter is continuous or discrete with more levels than a requested sample size, a uniform set of samples is taken across the hyperparameter range including a lower and an upper bound. If the hyperparameter is discrete with fewer levels than the requested sample size, each level is repeated an equal number of times across the set of hyperparameter configurations determined by the LHS search method. If a last set of hyperparameter configurations is less than the number of levels, the last set of values for the hyperparameter is uniformly sampled across the set of levels given the remaining set size. The samples for each hyperparameter are randomly shuffled so that the combination of hyperparameters is random—the first values for each hyperparameter are combined, followed by all the second values, etc. This LHS search method ensures that the lower and upper bounds of the hyperparameter tuning range are included, and for discrete hyperparameters with a number of levels less than the requested sample size, the levels are sampled evenly with the possible exception of the last set of values when the number of samples is not evenly divisible by the number of levels. Otherwise, with random selection from n bins, when the number of levels is much less than the requested sample size, the level values are likely to not be sampled uniformly.

For illustration, the GA search method defines a family of local search algorithms that seek optimal solutions to problems by applying the principles of natural selection and evolution. Members of a current generation that have passed a selection process either go to a crossover operator or are passed unchanged into the next generation based on a pre-defined crossover probability. Members of the current generation that have passed the cross-over process either go to a mutation operator or are passed unchanged into the next generation based on a pre-defined mutation probability.

For illustration, the GSS search method is designed for problems that have continuous variables and have the advantage that, in practice, they often require significantly fewer evaluations to converge than does a GA search method. Furthermore, a GSS search method can provide a measure of local optimality that is very useful in performing multimodal optimization. The GSS search method may add additional "growth steps" to the GA search method whenever the hyperparameter is a continuous variable. For example, a local search selection may include a small subset of hyperparameter values selected based on their fitness score and distance to other hyperparameter values and on pre-existing locally optimal hyperparameter values. A local search optimization may be applied such that the lower and upper bounds of the hyperparameter are modified to temporarily fix integer hyperparameters to their current setting. These additional growth steps may be performed each iteration to permit selected hyperparameter configurations of the population (based on diversity and fitness) to benefit from local optimization over the continuous variables.

In an operation 710, the tuning evaluation parameters that may include the parameters indicated in operations 702 through 708 and 200 through 219 are made available to selection manager device 304. For example, the values of any of the parameters that are not default values may be sent to selection manager device 304. As another option, a location of the values of any of the parameters that are not default values may be sent to selection manager device 304. As still another option, a location of the values of any of the parameters that are not default values may be provided to selection manager device 304 in a computer memory location that is known to selection manager device 304.

In an operation 712, a tuning evaluation to select hyperparameters is requested of selection manager device 304 using the tuning evaluation parameters.

In an operation 714, tuning evaluation results are accessed. For example, an indicator may be received that indicates that the tuning process is complete. For example, one or more output tables may be presented on second display 416 when the tuning process is complete. As another option, second display 416 may present a statement indicating that the tuning process is complete. The user can access the output tables in the specified location. For example, the user can select the hyperparameters included in a "Best Configuration" output table.

Figure 8A:
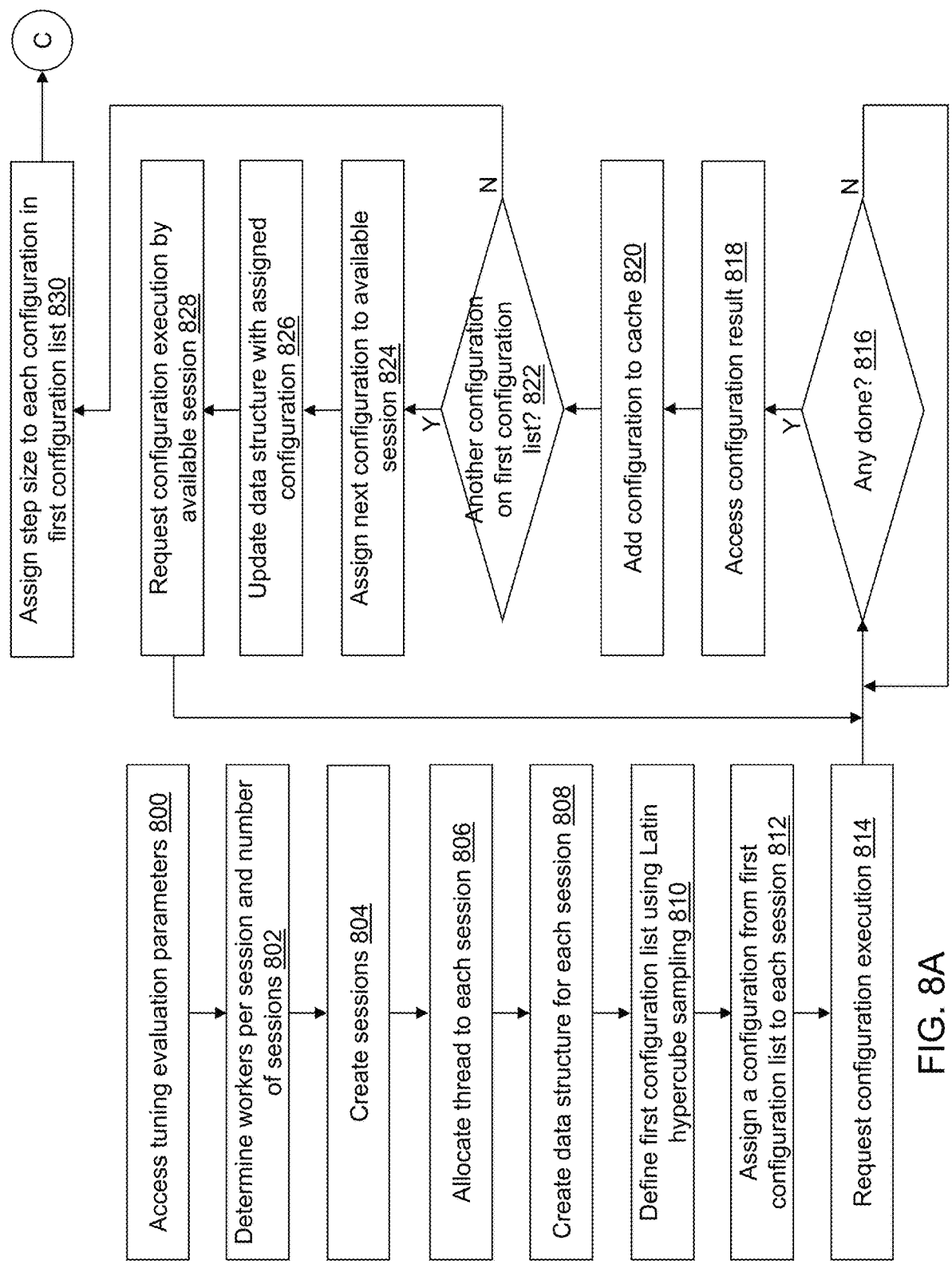
FIGS. 8A to 8C depict a flow diagram illustrating examples of operations performed by the selection manager device of FIG. 5 in accordance with an illustrative embodiment.
Figure 8B:
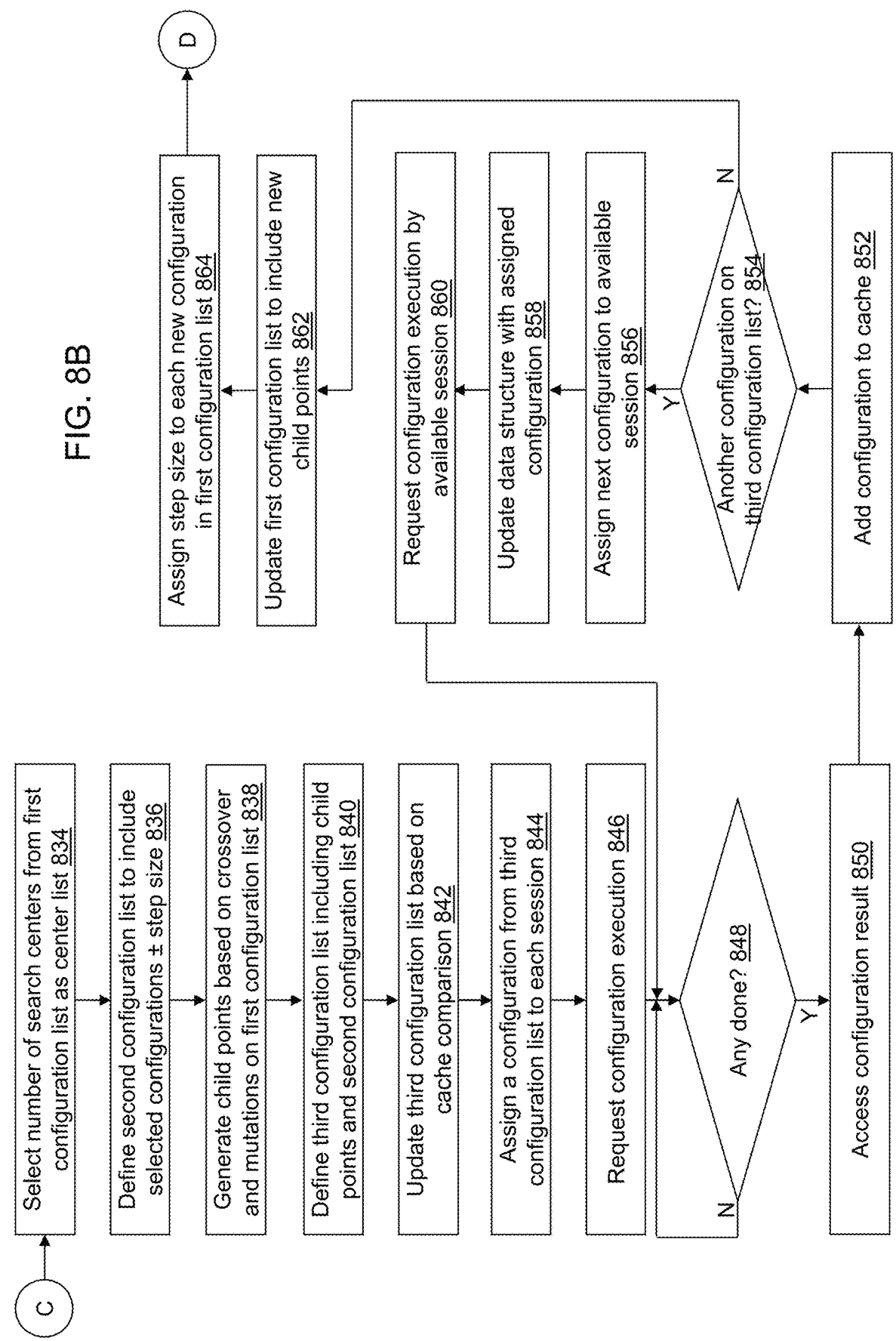
Figure 8C:
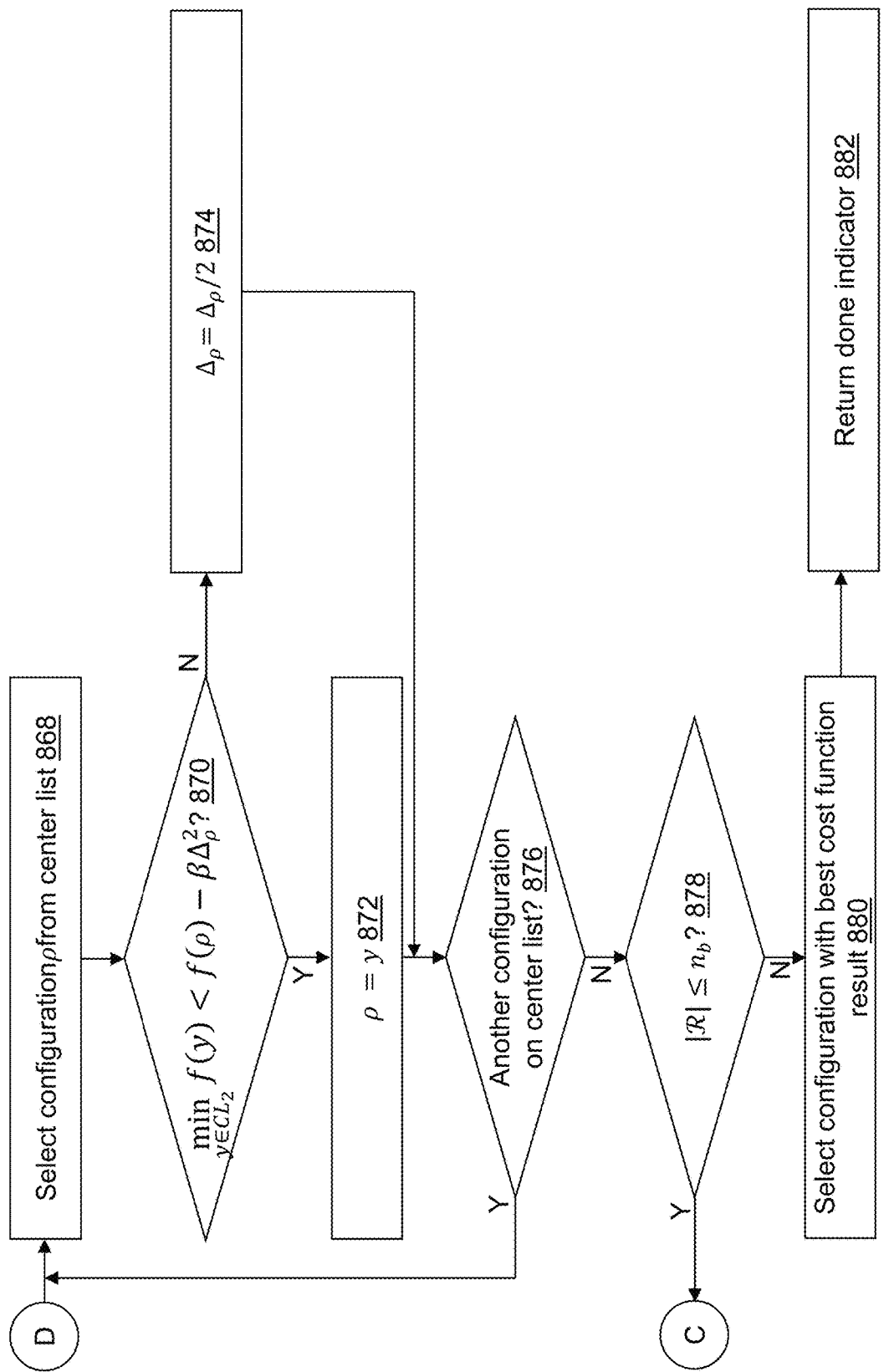

Referring to FIGS. 8A, 8B, and 8C, example operations associated with selection manager application 512 are described. Additional, fewer, or different operations may be performed depending on the embodiment. The order of presentation of the operations of FIGS. 8A, 8B, and 8C is not intended to be limiting. Selection manager device 304 establishes communication with the computing devices of worker system 306, sends instructions to each session manager device 600 associated with each session established by selection manager device 304, collects and aggregates the results of computations from each session, and communicates final results to user device 400. Selection manager device 304 may utilize itself as a worker computing device of worker system 306. The computing devices of worker system 306 receive instructions from selection manager device 304, store and process data, and send the results of computations back to selection manager device 304 under control of session manager device 600 associated with each session. The worker computing devices of each session may also communicate to each other directly to complete tasks.

In an operation 800, tuning evaluation parameters obtained by classification model tuning application 422 are accessed. For example, values for parameters indicated in operations 702 through 708 and 200 through 219 and made available to selection manager device 304 in operation 710 are accessed.

In an operation 802, the number of workers per session M and the number of sessions $N_s$ are determined. For example, when the second indicator specifies $N_s$, that value is used for the number of sessions, or when the second indicator specifies M, that value is used for the number of workers per session. If $N_w$ is equal to all of the workers that are connected to selection manager device 304 and there are at least 16 worker computing devices included in worker system 306, $N_s$ may be limited to eight so that the number of workers per session M is at least two.

Optionally, the thirteenth indicator may indicate that M is set based on a size of input classified data 124 and input unclassified data 126. For example, M may be set based on a number of rows r and a number of columns c of input classified data 124 and input unclassified data 126 and a distribution factor d. For illustration, M=1+rqp. An illustrative value of $p=2e^{-8}$ may be used so that another session worker device 620 is added to each session for every 50 million data values. The value of p may be selected by a user of user device 400. The number of columns q further may be the number of variables to use instead of a total number of columns. The number of rows r further may be the number of rows to include in input unclassified data 126.

$N_3$ may be determined as one less than a population size specified for the GA tuning search method because one hyperparameter configuration is carried forward each iteration. The best point is carried forward so that if the next iteration does not find an improvement, the returned set of evaluations still includes the current best for consideration in generating the next iteration of hyperparameter configurations. For the GSS tuning search method, twice the number of hyperparameters is added to the value of $N_s$. For the LHS tuning search method, M is determined as one less than a sample size. $N_s$ may then be limited by a configuration of selection manager device 304. When selection manager device 304 is configured in single-machine mode and $N_s$ is greater than four and not specified by the thirteenth indicator, $N_s$ is limited to four. When selection manager device 304 is configured in single-machine mode and $N_s$ is specified by the thirteenth indicator, $N_s$ may be limited to 32 or a number of threads of selection manager device 304. When selection manager device 304 is configured in distributed mode, and $N_s$ is not specified by the thirteenth indicator, $N_s \leq N_w/M$ may be used. When selection manager device 304 is configured in distributed mode and M is specified by the thirteenth indicator, $N_s \leq 2N_w/M$ may be applied.

For illustration, if a population size specified for a GA search method is ten, even if $N_w=100$ and M=2 based on a size of input classified data 124 and input unclassified data 126, $N_s=10$ instead of $N_s=50$ because the GA population size (number of hyperparameter configurations created each iteration by the GA search method) limits the number of hyperparameter configurations created each iteration.

When $N_s$ is greater than one and M is equal to one, selection manager application 512 is executed in a model parallel mode; when M is greater than one and $N_s$ is equal to one, selection manager application 512 is executed in a data parallel mode; and when both M and $N_s$ are greater than one, selection manager application 512 is executed in a data and model parallel mode. In an automatic mode, $N_s$ may be selected to be as large as possible with M as small as possible subject to the size of input classified data 124 and input unclassified data 126 because model parallel is more efficient than data parallel.

In an operation 804, the number of sessions $N_s$ are created to include the number of workers per session M with session manager device 600 selected for each created session. Input unclassified data 126 are randomly allocated to each session to define input unclassified data subset 614 and/or input unclassified data subset 634. A copy of input classified data 124 is provided to each session as well.

In an operation 806, a thread is allocated from an available thread pool to each created session. The allocated threads each manage the communications between selection manager device 304 and each session manager device 600.

In an operation 808, a data structure is created for each session through which each session is notified of the hyperparameter values for the assigned hyperparameter configuration, etc. A hyperparameter configuration includes a value for each hyperparameter such as a value for each of the Gaussian bandwidth parameter s, the number of eigenvectors to select m, the first regularization parameter value $\lambda_1$, the second regularization parameter value $\lambda_2$, the third regularization parameter value $\lambda_3$, and the fourth regularization parameter value $\lambda_4$. An illustrative data structure includes a thread identifier that links the data structure to each thread, a session handle for the thread, a parameter list, the hyperparameter configuration assigned to the thread, a completion indicator, etc. The session handle contains information about the session that was started in a new process to run actions.

In an operation 810, the first configuration list is defined using LHS and its associated parameters. The first configuration list includes a plurality of hyperparameter configurations where each hyperparameter configuration includes a value for each hyperparameter to evaluate $\{s, m, \lambda_1, \lambda_2, \lambda_3, \lambda_4\}$. A set of hyperparameter configurations includes a plurality of hyperparameter configurations selected for evaluation before a next set of hyperparameter configurations is selected for evaluation based on the tuning search method and the cost function values computed for each hyperparameter configuration.

In an operation 812, a single configuration is selected from the first configuration list and assigned to each created session by loading the values in the data structure associated with the selected session. Depending on the number of created sessions $N_s$ relative to the number of configurations included on the first configuration list, all of the configurations defined in the first configuration list may be assigned or less than all of the configurations may be assigned.

Figure 9:
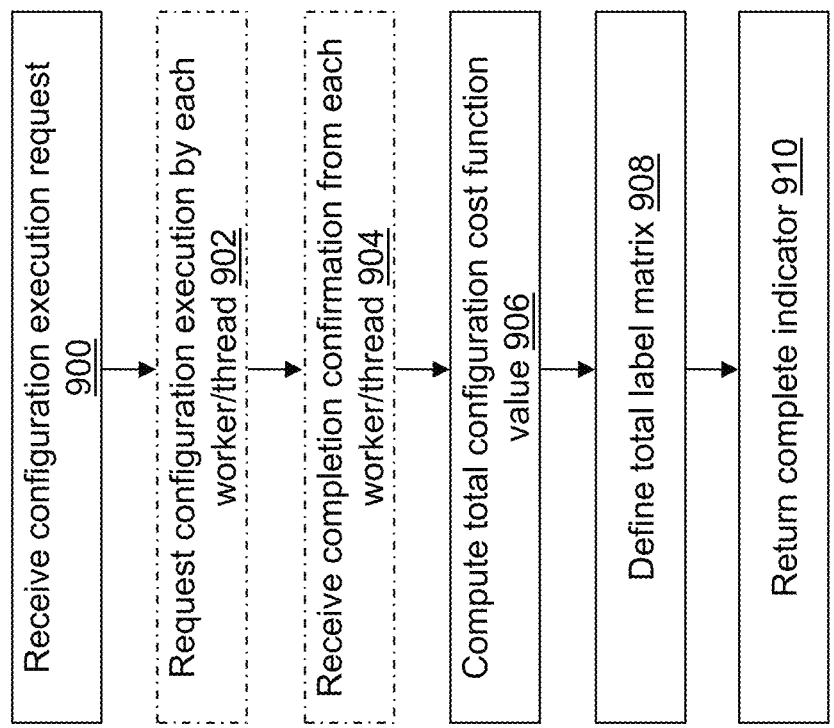
FIG. 9 depicts a flow diagram illustrating examples of operations performed by the session manager device of FIG. 6A in accordance with an illustrative embodiment.

In an operation 814, each session is requested to execute its assigned hyperparameter configuration based on the parameter values in the data structure. The handle to the session process stored in the data structure associated with the selected session may be used to make this request or call. FIG. 9 describes the operations performed by each session in response to the request configuration execution request.

In an operation 816, a determination is made concerning whether or not any execution is done. For example, session manager device 600 may set the completion indicator to indicate done in the data structure associated with it. If no execution is done, processing continues in operation 816 until indication that a session is done is received. If any execution is done, processing continues in an operation 818. For illustration, selection manager device 304 loops through each of its thread handles, checking to see if that particular thread is busy or free. When a session finishes evaluating its assigned hyperparameter configuration, session manager device 600 returns the computed values back to selection manager device 304 and sets its completion indicator indicating that it is free to receive a new hyperparameter configuration for evaluation.

In operation 818, results from the configuration execution are accessed in association with the set of hyperparameter values defined in the configuration assigned to the session that has completed its computations. For example, a cost function value C and label vector Y may be accessed using the data structure.

In an operation 820, the results including the cost function value and set of hyperparameter values defined for the assigned hyperparameter configuration may be stored in evaluation list 514. The cost function value and label vector Y may be stored in model data 516 in association with the set of hyperparameter values.

In an operation 822, a determination is made concerning whether or not the first configuration list includes another hyperparameter configuration to evaluate that has not been assigned to a session. If the first configuration list includes another hyperparameter configuration to evaluate, processing continues in an operation 824. If the first configuration list does not include another hyperparameter configuration to evaluate, processing continues in an operation 830.

In operation 824, a next hyperparameter configuration is selected from the first configuration list and assigned to the now free session.

In operation 826, the data structure associated with the now free session is updated to include the next assigned hyperparameter configuration.

In an operation 828, a request is sent to session manager device 600 associated with the now free session to execute model manager application 612 with the hyperparameter configuration included in the data structure, and processing continues in operation 816 to continue to monitor for sessions that have completed their assigned hyperparameter configuration evaluation.

In operation 830, a step size is assigned to each configuration included in the first configuration list using the initial step size value $\Delta$, and processing continues in an operation 834 shown referring to FIG. 8B.

In operation 834, a number of search centers n, is selected from the first configuration list to define a center list. Similar to the first configuration list, the center list includes a plurality of hyperparameter configurations where each hyperparameter configuration includes a value for each hyperparameter to evaluate such as $\{s, m, \lambda_1, \lambda_2, \lambda_3, \lambda_4\}$. The center list includes n, number of configurations randomly selected from first configuration list.

In an operation 836, a second configuration list is defined that includes $\rho+\Delta_\rho \xi_i$ and $\rho-\Delta_\rho \xi_i$, where p is each configuration on the center list, $\Delta_p$ is the step size value assigned to the $\rho^{th}$ configuration, and $\xi_i$ is a predefined decay parameter used in machine learning for optimization. An illustrative value for $\xi_i$=0.95 such that, as the iteration increases, the search step size becomes smaller to identify an optimal solution.

In an operation 838, child points are generated based on crossover and mutations of the configurations on the first configuration list using the GA search method and its associated parameters and a cost function value computed from each configuration execution. For example, a paper by Koch et al., *Autotune: A Derivative-free Optimization Framework for Hyperparameter Tuning* KDD 2018 (Aug. 2, 2018) describes a process for generating child points. Each child point is a new configuration of hyperparameter values that includes a value for each hyperparameter to evaluate $\{s, m, \lambda_1, \lambda_2, \lambda_3, \lambda_4\}$.

In an operation 840, a third configuration list is defined that includes the configurations defined by the child points and included in the second configuration list.

In an operation 842, the third configuration list is updated based on a comparison of each hyperparameter configuration included in the third configuration list with each hyperparameter configuration included in evaluation list 514. For example, each hyperparameter configuration in the third configuration list is compared to previously evaluated hyperparameter configurations to determine if they are "close enough" to hyperparameter configuration values that have already been evaluated, where "close enough" is evaluated based on the cache tolerance value. If so, the hyperparameter configuration is removed from the first configuration list to avoid expending computing resources reevaluating a too similar hyperparameter configuration. The cost function value of the "close" point may be defined as the cost function value of the point removed from the first configuration list in evaluation list 514.

Similar to operation 812, in an operation 844, a single configuration is selected from the third configuration list and assigned to each created session by loading the values in the data structure associated with the selected session.

Similar to operation 814, in an operation 846, each session is requested to execute its assigned hyperparameter configuration based on the parameter values in the data structure. The handle to the session process stored in the data structure associated with the selected session may be used to make this request or call.

Similar to operation 816, in an operation 848, a determination is made concerning whether or not any execution is done. If no execution is done, processing continues in operation 848 until indication that a session is done is received. If any execution is done, processing continues in an operation 850.

Similar to operation 818, in operation 850, results including the cost function value and label vector Y computed from the hyperparameter configuration execution are accessed in association with the set of hyperparameter values defined in the configuration assigned to the session that has completed its computations.

Similar to operation 820, in an operation 852, the results including the cost function value and set of hyperparameter values defined for the assigned hyperparameter configuration may be stored in evaluation list 514. The cost function value and label vector Y may be stored in model data 516 in association with the set of hyperparameter values.

Similar to operation 822, in an operation 854, a determination is made concerning whether or not the third configuration list includes another hyperparameter configuration to evaluate that has not been assigned to a session. If the third configuration list includes another hyperparameter configuration to evaluate, processing continues in an operation 856. If the third configuration list does not include another hyperparameter configuration to evaluate, processing continues in an operation 862.

Similar to operation 824, in operation 856, a next hyperparameter configuration is selected from the third configuration list and assigned to the now free session.

Similar to operation 826, in an operation 858, the data structure associated with the now free session is updated to include the next assigned hyperparameter configuration.

Similar to operation 828, in an operation 860, a request is sent to session manager device 600 associated with the now free session to execute model manager application 612 with the hyperparameter configuration included in the data structure, and processing continues in operation 848 to continue to monitor for sessions that have completed their assigned hyperparameter configuration evaluation.

In operation 862, child points are generated based on crossover and mutations of the configurations on the first configuration list using the GA/GSS search method and its associated parameters. The first configuration list is updated to include the generated child points.

Similar to operation 830, in an operation 864, a step size is assigned to each configuration included in the first configuration list using the initial step size value Δ, and processing continues in an operation 868 shown referring to FIG. 8C.

In operation 868, a hyperparameter configuration ρ is selected from the center list.

In an operation 870, a determination is made concerning whether $$\min_{y \in \mathcal{T}_\rho} f(y) < f(\rho) - \beta \Delta_\rho^2,$$

where y is a hyperparameter configuration selected from the second configuration list indicated by $\mathcal{T}_\beta$, and β is the decrease criterion value. If $$\min_{y \in \mathcal{T}_\rho} f(y) < f(\rho) - \beta \Delta_\rho^2,$$

processing continues in an operation 872. If $$\min_{y \in \mathcal{T}_\rho} f(y) \geq f(\rho) - \beta \Delta_\rho^2,$$

$f(\rho) - \beta \Delta_\rho^2$ processing continues in an operation 874.

In operation 872, the pattern search about hyperparameter configuration ρ has been successful, and ρ=y such that the hyperparameter configuration ρ is replaced with hyperparameter configuration y in the center list.

In operation 874, the pattern search about hyperparameter configuration p was unsuccessful, and $\Delta_p = \Delta_p/2$ such that the step size for hyperparameter configuration p is reduced by half.

In an operation 876, a determination is made concerning whether or not the center list includes another hyperparameter configuration. If the center list includes another hyperparameter configuration, processing continues in operation 868. If the center list does not include another hyperparameter configuration, processing continues in an operation 878.

In operation 878, a determination is made concerning whether $|\mathcal{R}| \leq n_b$, where $|\mathcal{R}|$ indicates a number of hyperparameter configurations included on evaluation list 514, and $n_b$ is a number of hyperparameter configurations budgeted for processing. If $|\mathcal{R}| \leq n_b$, processing continues in operation 834 to process additional hyperparameter configurations. If $|\mathcal{R}| > n_b$, processing continues in an operation 880.

In operation 880, the hyperparameter configuration that resulted in the smallest cost function value is selected from evaluation list 514 and is indicated as an optimized hyperparameter configuration $\{s°, m°, \lambda_1°, \lambda_2°, \lambda_3°, \lambda_4°\}$ that may be stored in selected model data 518 or returned to user device 400 in some other manner. The optimized label vector Y° may be extracted from model data 516 based on identification of the label vector Y associated with the optimized hyperparameter configuration $\{s°, m°, \lambda_1°, \lambda_2°, \lambda_3°, \lambda_4°\}$ and stored in selected model data 518 or returned to user device 400 in some other manner.

The observation vectors in input classified data 124 and/or input unclassified data subset 614 and/or input unclassified data subset 634 may further be stored in selected model data 518 in association with a respective value for the target variable included in the optimized label vector Y°. The optimized label vector Y° includes a label or class defined for each observation vector included in input unclassified data 126. $\{s°, m°, \lambda_1°, \lambda_2°, \lambda_3°, \lambda_4°\}$ are the selected hyperparameters for classifying input unclassified data subset 614 and/or input unclassified data subset 634.

In an alternative embodiment, the label vector Y may not be stored in association with each hyperparameter configuration. Instead, a session may be requested to execute with the optimized hyperparameter configuration $\{s°, m°, \lambda_2°, \lambda_3°, \lambda_4°\}$ and return or store its computed label vector Y as the optimized label vector Y°.

In an operation 882, an indicator that processing is complete may be returned to user device 400.

Referring to FIG. 9, example operations associated with model manager application 612 that are performed by session manager device 600 in executing a hyperparameter configuration to compute the cost function value and label vector Y are described. Additional, fewer, or different operations may be performed depending on the embodiment. The order of presentation of the operations of FIG. 9 is not intended to be limiting.

In an operation 900, a request for execution is received from selection manager device 304. The data describing the process including the hyperparameter configuration assigned are accessed. For example, data in the data structure associated with the thread are accessed. Alternatively, the values may be included with the request or provided in other manners to the session. The request may be received as a result of execution of any of operations 814, 828, 846, or 860.

In an operation 902, each session worker device 620 associated with the respective session manager device 600 is requested to execute the assigned hyperparameter configuration based on the parameter values in the data structure and the observations stored in input classified data 124 and input unclassified data subset 634 distributed to each session worker device 620 of the respective session. As discussed above, session manager device 600 may also act as a session worker device 620 and execute the assigned hyperparameter configuration and the observations stored in input classified data 124 and input unclassified data subset 614.

In operation 904, results from the configuration execution at each session worker device 620 are received. For example, a cost function value $C_{sw}$ and a label vector $Y_{sw}$ may be received from each session worker device 620 that may include session manager device 600.

In an operation 906, a total cost function value is computed using $C = \sum_{i=1}^{M} C_{sw,i}$.

In an operation 908, each of the unclassified observation vectors in input unclassified data 126 is classified by concatenating each label vector $Y_{sw}$ received from session worker devices 620 to define label vector Y in the original order stored in input unclassified data 126.

In an operation 910, a completion indicator of the data structure is set to notify selection manager device 304 that processing of the hyperparameter configuration is complete. The total cost function value and/or defined label vector Y are made available to selection manager device 304, for example, by including them in the data structure and/or updating a globally accessible table.

Figure 10A:
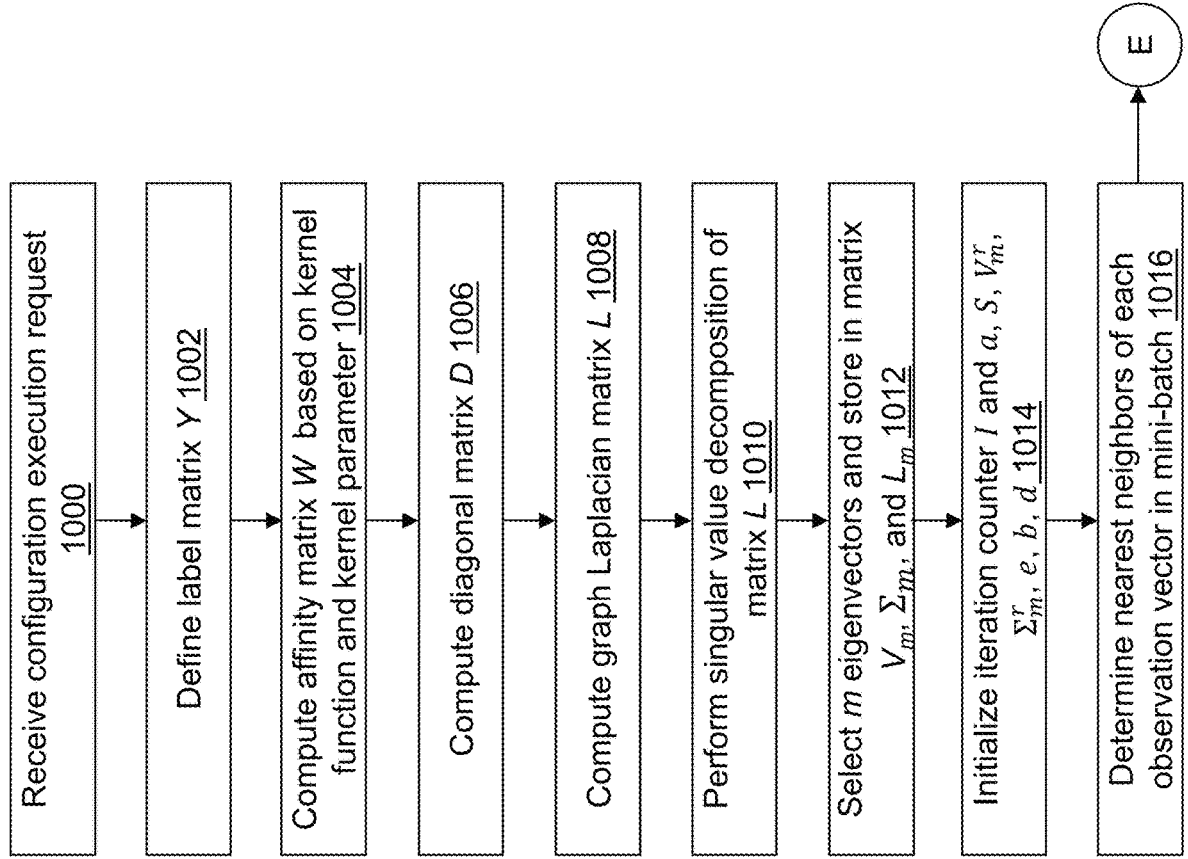
FIGS. 10A, 10B, and 10C depict a flow diagram illustrating examples of operations performed by the session worker device of FIG. 6B in accordance with an illustrative embodiment.
Figure 10B:
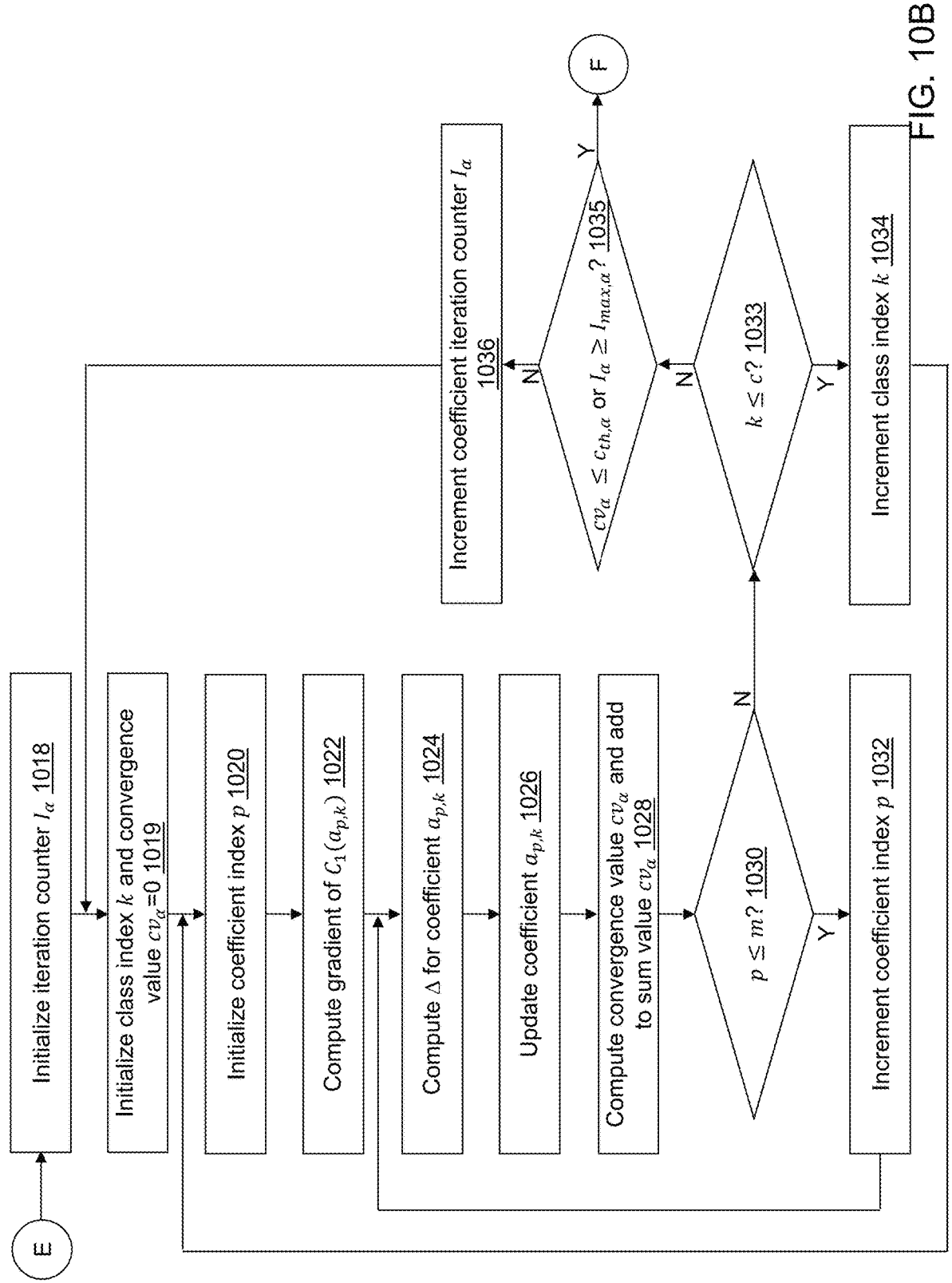
Figure 10C:
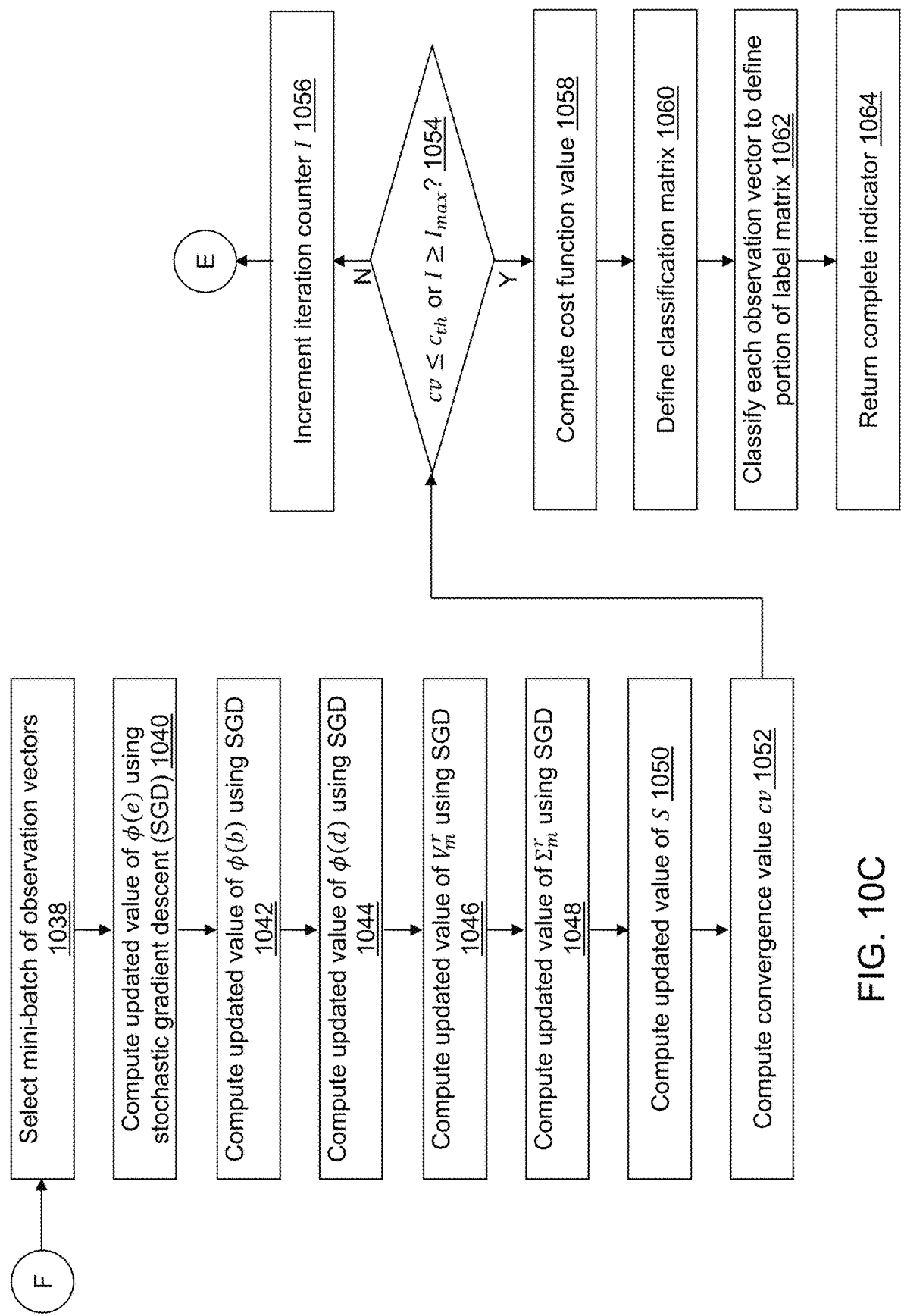

Referring to FIGS. 10A, 10B, and 10C, example operations associated with model worker application 632 in executing a hyperparameter configuration to compute the cost function value $C_{sw}$ and label vector $Y_{sw}$, are described. Additional, fewer, or different operations may be performed depending on the embodiment. The order of presentation of the operations of FIGS. 10A, 10B, and 10C is not intended to be limiting.

In an operation 1000, a request for execution is received from session manager device 600. The data describing the process including the hyperparameter configuration may be received with the request or accessed in another manner such as in a known memory location.

Similar to operation 220, in an operation 1002, label vector $Y_{sw}$ is defined from input classified data 124 and input unclassified data subset 614 or input unclassified data subset 634.

Similar to operation 222, in an operation 1004, an affinity matrix W is computed based on the kernel function and the kernel parameter value indicated in operations 212 and 214.

Similar to operation 224, in an operation 1006, a diagonal matrix D is computed based on the affinity matrix W.

Similar to operation 226, in an operation 1008, a normalized graph Laplacian matrix L is computed based on the affinity matrix W and the diagonal matrix D.

Similar to operation 227, in an operation 1010, a singular value decomposition of the normalized graph Laplacian matrix L is performed to define eigenvectors with associated eigenvalues.

Similar to operation 228, in an operation 1012, m eigenvectors having the smallest eigenvalues are selected from the singular value decomposition V and stored in a matrix $V_m$, m eigenvectors having the smallest eigenvalues are selected from the diagonal matrix E and stored in a matrix $\Sigma_m$. $V_i$ indicates an $i^{th}$ eigenvector of V, and $L_m = V_m \Sigma_m V_m^\tau$ is further stored.

Similar to operation 230, in an operation 1014, an iteration counter I is initialized, for example, as I=1, the plurality of sparse coefficients α are each initialized, for example, to zero values, where α is an m×1 vector. S, $V_m^r$, and $\Sigma_m^r$ are each initialized to the identity matrix. e, b, d are each initialized to a unit vector, a unit vector, and an identity matrix, respectively.

Similar to operation 231, in an operation 1016, the $N_{nn}$ nearest neighbors are determined for each observation vector. Referring to FIG. 10B, processing continues in an operation 1018.

Similar to operation 232, in an operation 1018, a coefficient iteration counter $I_\alpha$ is initialized, for example, as $I_\alpha$=1.

Similar to operation 233, in an operation 1019, a class index k is initialized, for example, as k=1, and a convergence value $cv_\alpha$ is initialized, for example, as $cv_\alpha$=0.

Similar to operation 234, in an operation 1020, a coefficient index p is initialized, for example, as p=1.

Similar to operation 236, in an operation 1022, a gradient of $C_1(\alpha_{p,k})$ is computed with respect to the coefficient $\alpha_{p,k}$.

Similar to operation 238, in an operation 1024, a difference value $\Delta_{p,k}$ is computed for coefficient $\alpha_{p,k}$.

Similar to operation 240, in an operation 1026, coefficient $\alpha_{i,k}$ is updated.

Similar to operation 242, in an operation 1028, a coefficient convergence value $cv_\alpha$ is computed.

Similar to operation 244, in an operation 1030, a determination is made concerning whether there is another coefficient of the sparse coefficients of the $k^{th}$ class to update, for example, using p≤m. If p≤m, processing continues in an operation 1032. If p>m, processing continues in an operation 1033.

Similar to operation 246, in operation 1032, the coefficient index p is incremented, for example, as p=p+1, and processing continues in operation 1024 to process the next coefficient.

Similar to operation 247, in operation 1033, a determination is made concerning whether there is another class for which to update the sparse coefficients, for example, using k≤c. If k≤c, processing continues in an operation 1034. If k>c, processing continues in an operation 1035.

Similar to operation 248, in operation 1034, the class index k is incremented, for example, as k=k+1, and processing continues in operation 1020 to process the next class.

Similar to operation 249, in operation 1035, a determination is made concerning whether convergence has been achieved for the sparse coefficients or the maximum number of iterations have been performed. If $cv_\alpha \leq c_{th,\alpha}$ or $I_\alpha \geq I_{max,\alpha}$, processing continues in an operation 1038 shown referring to FIG. 10C. If $cv_\alpha > c_{th,\alpha}$ and $I_\alpha < I_{max,\alpha}$, processing continues in an operation 1036.

Similar to operation 250, in operation 1036, the coefficient iteration counter $I_\alpha$ is incremented, for example, as $I_\alpha = I_\alpha + 1$, and processing continues in operation 1019.

Referring to FIG. 10C, similar to operation 252, in operation 1038, a mini-batch of observation vectors is selected from input classified dataset 124 and input unclassified data subset 614 or input unclassified data subset 634.

Similar to operation 254, in an operation 1040, an updated value of $\phi(e)$ is computed using SGD.

Similar to operation 256, in an operation 1042, an updated value of $\phi(b)$ is computed using SGD.

Similar to operation 258, in an operation 1044, an updated value of $\phi(d)$ is computed using SGD.

Similar to operation 260, in an operation 1046, an updated value of the estimated robust eigenvector matrix $V_m^r$, is computed using SGD.

Similar to operation 262, in an operation 1048, an updated value of the estimated robust eigenvalue matrix $\Sigma_m^r$ is computed using SGD.

Similar to operation 264, in operation 1050, an updated value of the second similarity matrix S is computed.

Similar to operation 266, in an operation 1052, a convergence value cv is computed.

Similar to operation 268, in an operation 1054, a determination is made concerning whether convergence has been achieved for the parameters or the maximum number of iterations have been performed. If $cv \leq c_{th}$ or $I \geq I_{max}$, processing continues in an operation 1058. If $cv > c_{th}$ and $I < I_{max}$, processing continues in an operation 1056.

Similar to operation 270, in operation 1056, the iteration counter I is incremented, for example, as I=I+1, and processing continues in operation 1018.

In operation 1058, a cost function value is computed using the updated values and $C_{sw} = J_1(\alpha) + J_2(S, V_m^r, \Sigma_m^r, e, b, d)$, where $$J_1(\alpha) = \Sigma_{k=1}^c [e_k \| V_m^r \alpha_k - y_k \|_2^2 + \lambda_1 \Sigma_{i=1}^m ((\Sigma_{ii}^r)^{0.5} |\alpha_{i,k}|) + \lambda_2 \Sigma_{i=1}^m ((\Sigma_{ii}^r)_{0.5} \alpha_{i,k})^2], \text{ and}$$

$$J_2(S, V_m^r, \Sigma_m^r, e, b, d) = \Sigma_{k=1}^c e_k \| V_m^r \alpha_k - y_k \|_2^2 + \Sigma_{i=1}^N b_i \| L_m - V_m^r \Sigma_m^r (V_m^r)^\tau \|_2^2 + \lambda_3 \Sigma_{i=1}^N \Sigma_{j \in NN(x_i)} s_{i,j} d_{i,j} \| V_m^r (\Sigma_m^r (V_m^r)^\tau)_i - V_m^r (\Sigma_m^r (V_m^r)^\tau)_j \|_2^2 + \phi(e) + \phi(b) + \phi(d) + \lambda_4 \Sigma_{i=1}^N \| s_i \|_2^2.$$

Similar to operation 272, in an operation 1060, the classification matrix F is defined using $F = V_m^r \alpha_k$.

Similar to operation 274, in an operation 1062, each of the unclassified observation vectors in input unclassified data subset 614 or input unclassified data subset 634 is classified.

In an operation 1064, a completion indicator is sent to session manager device 600 that processing of the hyperparameter configuration on input unclassified data subset 614 or input unclassified data subset 634 is complete. The cost function value $C_{sw}$ and/or updated label vector $Y_{sw}$ are returned or otherwise made available to session manager device 600, for example, by updating a table accessible by session manager device 600.

Distributed classification system 300 predicts the label/class, target variable y, for unclassified observation vectors in input unclassified data subset 614 and/or input unclassified data subset 634, where unclassified observation vectors were not labeled by an expert process or a human while determining the optimum values for the hyperparameters. Distributed classification system 300 supports improved classification accuracy performance in a faster manner using the plurality of worker computing devices of worker system 306 that perform operations on their portion of input unclassified data subset 614 or input unclassified data subset 634. Input classified data 124 are used at all of the computing devices of worker system 306. Selection manager device 304 controls the execution using different values of the hyperparameters by the plurality of worker computing devices of worker system 306. Distributed classification system 300 can be applied to computer vision, machine learning, pattern recognition, etc. In the application of medical imaging diagnosis, there may be a large number of unlabeled medical images that are distributed due to their geographic locations.

Supervised learning requires that the target (dependent) variable y be classified or labeled in training data so that a model can be built to predict the class of new unclassified data. Currently, supervised learning systems discard observations in the training data that are not labeled. While supervised learning algorithms are typically better predictors/classifiers, labeling training data often requires a physical experiment or a statistical trial, and human labor is usually required. As a result, it may be very complex and expensive to fully label an entire training dataset of sufficient size to develop an accurate predictive model. Distributed classification system 300 solves this problem by providing a cost effective, accurate, and fast process for classifying unclassified data while improving the accuracy of the classification by identifying optimum values for the hyperparameters. The now classified observations of input unclassified data subset 614 and/or input unclassified data subset 634 provide observation vectors for training a predictive model that previously would have been discarded resulting in improved models and more accurate predictions as shown in the results presented below.

The robustness and accuracy performance of classification application 122 and classification model tuning application 422 were determined by comparing it with multiple baseline and state-of-the-art methods that are referred to as existing classification systems. Experimental results were generated using the operations of classification application 122 with a 2-dimensional (2-D) synthetic two moon dataset. Input unclassified data 126 included 1500 observation vectors shown in FIG. 11A with their correct labels. The circles show the observation vectors in class 1. The triangles show the observation vectors in class 2.

Input classified data 124 included 10 classified outlier observation vectors. Input classified data 124 are shown in FIG. 11B where the observation vectors included in boxes were the outlier observation vectors that were deliberately created by randomly removing 20% of the variables in the data and replacing them with zeros. The circles show the outlier observation vectors assigned to class 1. The triangles show the outlier observation vectors assigned to class 2.

Input classified data 124 included 20 classified observation vectors where 5 of the 20 classified observation vectors were noisy meaning the classification was incorrect. Input classified data 124 are shown in FIG. 11C where the observation vectors included in diamonds were the noisy observation vectors that were deliberately classified incorrectly. As a result, the noise level was 25 percent.

Figure 11A:
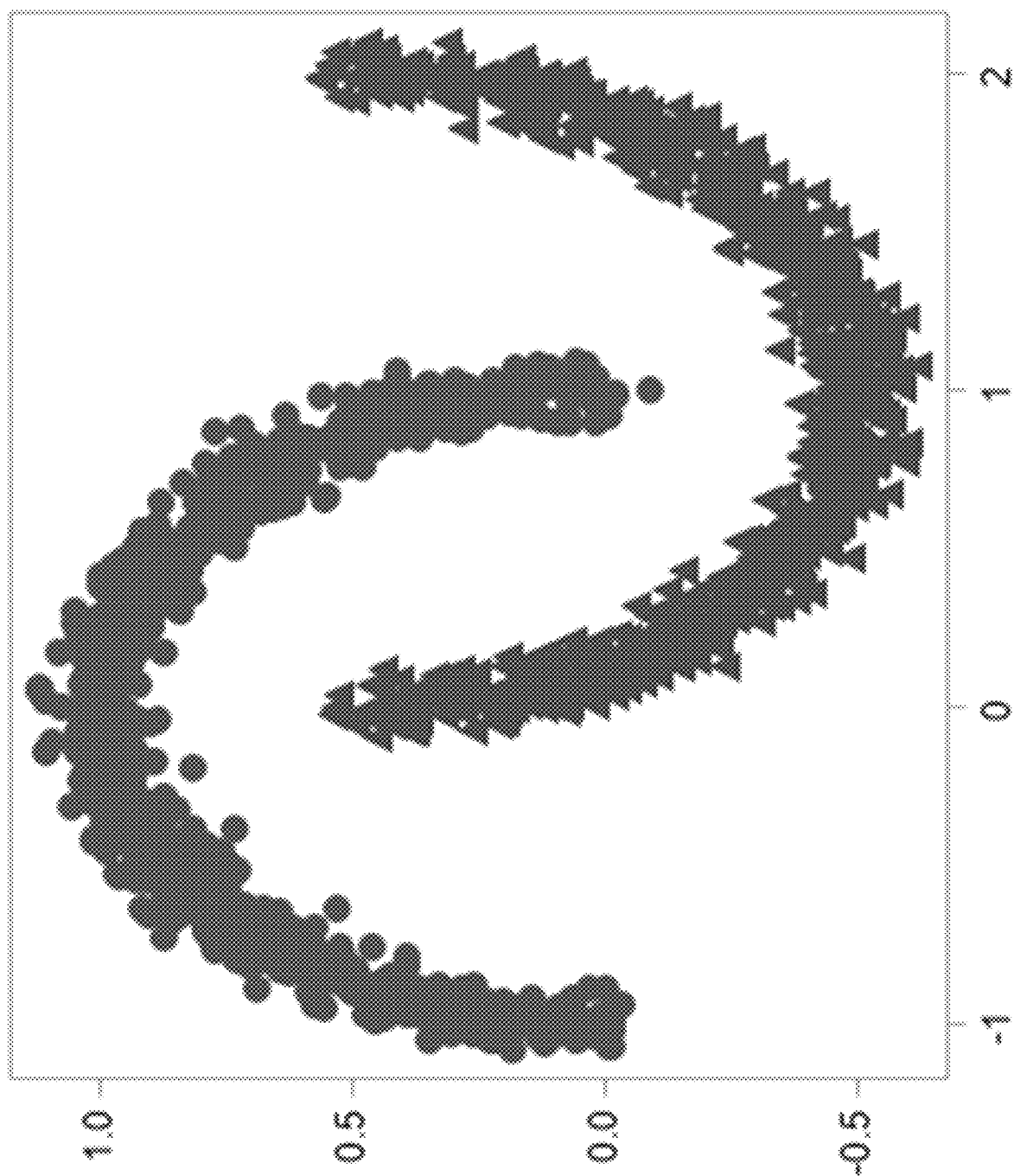
FIG. 11A shows input unclassified data in accordance with an illustrative embodiment.
Figure 11B:
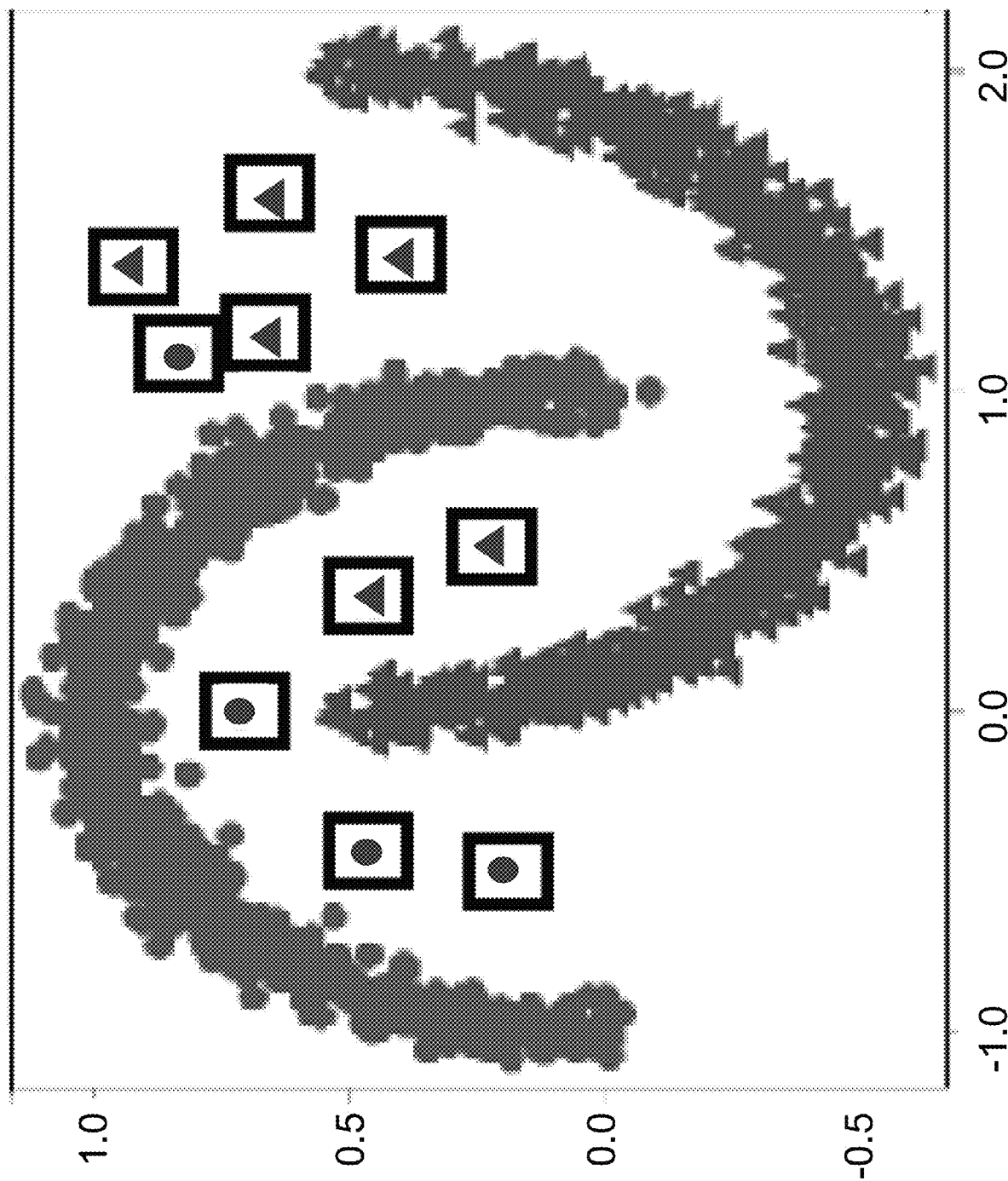
FIG. 11B shows input outlier data included in the input unclassified data of FIG. 11A in accordance with an illustrative embodiment.
Figure 11C:
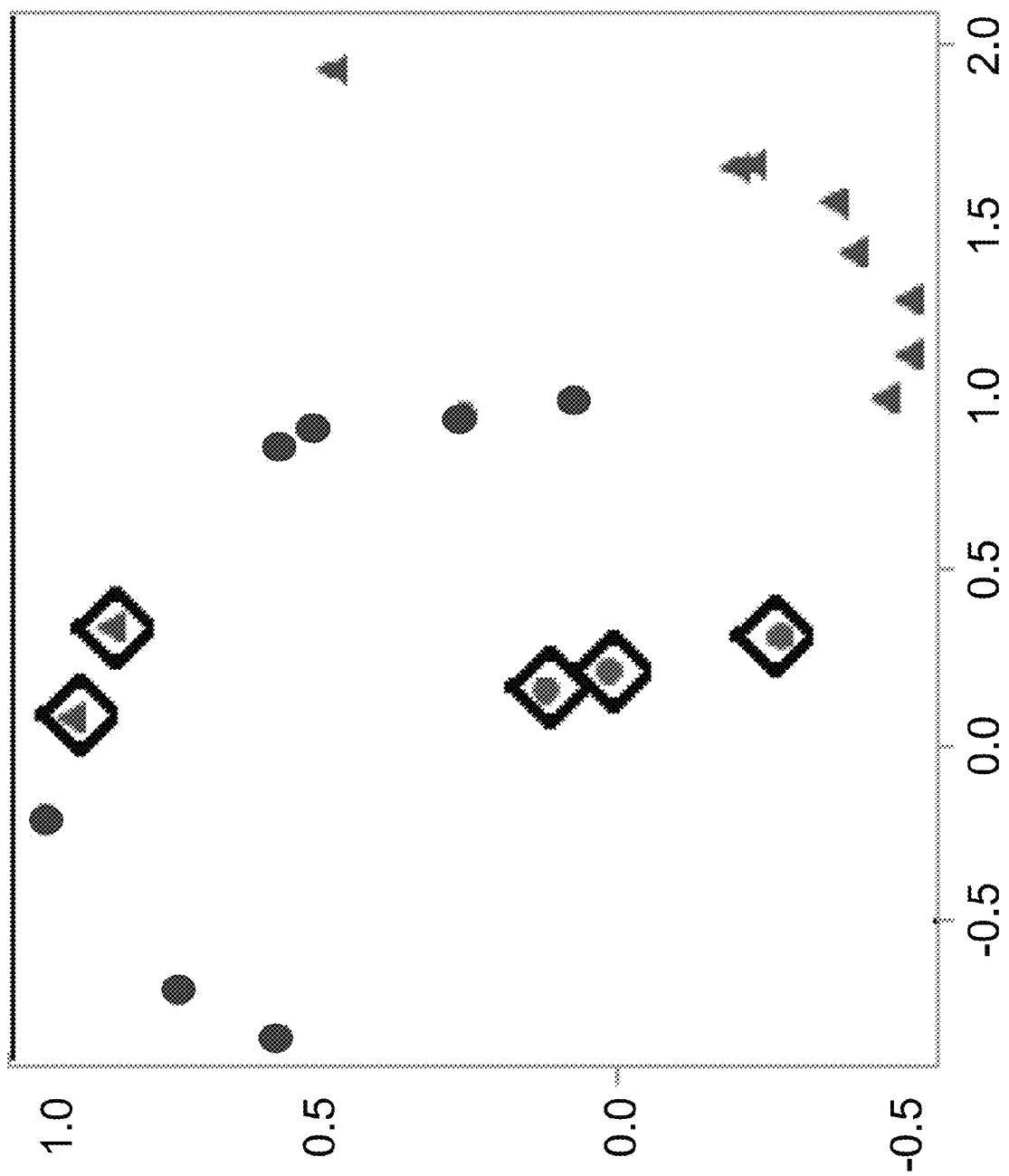
FIG. 11C shows input noisy classified data included in the input unclassified data of FIG. 11A in accordance with an illustrative embodiment.
Figure 11D:
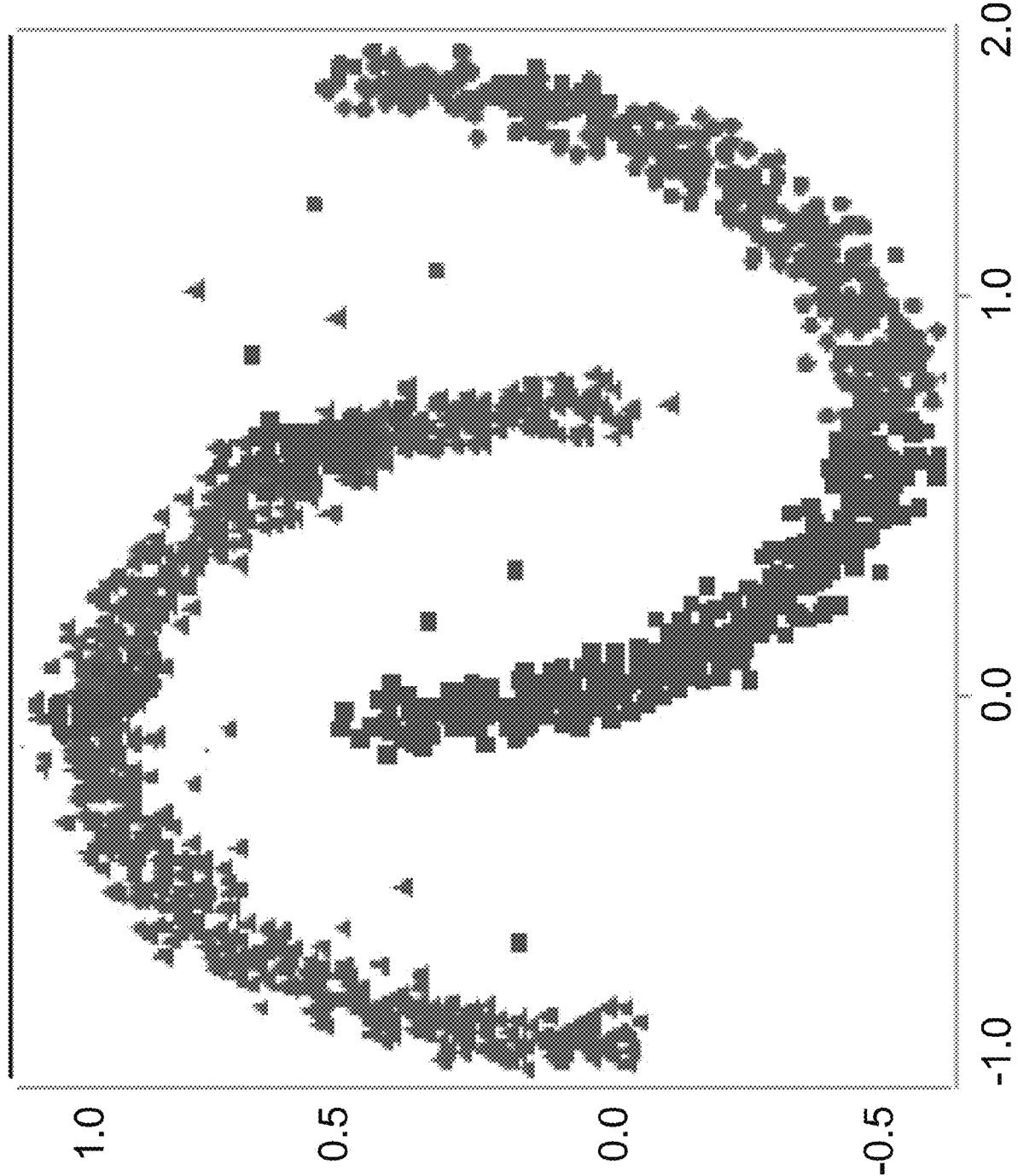
FIG. 11D shows a classification computed by a first existing classification system with input unclassified data 126 of FIG. 11A, with the input outlier data of FIG. 11B, and with the input noisy classified data of FIG. 11C in accordance with an illustrative embodiment.

Referring to FIG. 11D, a classification is shown in accordance with an illustrative embodiment that was computed by a first existing classification system with input unclassified data 126 described by FIG. 11A, with the outlier observation vectors of FIG. 11B, and with the input noisy classified data of FIG. 11C. The first existing classification system uses the method described in Zhou et al., *Learning with Local and Global Consistency*, Proceedings of the 16th International Conference on Neural Information Processing Systems, 321-328 (2003)(Label Propagation). Red triangles show the correctly classified observation vectors assigned to class 1; blue squares show the correctly classified observation vectors assigned to class 2; and green squares show the incorrectly classified observation vectors. The accuracy achieved by the first existing classification system was 72.5%.

Figure 11E:
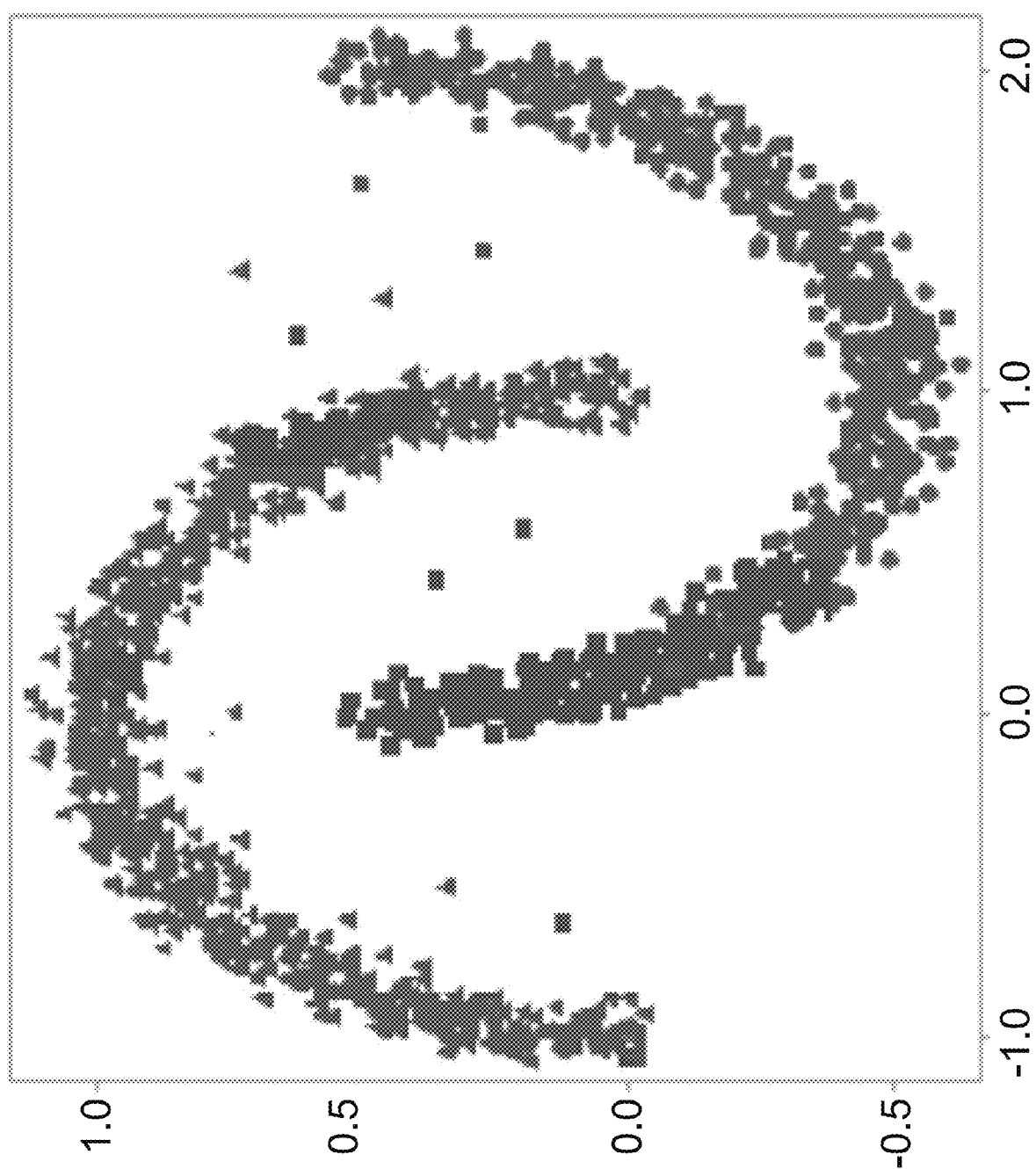
FIG. 11E shows a classification computed by a second existing classification system with input unclassified data 126 of FIG. 11A, with the input outlier data of FIG. 11B, and with the input noisy classified data of FIG. 11C in accordance with an illustrative embodiment.

Referring to FIG. 11E, a classification is shown in accordance with an illustrative embodiment that was computed by a second existing classification system with input unclassified data 126 described by FIG. 11A, with the outlier observation vectors of FIG. 11B, and with the input noisy classified data of FIG. 11C. The second existing classification system was LSSC. Red triangles show the correctly classified observation vectors assigned to class 1; blue squares show the correctly classified observation vectors assigned to class 2; and green squares show the incorrectly classified observation vectors. The accuracy achieved by the first existing classification system was 79.2%.

Figure 11F:
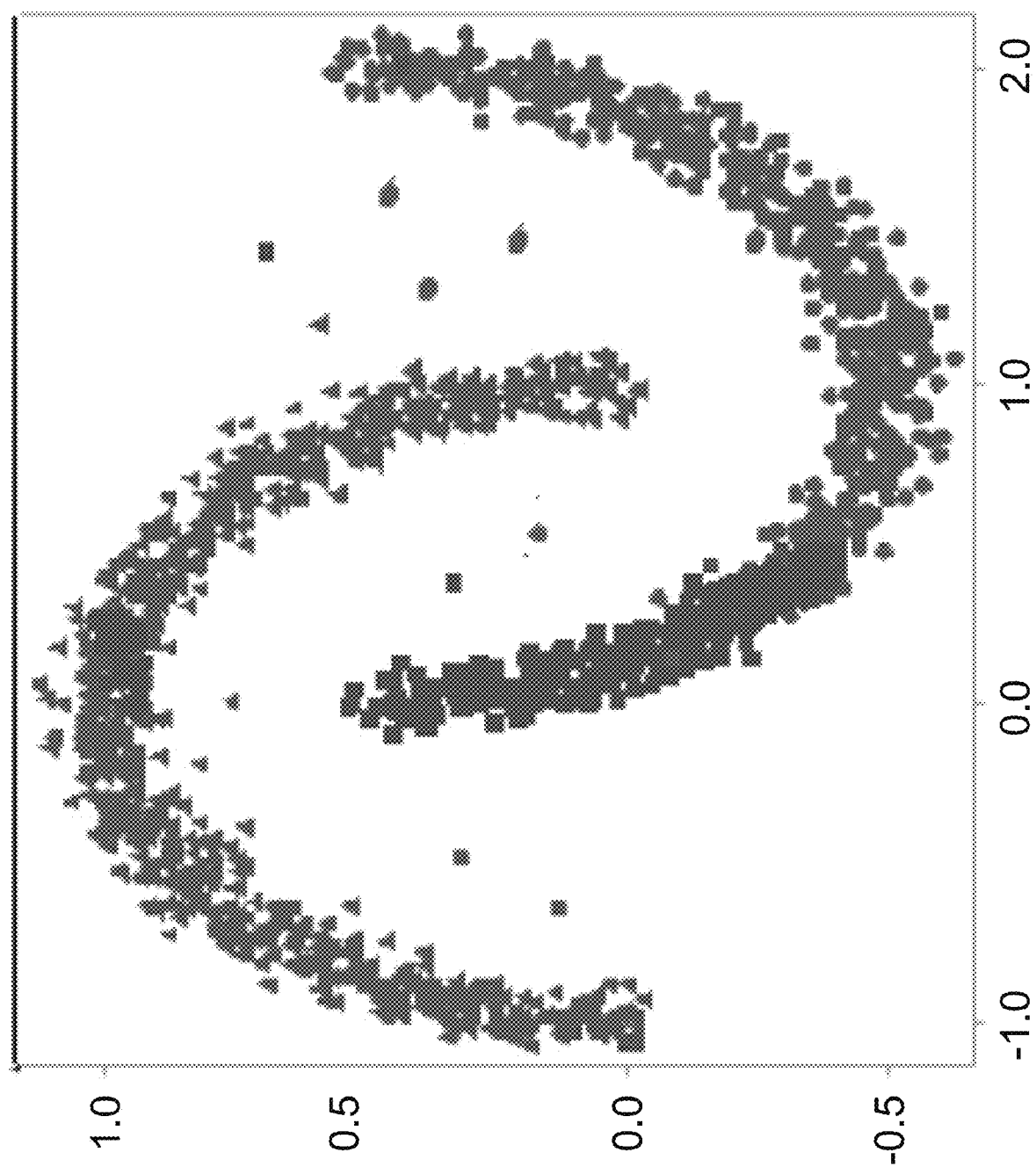
FIG. 11F shows a classification computed by the classification system of FIG. 1 with input unclassified data 126 of FIG. 11A, with the input outlier data of FIG. 11B, and with the input noisy classified data of FIG. 11C in accordance with an illustrative embodiment.

Referring to FIG. 11F, a classification is shown in accordance with an illustrative embodiment that was computed by a third existing classification system with input unclassified data 126 described by FIG. 11A, with the outlier observation vectors of FIG. 11B, and with the input noisy classified data of FIG. 11C. The second existing classification system uses the method described in E. Adeli, et al., *Semi-Supervised Discriminative Classification Robust to Sample-Outliers and Feature-Noises*, IEEE Transactions on Pattern Analysis and Machine Intelligence (2018)(RFS-LDA). Red triangles show the correctly classified observation vectors assigned to class 1; blue squares show the correctly classified observation vectors assigned to class 2; and green squares show the incorrectly classified observation vectors. The accuracy achieved by the first existing classification system was 80.6%.

Figure 11G:
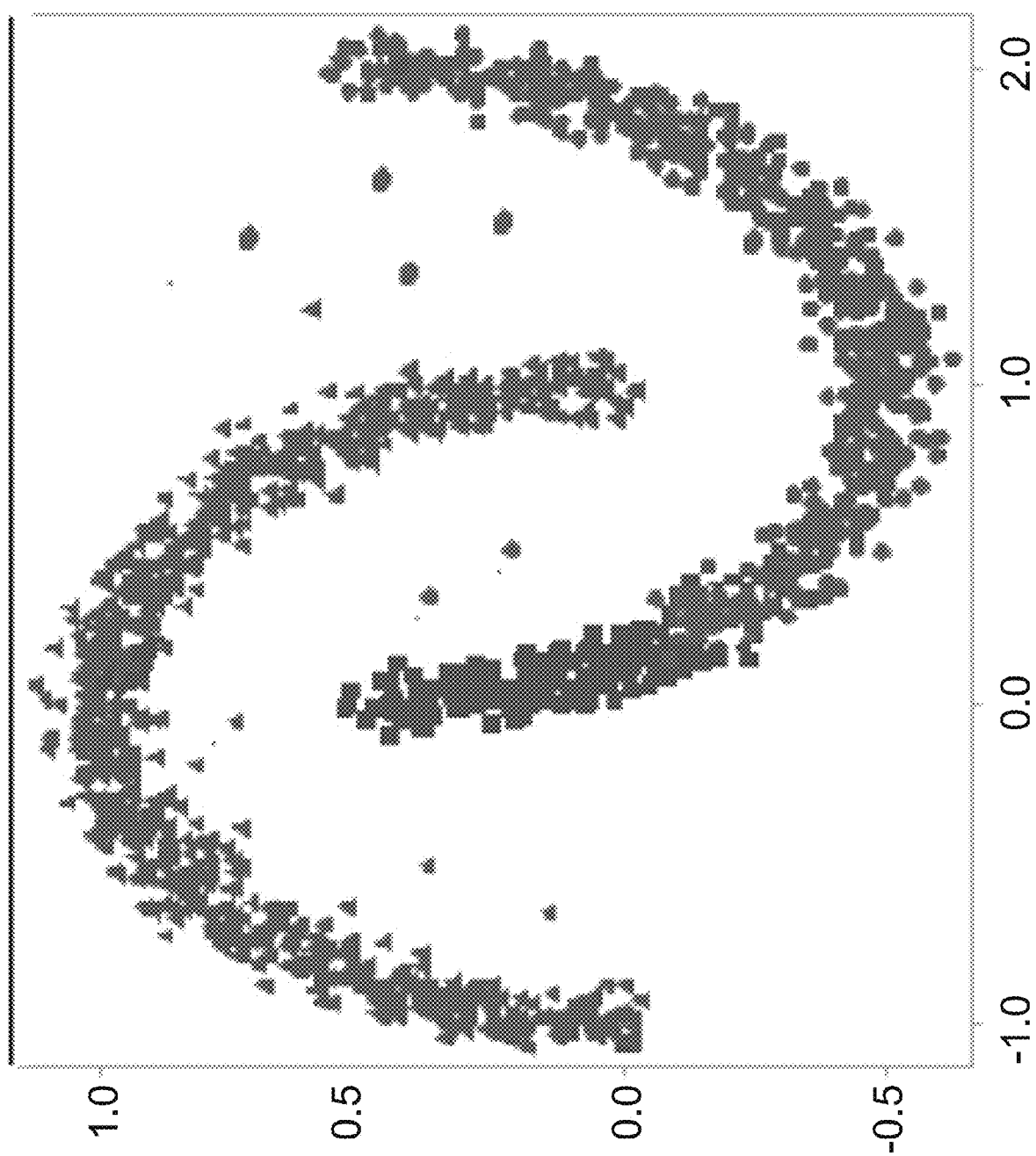
FIG. 11G shows a classification computed by the classification system of FIG. 3 with input unclassified data 126 of FIG. 11A, with the input outlier data of FIG. 11B, and with the input noisy classified data of FIG. 11C in accordance with an illustrative embodiment.

Referring to FIG. 11G, a classification is shown in accordance with an illustrative embodiment that was computed by classification device 100 with input unclassified data 126 described by FIG. 11A, with the outlier observation vectors of FIG. 11B, and with the input noisy classified data of FIG. 11C. The Gaussian kernel function was used and the input hyperparameters were s=[0.001, 1000, 10], m=0.2N, $\lambda_1=\lambda_2=\lambda_3=\lambda_4=[0.01, 100, 0.001]$. The accuracy achieved by the first existing classification system was 85.7%. Table I below summarizes the accuracy results.

TABLE 1

| Method | Label propagation | LSSC | RFS-LDA | Classification device 100 |
|---|---|---|---|---|
| Accuracy | 72.5 | 79.2 | 80.6 | 85.7 |

Classification device 100 show significantly improved accuracy relative to the three existing systems by suppressing the joint adverse effect of noisy labels and data outliers. Based on a comparison between FIGS. 11D to 11G, the region of incorrectly classified observation vectors shrinks significantly with the improved accuracy that results from using classification device 100 or classification system 300.

Classification device 100 and classification system 300 leverage an elastic net regularization on the graph Laplacian, offering a beneficial trade-off between lasso regression and ridge regression to account for the group effects. Dimensionality reduction SRGDR is coupled with the sparse regularization. By adapting elastic nets for noise-robust semi-supervised learning coupled with dimensionality reduction, the learning process and the accuracy are improved by preserving the structure of correlated features and reducing the effect of the noisy labels and the outlier labels.

A fourth existing classification system first applied RGDR to the graph Laplacian matrix and then performed LSSC for denoising and classification (RGDR-LSSC). A fifth existing classification system uses the method described in Y. Yan, et al., *Robust Semi-Supervised Learning through Label Aggregation*, Association for the Advancement of Artificial Intelligence (AAAI) Conference on Artificial Intelligence (ACAI) (2016)(ROSSEL). A sixth existing classification system uses the method described in Y. F. Li et al., *Cost-sensitive semi-supervised support vector machine*, ACAI (2010)(CS4VM). A seventh existing classification system uses the method described in Y. F. Li et al., *Semi-supervised learning using label mean*, International Conference on Machine Learning (ICML) (2009)(meanS3VM). An eighth existing classification system used the method described in M. Belkin, et al., *Manifold regularization: A geometric framework for learning from labeled and unlabeled examples*, Journal of Machine Learning Research (JMLR) 2399-2434 (2006)(LapRLS). A ninth existing classification system used the method described in Li Zhang, et al., *Prototype vector machine for large scale semi-supervised learning*, ICML (2006)(PVM). The tenth existing classification system used the method described in W. Liu, et al., *Large graph construction for scalable semisupervised learning*, ICML (2010)(LGC). An eleventh existing classification system used the method described in Y. Wang, et al., *Trend filtering on graphs*, JMLR (2016)(GTF). A twelfth existing classification system used the method described in Li Zhang, et al., *Robust Adaptive Embedded Label Propagation With Weight Learning for Inductive Classification*, IEEE Transactions on Neural Networks and Learning Systems (2018) (AELP-WL). A thirteenth existing classification system used SIIS. A fourteenth existing classification system applies robust principal component analysis (PCA) described in C. Cong and H. Zhang, *Robust PCA with compressed data*, Neural Information Processing Systems (2015) to the graph Laplacian matrix first and then implements LSSC afterwards (RPCA-LSSC).

Figure 12A:
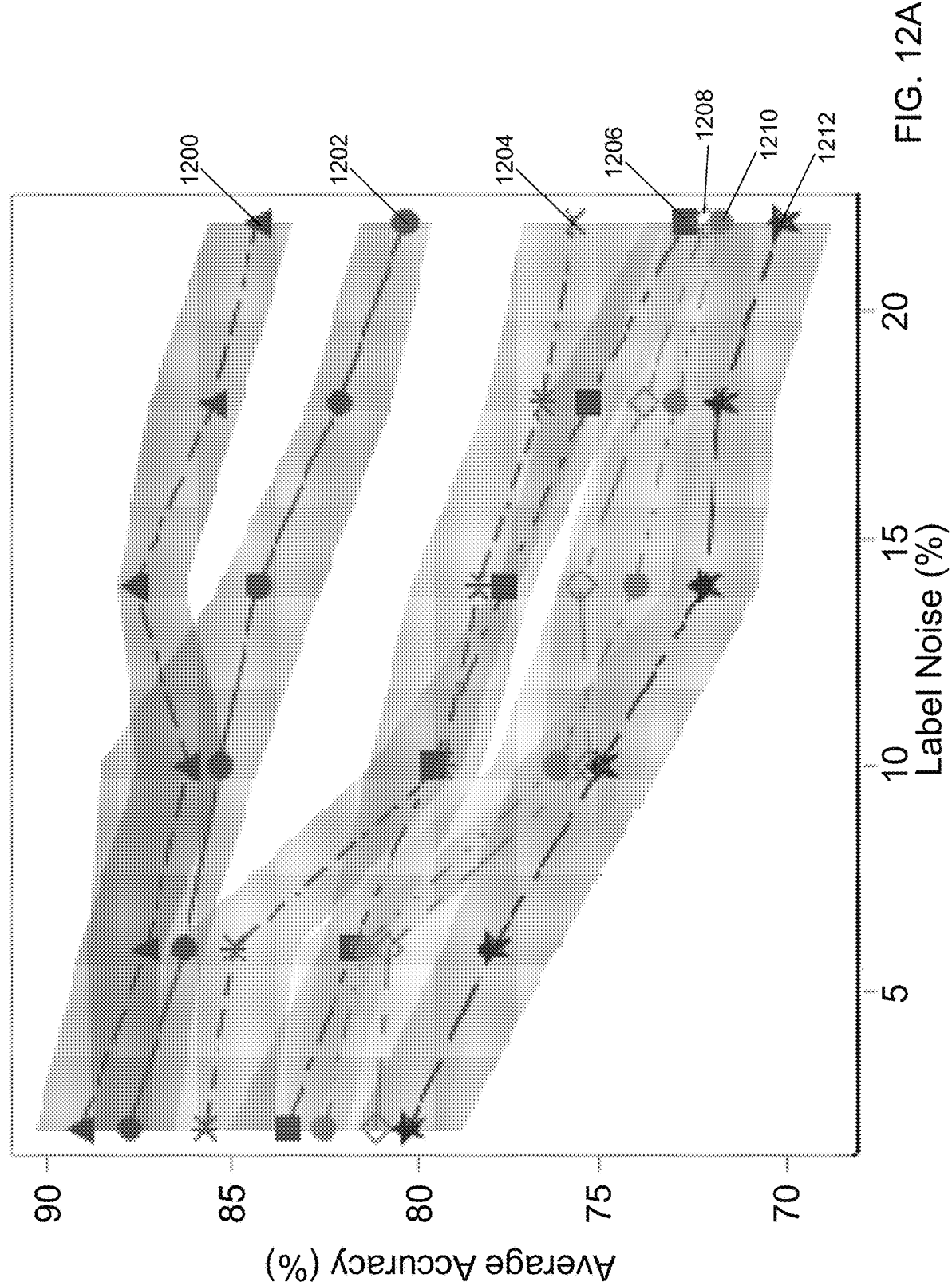
FIG. 12A shows a graph of average accuracy values as a function of label noise computed for a second dataset using seven different classification systems in accordance with an illustrative embodiment.

To evaluate the accuracy, nine additional datasets were used. A grid search was applied by classification model tuning application 422. The input hyperparameters for classification system 300 were s=[0.001, 1000, 10], m=0.2N, $\lambda_1=\lambda_2=\lambda_3=\lambda_4=[0.01, 100, 0.001]$. Referring to FIG. 12A, a second dataset included 856 variables, 9 classes, and 1080 observations. The second dataset was randomly sampled and divided into three disjoint subsets including input classified data 124 that included 5% of the observation vectors, input unclassified data 126 that included 75% of the observation vectors, and a test dataset that included 20% of the observation vectors. 10% of the observation vectors included in input classified data 124 were outliers. The outliers were created by randomly removing 20% of the variables in the data and replacing them with zeros. The random sampling was conducted over 20 runs. The percentage of noisy labels was varied.

A first accuracy curve 1200 for the second dataset shows the results using classification system 300. A second accuracy curve 1202 for the second dataset shows the results using RGDR-LSSC. A third accuracy curve 1204 for the second dataset shows the results using LSSC. A fourth accuracy curve 1206 for the second dataset shows the results using ROSSEL. A fifth accuracy curve 1208 for the second dataset shows the results using CS4VM. A sixth accuracy curve 1210 for the second dataset shows the results using RFS-LDA. A seventh accuracy curve 1212 for the second dataset shows the results using meanS3VM. 95% confidence intervals are shown for each classification system. As the percentage of label noise (inaccurately labeled samples among all labeled samples) increases, all of the methods have performance degradations as expected. The degradation is a minimum using classification system 300 demonstrating its robustness in the presence of noisy labels and outlier labels.

Figure 12B:
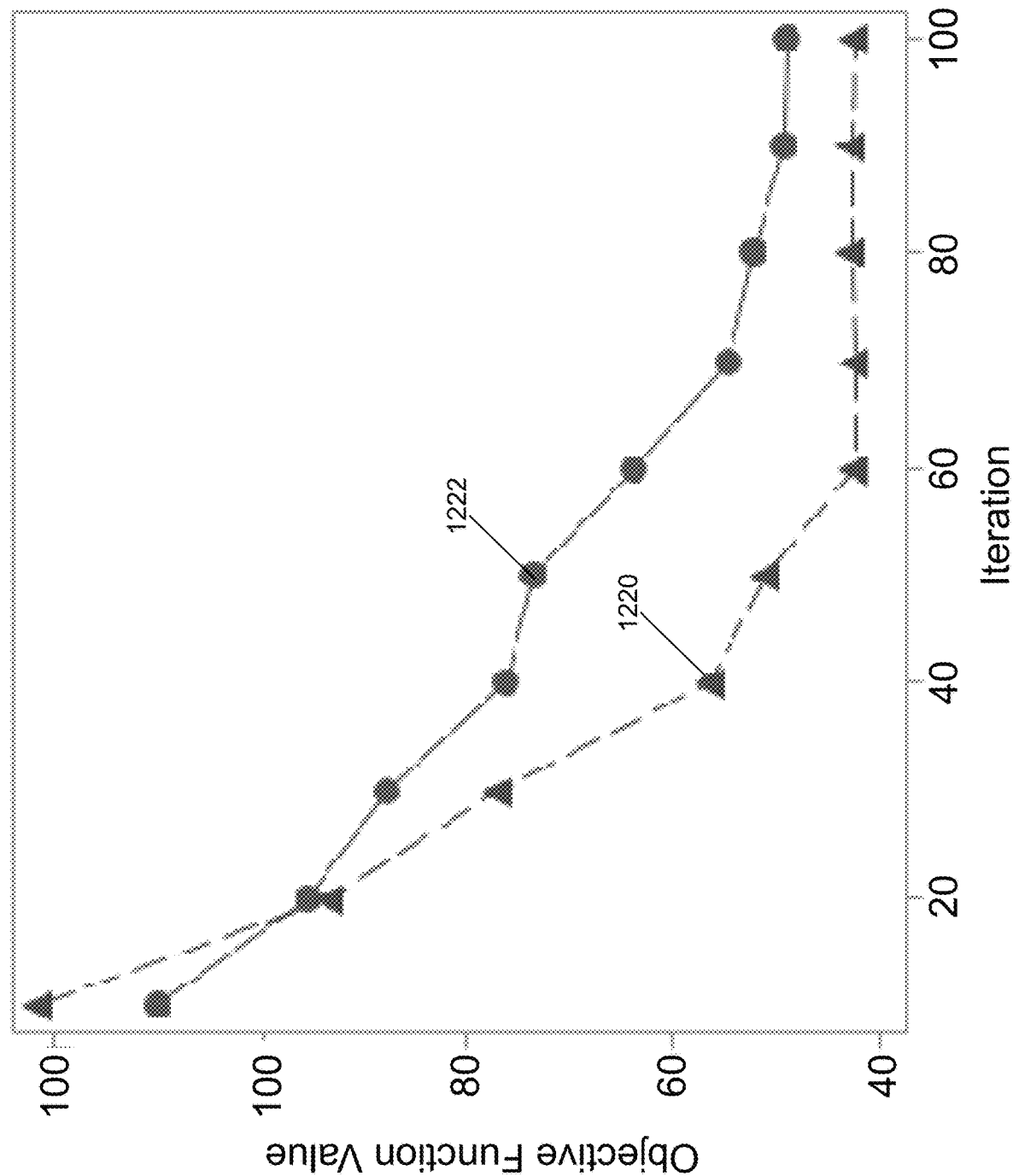
FIG. 12B shows a graph of objective function values as a function of an iteration number computed for the second dataset using two different methods in accordance with an illustrative embodiment.

Referring to FIG. 12B, a first objective function value (OFV) curve 1220 as a function of an iteration number is shown for the second dataset using classification system 300, and a second OFV curve 1222 as a function of an iteration number is shown for the second dataset using RGDR. Classification system 300 converges much faster by encoding the class specific information and results in a better graph embedding.

Figure 13A:
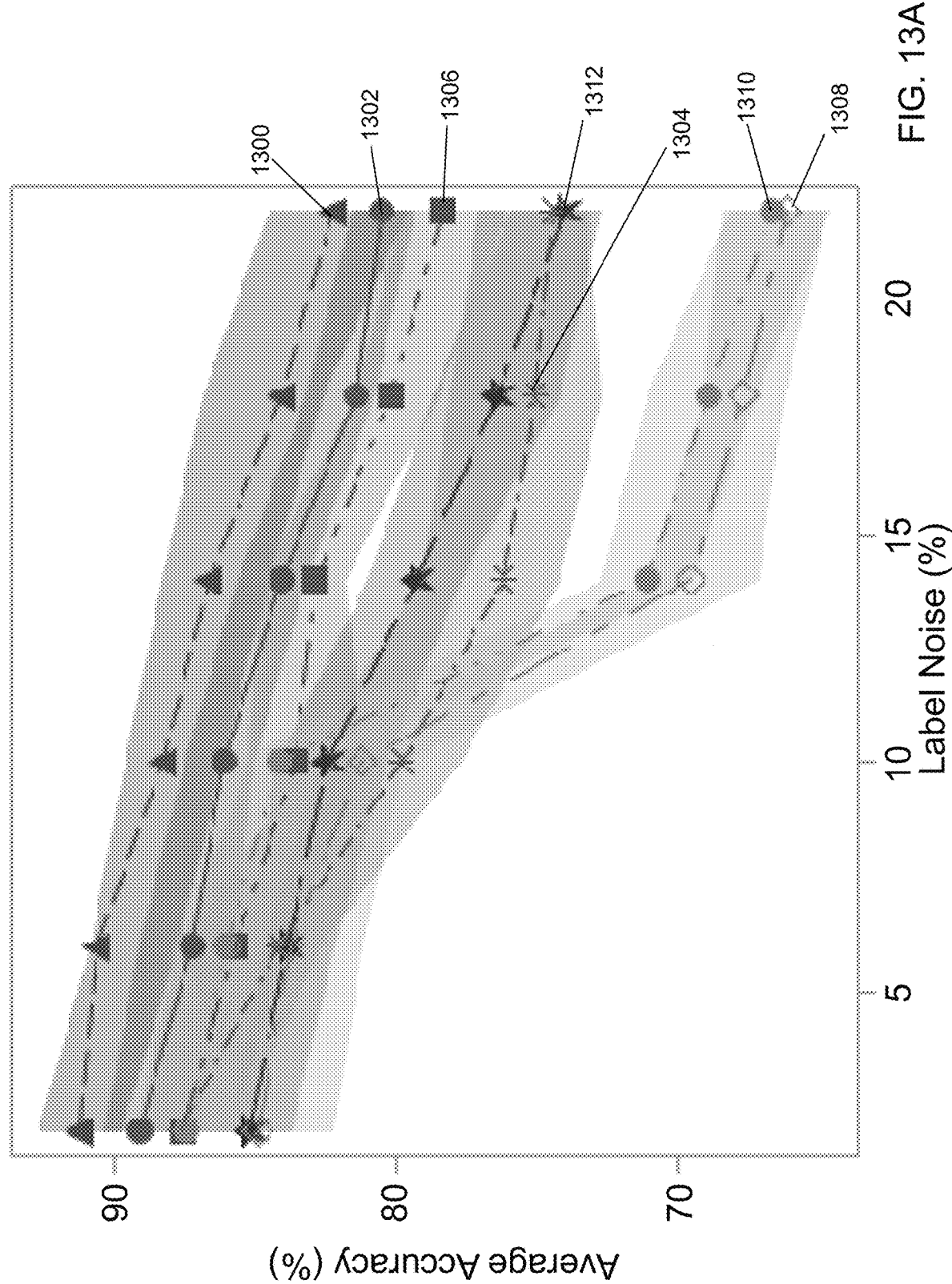
FIG. 13A shows a graph of average accuracy values as a function of label noise computed for a third dataset using the seven different classification systems in accordance with an illustrative embodiment.

Referring to FIG. 13A, a third dataset included 180 variables, 3 classes, and 3186 observations. The third dataset was randomly sampled and divided into three disjoint subsets including input classified data 124 that included 5% of the observation vectors, input unclassified data 126 that included 75% of the observation vectors, and a test dataset that included 20% of the observation vectors. 10% of the observation vectors included in input classified data 124 were outliers. The outliers were created by randomly removing 20% of the variables in the data and replacing them with zeros. The random sampling was conducted over 20 runs.

A first accuracy curve 1300 for the third dataset shows the results using classification system 300. A second accuracy curve 1302 for the third dataset shows the results using RGDR-LSSC. A third accuracy curve 1304 for the third dataset shows the results using LSSC. A fourth accuracy curve 1306 for the third dataset shows the results using ROSSEL. A fifth accuracy curve 1308 for the third dataset shows the results using CS4VM. A sixth accuracy curve 1310 for the third dataset shows the results using RFS-LDA. A seventh accuracy curve 1312 for the third dataset shows the results using meanS3VM. 95% confidence intervals are shown for each classification system. As the percentage of label noise (inaccurately labeled samples among all labeled samples) increases, all of the methods have performance degradations as expected. The degradation is a minimum using classification system 300 again demonstrating its robustness.

Figure 13B:
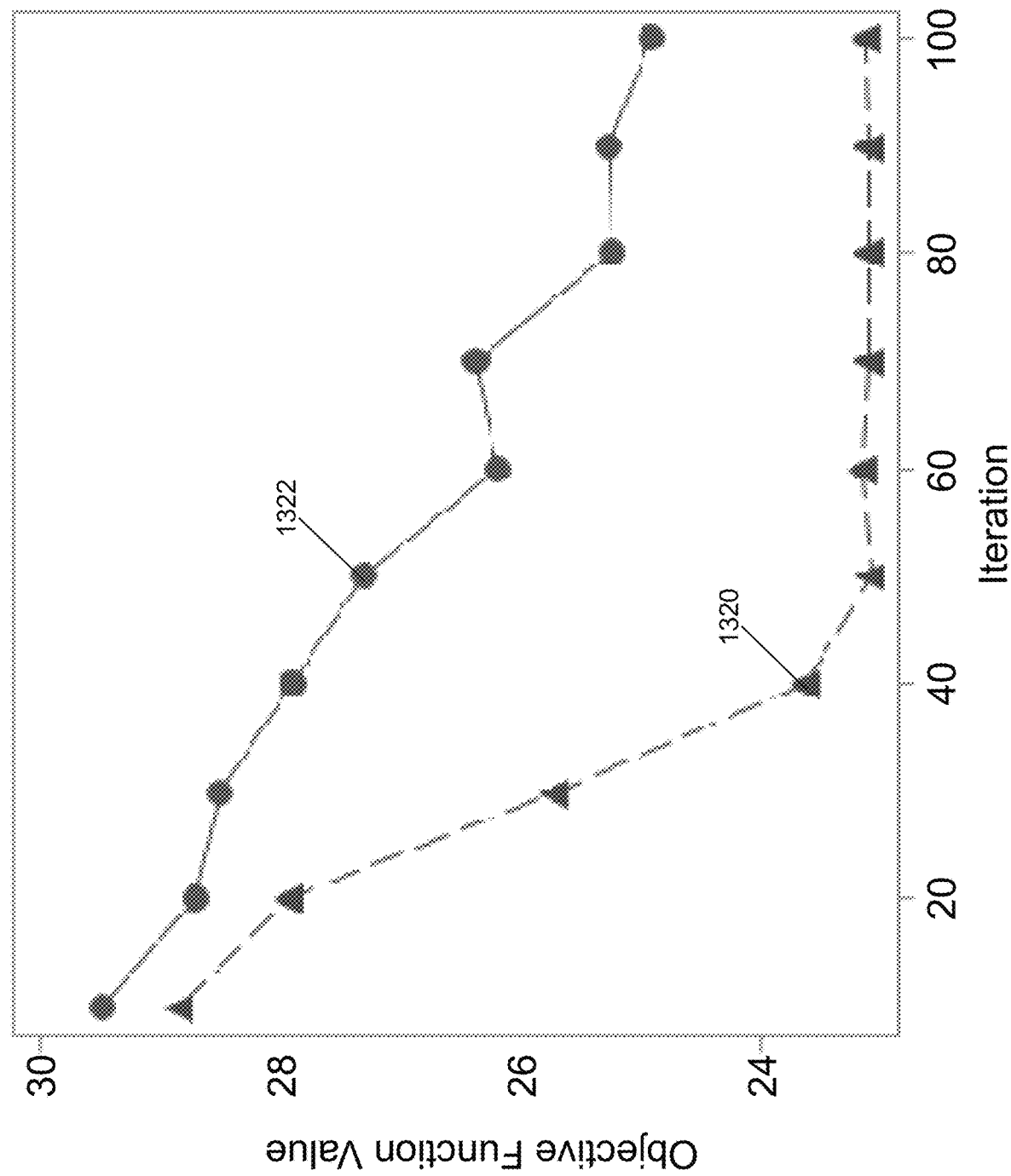
FIG. 13B shows a graph of objective function values as a function of an iteration number computed for the third dataset using the two different methods in accordance with an illustrative embodiment.

Referring to FIG. 13B, a first OFV curve 1320 as a function of an iteration number is shown for the third dataset using SRGDR of classification system 300, and a second OFV curve 1322 as a function of an iteration number is shown for the third dataset using RGDR. SRGDR converges much faster by encoding the class specific information and results in a better graph embedding.

Figure 14:
FIG. 14 shows a comparison table of accuracy values computed for three different datasets and using nine different classification systems in accordance with an illustrative embodiment.

Referring to FIG. 14, a comparison table 1400 is shown of accuracy values computed for three different datasets using eight different existing classification systems and classification system 300 in accordance with an illustrative embodiment. The fourth dataset was the MNIST dataset that included 70,000 handwritten digit images with 784 variables and 10 classes. Input classified data 124 included 100 labeled images. The fifth dataset was the NUS_WIDE dataset that included 269,000 images of nature with 1500 variables and 81 classes. Input classified data 124 included 405 labeled images. The sixth dataset was the CIFAR10 dataset that included 60,000 images. Input classified data 124 included 10,000 labeled images. The second row indicates a label noise percentage and a percentage of outliers included in input classified data 124.

Each dataset was randomly sampled and divided into three disjoint subsets including input classified data 124 that included 5% of the observation vectors, input unclassified data 126 that included 75% of the observation vectors, and a test dataset that included 20% of the observation vectors. The outliers were created by randomly removing 20% of the variables in the data and replacing them with zeros. The random sampling was conducted over 20 runs. The results in the comparison table show the average percent accuracy achieved relative to the total number of observations with the number in parentheses indicating the standard deviation of the results over 20 Monte Carlo runs. Classification system 300 achieved the highest accuracy regardless of the noise level and the percentage of outliers indicating its superior performance in the presence of noisy labels and outlier labels. SRDGR alone contributes around 65% performance gain on average.

Figure 15A:
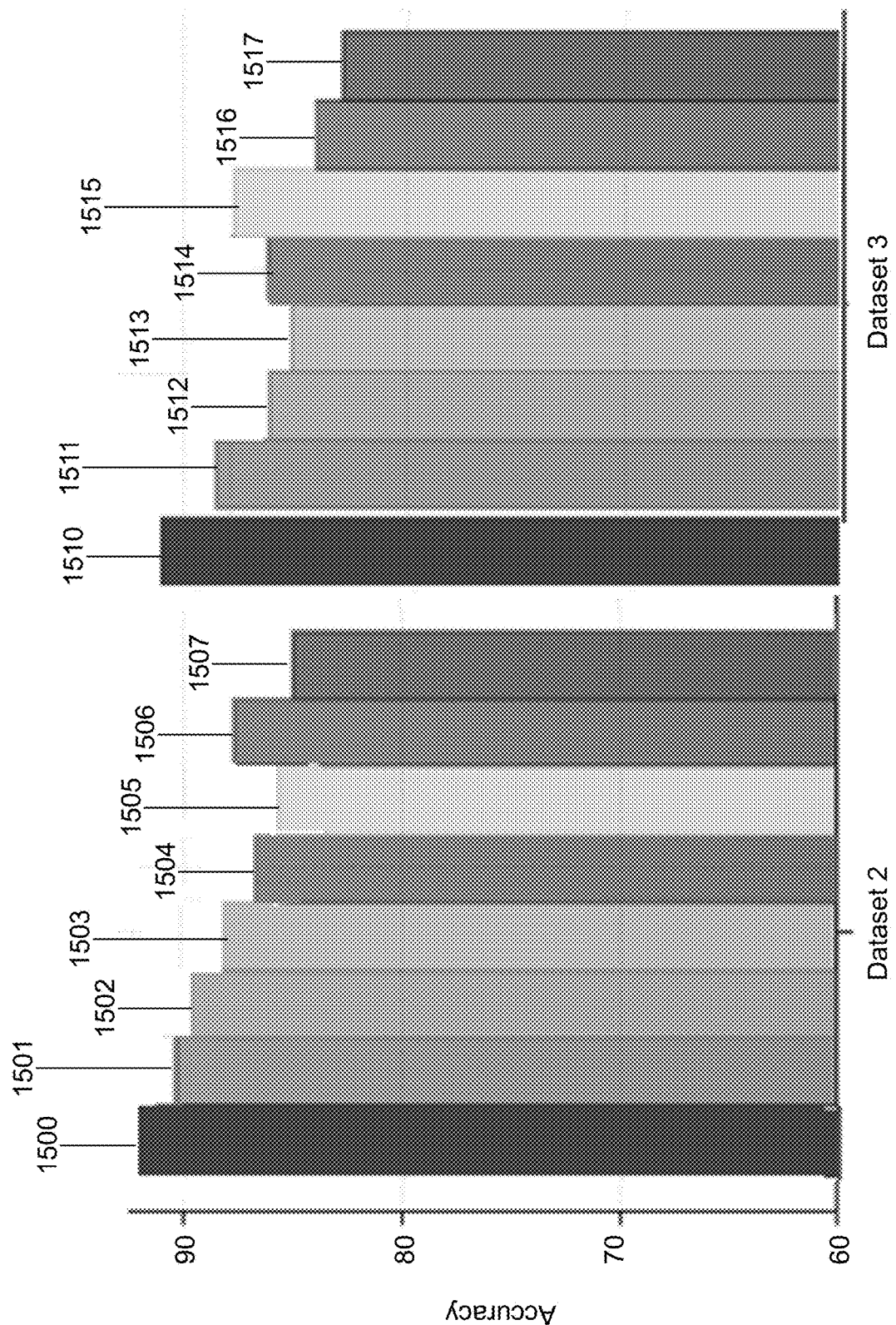
FIGS. 15A and 15B show a histogram of average accuracy values with a label noise value of 10% and outlier label value of 10% computed for five different datasets using eight different classification systems in accordance with an illustrative embodiment.
Figure 15B:
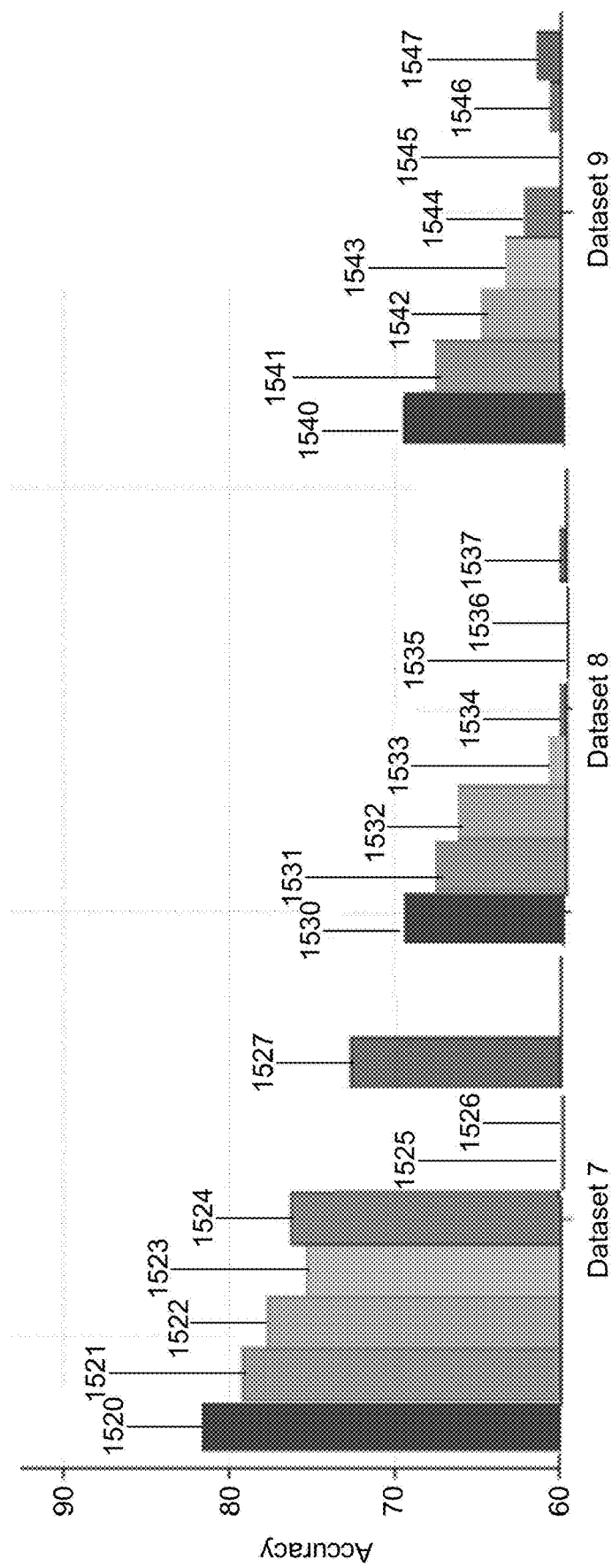

Referring to FIGS. 15A and 15B, a histogram is shown in accordance with an illustrative embodiment of average accuracy values with a label noise value of 10% and with an outlier percentage of 10% computed for five different datasets using seven existing classification systems. A seventh dataset included 47,236 variables, 40 classes, and 531,920 observations. An eighth dataset included 357 variables, 3 classes, and 24,387 observations. A ninth dataset included 126 variables, 3 classes, and 10,000 observations. A value of zero indicates that the existing classification system could not complete the execution because it was computationally too expensive meaning it took more than a day to complete execution. Table 2 below summarizes a reference number labeling for each accuracy bar.

TABLE 2

| Method | $2^{nd}$ dataset | $3^{rd}$ dataset | $7^{th}$ dataset | $8^{th}$ dataset | $9^{th}$ dataset |
|---|---|---|---|---|---|
| Classification system 300 | 1500 | 1510 | 1520 | 1530 | 1540 |
| RGDR + LSSC | 1501 | 1511 | 1521 | 1531 | 1541 |
| LSSC | 1502 | 1512 | 1522 | 1532 | 1542 |
| RFS-LDA | 1503 | 1513 | 1523 | 1533 | 1543 |
| ROSSEL | 1504 | 1514 | 1524 | 1534 | 1544 |
| meanS3VM | 1505 | 1515 | 1525 | 1535 | 1545 |
| CS4VM | 1506 | 1516 | 1526 | 1536 | 1546 |
| LapRLS | 1507 | 1517 | 1527 | 1537 | 1547 |

Again, classification system 300 outperformed all of the other existing classification systems in the presence of 10% label noise and 10% outlier labels for all five datasets.

Figure 16A:
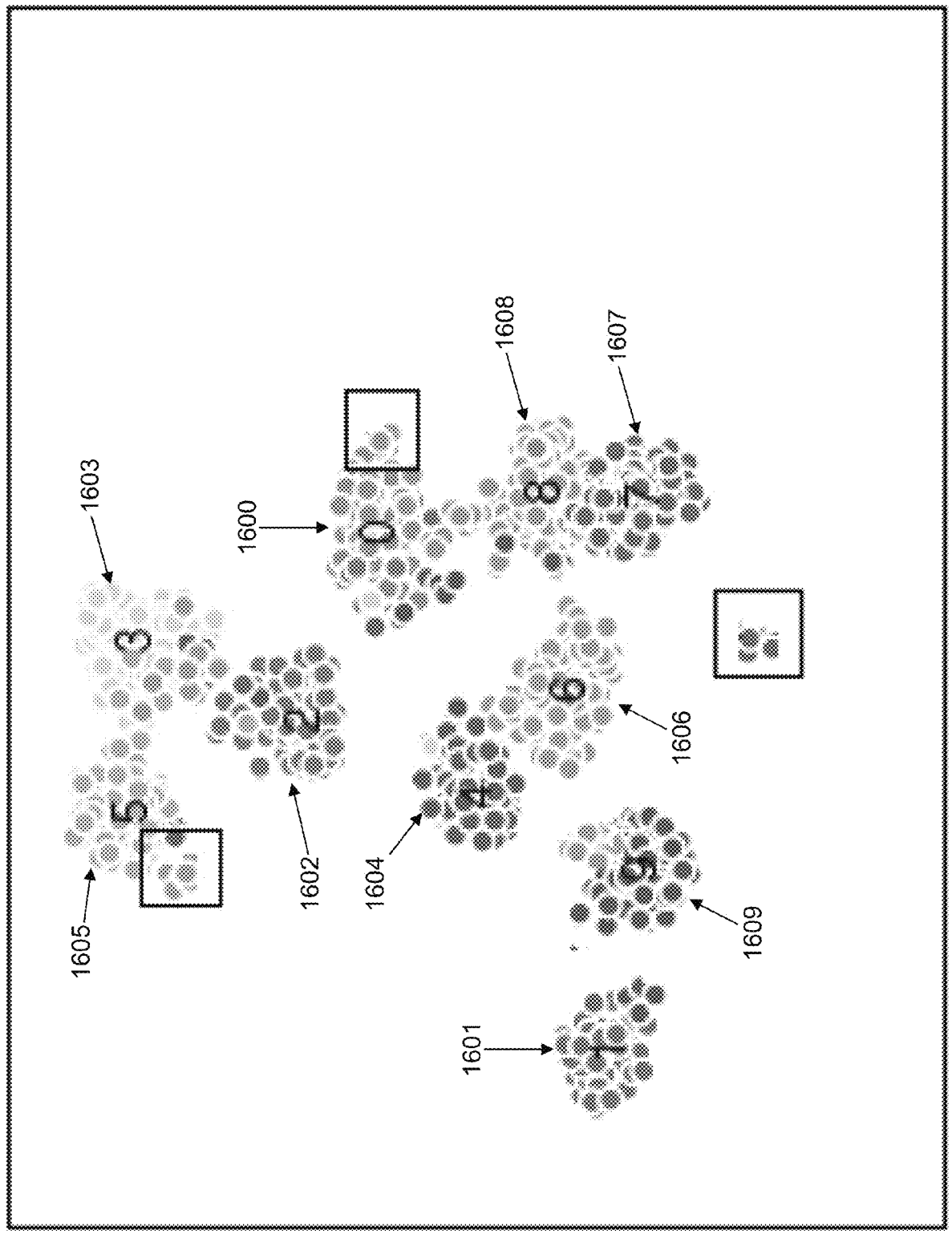
FIG. 16A shows a clustering visualization of the classification results with a label noise value of 15% and outlier label value of 10% computed for an eighth dataset using a first method of the two different methods in accordance with an illustrative embodiment.

Referring to FIG. 16A, a t-SNE clustering visualization of classification results with 15% noisy labels and 10% outlier labels computed using RGDR with the fourth dataset is shown in accordance with an illustrative embodiment. The data have been reduced to a two-dimensional space. The index number indicates classes 0 to 9. A first cluster 1600 is associated with the digit "0". A second cluster 1601 is associated with the digit "1". A third cluster 1602 is associated with the digit "2". A fourth cluster 1603 is associated with the digit "3". A fifth cluster 1604 is associated with the digit "4". A sixth cluster 1605 is associated with the digit "5". A seventh cluster 1606 is associated with the digit "6". An eighth cluster 1607 is associated with the digit "7". A ninth cluster 1608 is associated with the digit "8". A tenth cluster 1609 is associated with the digit "9". The outliers are marked with squares. The different classes are not well separated. Moreover, the noisy labels and outliers are not well separated.

Figure 16B:
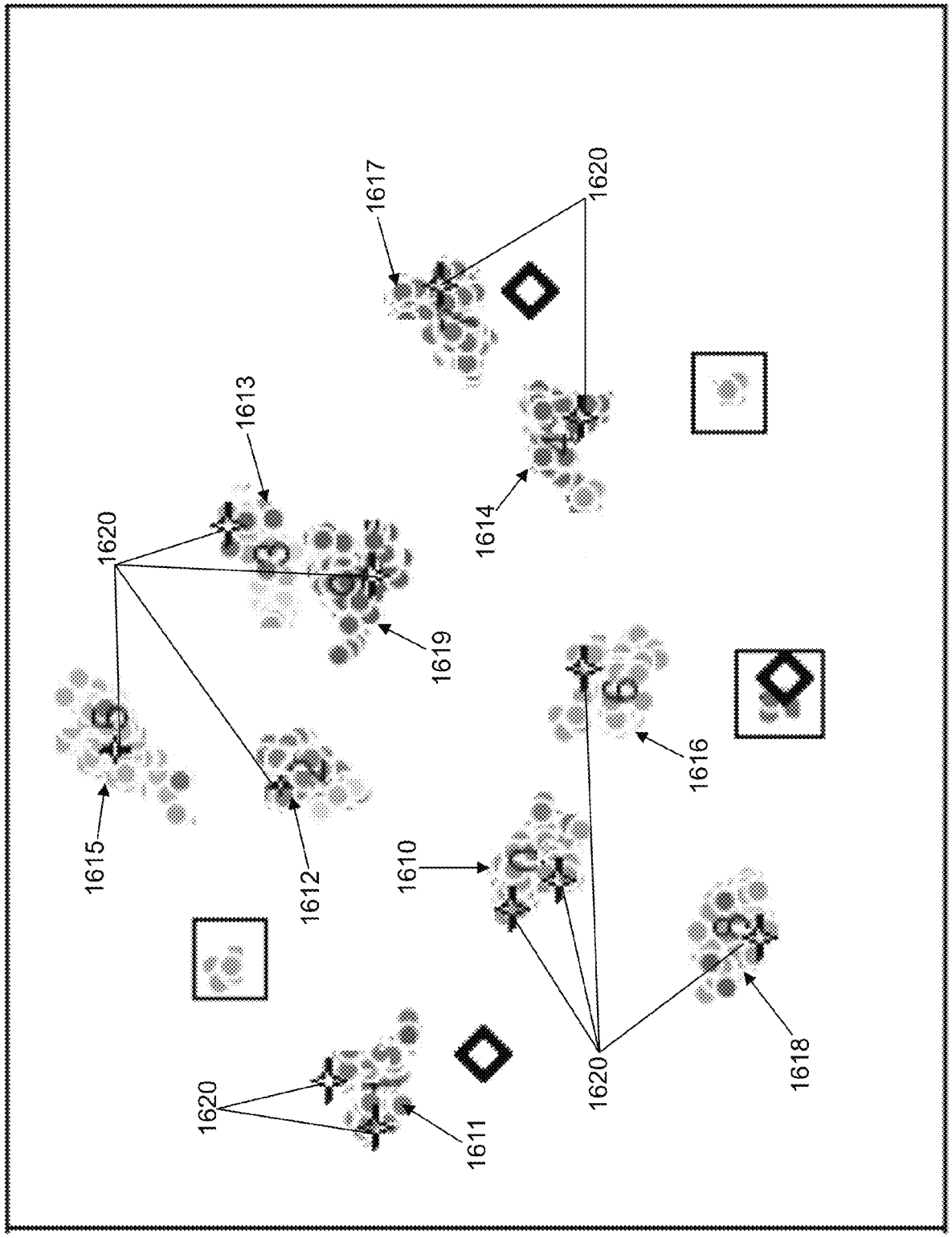
FIG. 16B shows a clustering visualization of the classification results with a label noise value of 15% and outlier label value of 10% computed for the eighth dataset using a second method of the two different methods in accordance with an illustrative embodiment.

Referring to FIG. 16B, a t-SNE clustering visualization of classification results with 15% label noise and 10% outlier labels computed using classification system 300 is shown in accordance with an illustrative embodiment. A first cluster 1610 is associated with the digit "0". A second cluster 1611 is associated with the digit "1". A third cluster 1612 is associated with the digit "2". A fourth cluster 1613 is associated with the digit "3". A fifth cluster 1614 is associated with the digit "4". A sixth cluster 1615 is associated with the digit "5". A seventh cluster 1616 is associated with the digit "6". An eighth cluster 1617 is associated with the digit "7". A ninth cluster 1618 is associated with the digit "8". A tenth cluster 1619 is associated with the digit "9". The outliers are marked with squares. The diamonds indicate wrong labels. A plurality of star symbols 1620 indicate correct labels. Classification system 300 outperforms RGDR by providing a more discriminative embedding leveraging the class specific information and joint optimization with sparse regularization. The outliers are much further from the clusters associated with each digit.

Through elastic net regularization, SRGDR, and joint optimization, classification application 122 and classification model tuning application 422 are capable of not only correcting corrupted labeled data but also of achieving a higher classification accuracy on unclassified data as shown in FIGS. 11D to 11G. The major contributions and desirable properties of classification application 122 and classification model tuning application 422 include increased efficiency, the capability to automate hyperparameter selection, improved accuracy, and scalability based on application in a distributed computing system. Leveraging the elastic net graph to combine L1 and L2 penalties for graph Laplacian regularization, SRGDR, and joint optimization, classification application 122 and classification model tuning application 422 take advantage of the correlation between variables and robust estimators to assign small or even zero weights to outliers to enhance the robustness of the classification performance. Classification application 122 and classification model tuning application 422 can be used in an automatic hyperparameter tuning system. By minimizing the total graph loss for semi-supervised learning, classification application 122 and classification model tuning application 422 overcome the difficulty of hyperparameter selections in the process of obtaining optimal solutions.

As discussed above, classification application 122 and classification model tuning application 422 provide a considerable improvement in accuracy over state-of-the-art approaches applied to both benchmark datasets and real-world datasets, even when the data include 30% noisy labels and 20% outlier labels. Classification application 122 and classification model tuning application 422 exploit distributed computing resources for scalability to big data. In addition, classification application 122 and classification model tuning application 422 have a linear time and space complexity with respect to the number of observations, which enhances the scalability to large datasets.

The explosion of digital data is generating many opportunities for big data analytics, which in turn provides many opportunities for tuning classification models to capitalize on the information contained in the data—to make better predictions that lead to better decisions. Distributed classification system 300 support better decision making by providing a system that can identify and evaluate many more hyperparameter configurations in parallel by allocating the computing devices of worker system 306 in an effective data and model parallel manner.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that, when executed by each computing device of a plurality of computing devices, cause each computing device to:

(A) compute a plurality of coefficients using a decomposition of a Laplacian matrix, wherein the Laplacian matrix is computed using a kernel function with a plurality of observation vectors, wherein the plurality of observation vectors includes a plurality of unclassified observation vectors and a plurality of classified observation vectors, wherein a target variable value is defined to represent a label for each respective observation vector of the plurality of classified observation vectors, wherein the target variable value is not defined to represent the label for each respective observation vector of the plurality of unclassified observation vectors, wherein the plurality of unclassified observation vectors are distributed across each computing device of the plurality of computing devices and the plurality of classified observation vectors are stored on each computing device of the plurality of computing devices;

(B) randomly select a batch of observation vectors from the plurality of observation vectors, wherein a batch number of the plurality of observation vectors included in the selected batch is a predefined batch size parameter value;

(C) compute updated parameter values for a dimensionality reduction method using stochastic gradient descent with the computed plurality of coefficients, the Laplacian matrix, and the selected batch of observation vectors, wherein the updated parameter values include an estimator of a decomposition matrix determined from the decomposition of the Laplacian matrix;

(D) train a semi-supervised machine learning classification model by repeating (A) and (B) until a convergence parameter value indicates the updated parameter values for the dimensionality reduction method have converged;

(E) define a classification matrix using the plurality of coefficients and the estimator of the decomposition of the Laplacian matrix of the trained semi-supervised machine learning classification model;

(F) determine the target variable value for each observation vector of the plurality of unclassified observation vectors using the trained semi-supervised trained machine learning classification model; and (G) output, from the trained semi-supervised trained machine learning classification model, the target variable value for each observation vector of the plurality of unclassified observation vectors, wherein the target variable value selected for each observation vector of the plurality of unclassified observation vectors is defined to represent the label for a respective unclassified observation vector, wherein the label indicates a characteristic determined for each respective unclassified observation vector.

2. The non-transitory computer-readable medium of claim 1, wherein (A) comprises:
(H) computing a gradient value as a function of the decomposition matrix, the plurality of coefficients, and a label matrix defined from the plurality of observation vectors based on the target variable value;
(I) updating a value of each coefficient of the plurality of coefficients based on the computed gradient value; and
(J) repeating (H) to (I) until a second convergence parameter value indicates the plurality of coefficients have converged.

3. The non-transitory computer-readable medium of claim 2, wherein the updated value of each coefficient of the plurality of coefficients is further based on a first predefined regularization parameter value.

4. The non-transitory computer-readable medium of claim 3, wherein the gradient value includes an $L_2$-norm term computed for each coefficient of the plurality of coefficients based on a second predefined regularization parameter value.

5. The non-transitory computer-readable medium of claim 4, wherein the $L_2$-norm term is computed using $L_2=2\lambda_2 (\Sigma_{pp}^r)^{0.5}\Sigma_{i=1}^m((\Sigma_{ii}^r)^{0.5}\alpha_{i,k})$, where $L_2$ is the $L_2$-norm term, $\lambda_2$ is the second predefined regularization parameter value, $\alpha_{i,k}$ is an $i^{th}$ coefficient of the plurality of coefficients defined for a $k^{th}$ class, m is a predefined number of eigenvectors, $\Sigma_{i=1}^m$ indicates a summation from 1 to m, and $\Sigma_{ii}^r$ indicates an i, $i^{th}$ value of a diagonal matrix computed from the decomposed Laplacian matrix, and p is a $p^{th}$ coefficient of m coefficients defined for the $k^{th}$ class.

6. The non-transitory computer-readable medium of claim 5, wherein the gradient value is computed using $\nabla_{\alpha_{p,k}}=C_{3,i}+L_2$, where $\nabla_{\alpha_{p,k}}$ is the gradient value for the p,$k^{th}$ coefficient of the plurality of coefficients, $C_3=2e_k(V_m^r)^\tau(V_m^r\alpha_k-y_k)$ is an m×1 vector, $C_{3,i}$ is an $i^{th}$ element of $C_3$, $V_m^r$ is the estimator of the decomposition matrix, $\alpha_k$ is the plurality of coefficients defined for the $k^{th}$ class, $y_k$ is a $k^{th}$ row of the label matrix, $e_k$ is a $k^{th}$ element of a first auxiliary vector, and $\tau$ indicates a transpose.

7. The non-transitory computer-readable medium of claim 4, wherein, before (F), the computer-readable instructions further cause each computing device to:
(K) compute a loss value after (A) through (D);
(L) update the label matrix based on the defined classification matrix; and
(M) store the computed loss value in association with values for $\lambda_1$, $\lambda_2$, m, and s, where $\lambda_1$ is the first predefined regularization parameter value, $\lambda_2$ is the second predefined regularization parameter value, m is a predefined number of eigenvectors, and s is a predefined kernel parameter value of the kernel function.

8. The non-transitory computer-readable medium of claim 7, wherein the loss value is computed using $C=\Sigma_{k=1}^c [e_k\|V_m^r\alpha_k-y_k\|_2^2+\lambda_1\Sigma_{i=1}^m((\Sigma_{ii}^r)^{0.5}|\alpha_{i,k}|)+\lambda_2\Sigma_{i=1}^m((\Sigma_{ii}^r)^{0.5}\alpha_{i,k})^2]$, where c is a number of classes determined based on possible values of the target variable value, $e_k$ is a $k^{th}$ element of a first auxiliary vector, $V_m^r$ is the estimator of the decomposition matrix, $\alpha_k$ is the plurality of coefficients defined for the $k^{th}$ class, $y_k$ is a $k^{th}$ row of the label matrix, $\lambda_1$ is the first predefined regularization parameter value, m is the predefined number of eigenvectors, $\Sigma_{ii}^r$ indicates an i, $i^{th}$ value of a diagonal matrix computed from the decomposed Laplacian matrix, $\alpha_{i,k}$ is an $i^{th}$ coefficient of the plurality of coefficients defined for a $k^{th}$ class, and $|\alpha_{i,k}|$ indicates an absolute value of $\alpha_{i,k}$.

9. The non-transitory computer-readable medium of claim 7, wherein, before (F), the computer-readable instructions further cause a controller computing device to:
(N) request that the plurality of computing devices repeat (A) through (D) and (K) through (M) with a plurality of different values for at least one of $\lambda_1$, $\lambda_2$, m, and s;
(O) after (N), select a value for $\lambda_1$, $\lambda_2$, m, and s based on an extremum value of the computed loss value associated with the selected value for $\lambda_1$, $\lambda_2$, m, and s relative to other values of $\lambda_1$, $\lambda_2$, m, and s; and
(P) output the selected value for $\lambda_1$, $\lambda_2$, m, and s,
wherein the target variable value determined for each observation vector of the plurality of unclassified observation vectors in (F) is based on the updated label matrix associated with the selected value for $\lambda_1$, $\lambda_2$, m, ands.

10. The non-transitory computer-readable medium of claim 9, wherein the loss value is computed using $C_{sw}=J_1(\alpha)+J_2(S, V_m^r, \Sigma_m^r, e, b, d)$, where $J_1(\alpha)$ is a first loss value computed using the plurality of coefficients, $\alpha$ is the computed plurality of coefficients, $J_2(S, V_m^r, \Sigma_m^r, e, b, d)$ is a second loss value computed using the updated values for the parameter values, and S, $V_m^r, \Sigma_m^r$, e, b, d are the updated values for the parameter values.

11. The non-transitory computer-readable medium of claim 4, wherein, before (F), the computer-readable instructions further cause each computing device of the plurality of computing devices to:
(K) compute a loss value after (A) through (D);
(L) update the label matrix based on the defined classification matrix;
(M) store the computed loss value in association with values for $\lambda_1$, $\lambda_2$, $\lambda_3$, $\lambda_4$, m, and s, where $\lambda_1$ is the first predefined regularization parameter value, $\lambda_2$ is the second predefined regularization parameter value, m is a predefined number of eigenvectors, s is a predefined kernel parameter value of the kernel function, $\lambda_3$ is a third predefined regularization parameter value, and $\lambda_4$ is a fourth predefined regularization parameter value.

12. The non-transitory computer-readable medium of claim 11, wherein, before (F) and after (M), the computer-readable instructions further cause a controller computing device to:
(N) compute a total loss value as a sum of the computed loss value stored by each computing device of the plurality of computing devices; and
(O) define an overall label matrix as a concatenation of the label matrix updated by each computing device of the plurality of computing devices,
wherein the target variable value determined for each observation vector of the plurality of unclassified observation vectors in (F) is based on the defined overall label matrix associated with the selected value for $\lambda_1$, $\lambda_2$, $\lambda_3$, $\lambda_4$, m, and s.

13. The non-transitory computer-readable medium of claim 12, wherein, before (F) and after (O), the computer-readable instructions further cause the controller computing device to:
(P) select a different value for at least one of $\lambda_1$, $\lambda_2$, $\lambda_3$, $\lambda_4$, m, and s;
(Q) request that the plurality of computing devices repeat (A) through (D) and (K) through (O) with the selected different value for at least one of $\lambda_1$, $\lambda_2$, $\lambda_3$, $\lambda_4$, m, and s;
(R) repeat (P) and (Q) a plurality of times;
(S) after (R), select a value for $\lambda_1$, $\lambda_2$, $\lambda_3$, $\lambda_4$, m, and s based on an extremum value of the computed loss value associated with the selected value for $\lambda_1$, $\lambda_2$, $\lambda_3$, $\lambda_4$, m, and s relative to other values of $\lambda_1$, $\lambda_2$, $\lambda_3$, $\lambda_4$, m, and s; and
(T) output the selected value for $\lambda_1$, $\lambda_2$, $\lambda_3$, $\lambda_4$, m, and s.

14. The non-transitory computer-readable medium of claim 11, wherein the loss value is computed using $C_{sw}=J_1(\alpha)+J_2(S, V_m^r, \Sigma_m^r, e, b, d)$, where $J_1(\alpha)$ is a first loss value computed using the plurality of coefficients, a is the computed plurality of coefficients, $J_2(S, V_m^r, \Sigma_m^r, e, b, d)$ is a second loss value computed using the updated values for the parameter values, and S, $V_m^r$, $\Sigma_m^r$, e, b, d are the updated values for the parameter values.

15. The non-transitory computer-readable medium of claim 14, wherein the first loss value is computed using $J_1(\alpha)=\Sigma_{k=1}^{c}[e_k\|V_m^r\alpha_k-y_k\|_2^2+\lambda_1\Sigma_{i=1}^{m}(\Sigma_{ii}^r)^{0.5}|\alpha_{i,k}|])+\lambda_2\Sigma_{i=1}^{m}((\Sigma_{ii}^r)^{0.5}\alpha_{i,k})^2]$, where c is a number of classes determined based on possible values of the target variable value, $e_k$ is a $k^{th}$ element of a first auxiliary vector e, $V_m^r$, is the estimator of the decomposition matrix, $\alpha_k$ is the plurality of coefficients defined for the $k^{th}$ class, $y_k$ is a $k^{th}$ row of the label matrix, $\Sigma_{ii}^r$ indicates an i, $i^{th}$ value of a diagonal matrix computed from the decomposed Laplacian matrix, $\alpha_{i,k}$ is an $i^{th}$ coefficient of the plurality of coefficients defined for a $k^{th}$ class, $\|\ \|_2^2$ indicates a squared Euclidean norm, and $|\ |$ indicates an absolute value.

16. The non-transitory computer-readable medium of claim 15, wherein the second loss value is computed using $J_2(S, V_m^r, \Sigma_m^r, e, b, d)=\Sigma_{k=1}^{c}e_k\|V_m^r\alpha_k-y_k\|_2^2+\Sigma_{i=1}^{N}b_i\|L_m-V_m^r\Sigma_m^r(V_m^r)^T\|_2^2+\lambda_3\Sigma_{i=1}^{N}\Sigma_{j\in NN(x_i)}s_{i,j}d_{i,j}\|V_m^r(\Sigma_m^r(V_m^r)^T)_i-V_m^r(\Sigma_m^r(V_m^r)^T)_j\|_2^2+\phi(e)+\phi(b)+\phi(d)+\lambda_4\Sigma_{i=1}^{N}\|s_i\|_2^2$, where N is a number of the plurality of observation vectors, $b_i$ is an $i^{th}$ element of a second auxiliary vector b, $L_m$ is the Laplacian matrix with the predefined number of eigenvectors, $\Sigma_m^r$ indicates an estimator of the diagonal matrix computed from the decomposed Laplacian matrix, $j\in NN(x_i)$ indicates an index to an observation vector of the plurality of observation vectors that is a nearest neighbor of $x_i$, $x_i$ is an $i^{th}$ observation vector of the plurality of observation vectors, $\Sigma_{j\in NN(x_i)}$ indicates a summation over each nearest neighbor of $x_i$, $s_{i,j}$ is an i, $j^{th}$ element of a similarity matrix S, $d_{i,j}$ is an i, $j^{th}$ element of an auxiliary matrix d, $\phi(e)$ indicates a first estimator of e, $\phi(b)$ indicates a first estimator of b, $\phi(d)$ indicates a first estimator of d, $s_i$ is an $i^{th}$ vector of the similarity matrix S, and T indicates a transpose.

17. The non-transitory computer-readable medium of claim 1, wherein before (A), the computer-readable instructions further cause each computing device to:
compute the Laplacian matrix using the kernel function with the plurality of observation vectors;
perform the decomposition of the computed Laplacian matrix; and
select a predefined number of eigenvectors from the decomposed Laplacian matrix to define the decomposition matrix, wherein the predefined number of eigenvectors have smallest eigenvalues relative to other eigenvectors not selected from the decomposed Laplacian matrix.

18. The non-transitory computer-readable medium of claim 17, wherein computing the Laplacian matrix comprises:
computing an affinity matrix using the kernel function and the plurality of observation vectors; and
computing a diagonal matrix by summing each row of the computed affinity matrix, wherein the sum of each row is stored in a diagonal of the row with zeroes in remaining positions of the row;
wherein the Laplacian matrix is computed using the affinity matrix and the diagonal matrix.

19. The non-transitory computer-readable medium of claim 18, wherein the Laplacian matrix is computed using $L=I-D^{-1/2}WD^{-1/2}$, where L is the Laplacian matrix, I is an N×N identity matrix, D is the computed diagonal matrix, and W is the computed affinity matrix.

20. The non-transitory computer-readable medium of claim 19, wherein the affinity matrix is computed using $$W_{ij} = \exp\frac{-\|x_i - x_j\|^2}{2s^2}$$

if i≠j and $W_{ii}=0$ for i=j, for i=1, ..., N and j=1, ..., N, where s is a predefined kernel parameter value, $x_i$ is an $i^{th}$ observation vector of the plurality of observation vectors, $x_j$ is a $j^{th}$ observation vector of the plurality of observation vectors, and N is a number of the plurality of observation vectors.

21. The non-transitory computer-readable medium of claim 1, wherein the classification matrix is defined using $F=V_m^r a$, where F is the classification matrix, $V_m^r$ is the estimator of the decomposition matrix computed in (C), and a is the computed plurality of coefficients.

22. The non-transitory computer-readable medium of claim 21, wherein $V_m^r$ is an N×m matrix, where N is a number of the plurality of observation vectors, and m is a predefined number of eigenvectors.

23. The non-transitory computer-readable medium of claim 22, wherein a is an m×c matrix, where c is a number of classes determined based on possible values of the target variable value.

24. The non-transitory computer-readable medium of claim 23, wherein c=1 when the target variable value is binary.

25. A system comprising:
a plurality of computing devices, wherein each computing device of the plurality of computing devices comprises a processor; and
a computer-readable medium operably coupled to the processor, the computer-readable medium having computer-readable instructions stored thereon that, when executed by a respective processor, cause a respective computing device to
(A) compute a plurality of coefficients using a decomposition of a Laplacian matrix, wherein the Laplacian matrix is computed using a kernel function with a plurality of observation vectors, wherein the plurality of observation vectors includes a plurality of unclassified observation vectors and a plurality of classified observation vectors, wherein a target variable value is defined to represent a label for each respective observation vector of the plurality of classified observation vectors, wherein the target variable value is not defined to represent the label for each respective observation vector of the plurality of unclassified observation vectors, wherein the plurality of unclassified observation vectors are distributed across each computing device of the plurality of computing devices and the plurality of classified observation vectors are stored on each computing device of the plurality of computing devices;

(B) randomly select a batch of observation vectors from the plurality of observation vectors, wherein a batch number of the plurality of observation vectors included in the selected batch is a predefined batch size parameter value;

(C) compute updated parameter values for a dimensionality reduction method using stochastic gradient descent with the computed plurality of coefficients, the Laplacian matrix, and the selected batch of observation vectors, wherein the updated parameter values include an estimator of a decomposition matrix determined from the decomposition of the Laplacian matrix;

(D) train a semi-supervised machine learning classification model by repeating (A) and (B) until a convergence parameter value indicates the updated parameter values for the dimensionality reduction method have converged;

(E) define a classification matrix using the plurality of coefficients and the estimator of the decomposition of the Laplacian matrix of the trained semi-supervised machine learning classification model;

(F) determine the target variable value for each observation vector of the plurality of unclassified observation vectors using the trained semi-supervised trained machine learning classification model; and (G) output, from the trained semi-supervised trained machine learning classification model, the target variable value for each observation vector of the plurality of unclassified observation vectors, wherein the target variable value selected for each observation vector of the plurality of unclassified observation vectors is defined to represent the label for a respective unclassified observation vector, wherein the label indicates a characteristic determined for each respective unclassified observation vector.

26. A method of classifying data using semi-supervised data, the method comprising:

(A) computing a plurality of coefficients using a decomposition of a Laplacian matrix, wherein the Laplacian matrix is computed using a kernel function with a plurality of observation vectors, wherein the plurality of observation vectors includes a plurality of unclassified observation vectors and a plurality of classified observation vectors, wherein a target variable value is defined to represent a label for each respective observation vector of the plurality of classified observation vectors, wherein the target variable value is not defined to represent the label for each respective observation vector of the plurality of unclassified observation vectors, wherein the plurality of unclassified observation vectors are distributed across each computing device of a plurality of computing devices and the plurality of classified observation vectors are stored on each computing device of the plurality of computing devices;

(B) randomly selecting a batch of observation vectors from the plurality of observation vectors, wherein a batch number of the plurality of observation vectors included in the selected batch is a predefined batch size parameter value;

(C) computing updated parameter values for a dimensionality reduction method using stochastic gradient descent with the computed plurality of coefficients, the Laplacian matrix, and the selected batch of observation vectors, wherein the updated parameter values include an estimator of a decomposition matrix determined from the decomposition of the Laplacian matrix;

(D) training a semi-supervised machine learning classification model by repeating (A) and (B) until a convergence parameter value indicates the updated parameter values for the dimensionality reduction method have converged;

E) defining a classification matrix using the plurality of coefficients and the estimator of the decomposition of the Laplacian matrix of the trained semi-supervised machine learning classification model;

(F) determining the target variable value for each observation vector of the plurality of unclassified observation vectors from the defined classification matrix using the trained semi-supervised trained machine learning classification model; and (G) outputting from the trained semi-supervised trained machine learning classification model, the target variable value for each observation vector of the plurality of unclassified observation vectors, wherein the target variable value selected for each observation vector of the plurality of unclassified observation vectors is defined to represent the label for a respective unclassified observation vector, wherein the label indicates a characteristic determined for each respective unclassified observation vector, wherein the method is performed on each computing device of the plurality of computing devices using the plurality of classified observation vectors stored on each respective computing device and the plurality of unclassified observation vectors distributed to each respective computing device.

27. The method of claim 26, wherein (A) comprises:

(H) computing a gradient value as a function of the decomposition matrix, the plurality of coefficients, and a label matrix defined from the plurality of observation vectors based on the target variable value;

(I) updating a value of each coefficient of the plurality of coefficients based on the computed gradient value; and repeating (H) to (I) until a second convergence parameter value indicates the plurality of coefficients have converged.

28. The method of claim 26, further comprising before (A):

computing the Laplacian matrix using the kernel function with the plurality of observation vectors;

performing the decomposition of the computed Laplacian matrix; and selecting a predefined number of eigenvectors from the decomposed Laplacian matrix to define the decomposition matrix, wherein the predefined number of eigenvectors have smallest eigenvalues relative to other eigenvectors not selected from the decomposed Laplacian matrix.

* * * * *

UNITED STATES PATENT AND TRADEMARK OFFICE
CERTIFICATE OF CORRECTION

PATENT NO. : 11,151,463 B2
APPLICATION NO. : 17/178798
DATED : October 19, 2021
INVENTOR(S) : Xu Chen et al.

Page 1 of 11

It is certified that error appears in the above-identified patent and that said Letters Patent is hereby corrected as shown below:

In the Specification

Column 14, Line 23:
Delete the phrase "nearest neighbors may be received." and replace with --nearest neighbors $N_{nn}$ may be received.--.

Column 14, Line 55:
Delete the phrase "$D_{ii} = \Sigma_{j=1}{}^N W_{ij}$" and replace with --$D_{ii} = \Sigma_{j=1}^{N} W_{ij}$--.

Column 15, Lines 2-3:
Delete the phrase "$L = V\Sigma V^\tau = (\Sigma^{0.5}V^\tau)^\tau \Sigma^{0.5}V^\tau = B^\tau B,$" and replace with --$L = V\Sigma V^\mathsf{T} = (\Sigma^{0.5}V^\mathsf{T})^\mathsf{T} \Sigma^{0.5}V^\mathsf{T} = B^\mathsf{T} B,$--.

Column 15, Line 6:
Delete the phrase "$A, B = \Sigma^{0.5}V^\tau$, and T indicates" and replace with --$A, B = \Sigma^{0.5}V^\mathrm{T}$, and T indicates--.

Column 15, Line 15:
Delete the phrase "$L_m = V_m \Sigma_m V_m{}^\tau$" and replace with -- $L_m = V_m \Sigma_m V_m^\mathsf{T}$ --.

Column 15, Line 21:
Delete the phrase "$F = V_{m,op}{}^r \alpha_{op}$, where $V_{m,op}{}^r$" and replace with --$F = V_{m,op}^r \alpha_{op}$, where $V_{m,op}^r$--.

Column 15, Lines 27-31:
Delete the phrase "$V_{m,op}{}^r$, a transformation matrix Z such that $L_m{}^r = V_{m,op}{}^r Z$, and a second similarity matrix S in addition to $L_m{}^r$ under the fitting constraints guided by observations included in input classified data 124, where $L_m{}^r$" and replace with --$V_{m,op}^r$, a transformation matrix Z such that Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*

$L_m^r = V_{m,op}^r Z$, and a second similarity matrix $S$ in addition to $L_m^r$ under the fitting constraints guided by observations included in input classified data 124, where $L_m^r$ --.

Column 15, Line 45:

Delete the phrase "$(V_m^r)^\tau V_m^r = I$ and $\Sigma_{i=1}^N s_i^\tau = 1$," and replace with --$(V_m^r)^\mathsf{T} V_m^r = I$ and $\Sigma_{i=1}^N s_i^\mathsf{T} \mathbf{1} = 1$,--.

Column 15, Line 54:

Delete the phrase "$\|s_i\|_2^2$" and replace with --$\|s_i\|_2^2$--.

Column 15, Lines 60-61:
Delete the phrase "$k_{nn}$- nearest neighbors" and replace with --$N_{nn}$- nearest neighbors--.

Column 15, Line 63:

Delete the phrase "$\Sigma_{i=1}^N s_i^\tau = 1$," and replace with --$\Sigma_{i=1}^N s_i^\mathsf{T} \mathbf{1} = 1$--.

Column 16, Line 3:
Delete the phrase "$V_m^r \alpha_k$" and replace with --$V_m^r \alpha_k$--.

Column 16, Line 43:

Delete the phrase "$Q(f_k) = 0.5\|f_k - y_k\|_2^2 + \lambda_1 \|Bf_k\|_1 + \lambda_2 \|Bf_k\|_2^2, k = 1, \ldots, c$." and replace with --$Q(f_k) = 0.5\|f_k - y_k\|_2^2 + \lambda_1 \|Bf_k\|_1 + \lambda_2 \|Bf_k\|_2^2, k = 1, \ldots, c$.--.

Column 16, Line 46:
Delete the phrase "$B = \Sigma^{0.5} V^\tau$" and replace with --$B = \Sigma^{0.5} V^\mathsf{T}$--.

Column 16, Lines 48-50:
Delete the phrase
"$Q(\alpha_k) = 0.5\|V_m \alpha_k - y_k\|_2^2 + \lambda_1 \sum_{i=1}^m ((\Sigma_{ii}^r)^{0.5} |\alpha_{i,k}|) + \lambda_2 \sum_{i=1}^m ((\Sigma_{ii}^r)^{0.5} \alpha_{i,k})^2 = C_1(\alpha_k) + C_2(\alpha_k), k = 1, \ldots, c,$"

and replace with
--$Q(\alpha_k) = 0.5\|V_m \alpha_k - y_k\|_2^2 + \lambda_1 \|(\Sigma^{0.5} V^\mathsf{T}) V_m \alpha_k\|_1 + \lambda_2 \|(\Sigma^{0.5} V^\mathsf{T}) V_m \alpha_k\|_2^2, k = 1, \ldots, c,$--.

Column 16, Line 57-58:
Delete the phrase
"$Q(\alpha_k) = 0.5\|V_m \alpha_k - y_k\|_2^2 + \lambda_1 \sum_{i=1}^m ((\tau_{ii}^r)^{0.5} |\alpha_{i,k}|) + \lambda_2 \sum_{i=1}^m ((\Sigma_{ii}^r)^{0.5} \alpha_{i,k})^2 = C_1(\alpha_k) + C_2(\alpha_k), k = 1, \ldots, c,$"

and replace with
--$Q(\alpha_k) = 0.5\|V_m^r \alpha_k - y_k\|_2^2 + \lambda_1 \sum_{i=1}^m ((\Sigma_{ii}^r)^{0.5} |\alpha_{i,k}|) + \lambda_2 \sum_{i=1}^m ((\Sigma_{ii}^r)^{0.5} \alpha_{i,k})^2 = C_1(\alpha_k) + C_2(\alpha_k), k = 1, \ldots, c,$--.

CERTIFICATE OF CORRECTION (continued)
U.S. Pat. No. 11,151,463 B2

Column 16, Line 59:

Delete the phrase "$C_1(\alpha_k) = 0.5\|V_m{}^r \alpha_k - y_k\|_2{}^2 + \lambda_2 \sum_{i=1}^{m}((\Sigma_{ii}{}^r)^{0.5} \alpha_{i,k})^2$" and replace with -- $C_1(\alpha_k) = 0.5\|V_m^r \alpha_k - y_k\|_2^2 + \lambda_2 \sum_{i=1}^{m}((\Sigma_{ii}^r)^{0.5} \alpha_{i,k})^2$ --.

Column 16, Lines 60-61:

Delete the phrase "$C_2(\alpha) = \lambda_1 \sum_{i=1}^{m}((\Sigma_{ii}{}^r)^{0.5} |\alpha_{i,k}|)$" and replace with -- $C_2(\alpha) = \lambda_1 \sum_{i=1}^{m}((\Sigma_{ii}^r)^{0.5} |\alpha_{i,k}|)$ --.

Column 16, Line 62:

Delete the phrase "$0.5\|V_m{}^r \alpha_k - y_k\|_2^2$," and replace with -- $0.5\|V_m^r \alpha_k - y_k\|_2^2$, --.

Column 16, Line 65:

Delete the phrase "$\lambda_1 \sum_{i=1}^{m}((\Sigma_{ii}{}^r)^{0.5} |\alpha_{i,k}|)$," and replace with -- $\lambda_1 \sum_{i=1}^{m}((\Sigma_{ii}^r)^{0.5} |\alpha_{i,k}|)$, --.

Column 16, Line 67:

Delete the phrase "$\lambda_2 \sum_{i=1}^{m}((\Sigma_{ii}{}^r)^{0.5} \alpha_{i,k})^2$," and replace with -- $\lambda_2 \sum_{i=1}^{m}((\Sigma_{ii}^r)^{0.5} \alpha_{i,k})^2$, --.

Column 17, Line 9-11:

Delete the phrase "$\Sigma_m^r \in R^{m \times m}$. From $L_m{}^r = V_m{}^r Z = V_m{}^r \Sigma_m{}^r (V_m{}^r)^\tau$, $Z = \Sigma_m{}^r (V_m{}^r)^\tau$. To combine $Q(\alpha_k)$ with $P(S, V_m{}^r, Z), Z = \Sigma_m{}^r (V_m{}^r)^\tau$ in $P(S, V_m{}^r, Z)$," and replace with -- $\Sigma_m^r \in R^{m \times m}$. From $L_m^r = V_m^r Z = V_m^r \Sigma_m^r (V_m^r)^\mathsf{T}$, $Z = \Sigma_m^r (V_m^r)^\mathsf{T}$. To combine $Q(\alpha_k)$ with $P(S, V_m^r, Z), Z = \Sigma_m^r (V_m^r)^\mathsf{T}$ in $P(S, V_m^r, Z)$ --.

Column 17, Lines 20-25:

Delete the phrase "$\sum_{k=1}^{c} e_k \|V_m^r \alpha_k - y_k\|_2^2 + \sum_{i=1}^{N} b_i \|L_m - V_m^r \Sigma_m^r (V_m^r)^\tau\|_2^2 + \lambda_3 \sum_{i=1}^{N} \sum_{j \in NN(x_i)} s_{i,j} d_{i,j} \|V_m^r(\Sigma_m^r(V_m^r)^\tau)_i - V_m^r(\Sigma_m^r(V_m^r)^\tau)_j\|_2^2 +$," and replace with -- $\sum_{k=1}^{c} e_k \|V_m^r \alpha_k - y_k\|_2^2 + \sum_{i=1}^{N} b_i \|L_m - V_m^r \Sigma_m^r (V_m^r)^\mathsf{T}\|_2^2 + \lambda_3 \sum_{i=1}^{N} \sum_{j \in NN(x_i)} s_{i,j} d_{i,j} \|V_m^r(\Sigma_m^r(V_m^r)^\mathsf{T})_i - V_m^r(\Sigma_m^r(V_m^r)^\mathsf{T})_j\|_2^2 +$ --.

Column 17, Line 36:

Delete the phrase "$(V_m{}^r)^\tau V_m{}^r = I$ and $\sum_{i=1}^{N} s_i{}^\tau \mathbf{1} = 1$, where $(\Sigma_m{}^r(V_m{}^r)^\tau)_i$" and replace with -- $(V_m^r)^\mathsf{T} V_m^r = I$ and $\sum_{i=1}^{N} s_i^\mathsf{T} \mathbf{1} = 1$, where $(\Sigma_m^r(V_m^r)^\mathsf{T})_i$ --.

Column 17, Lines 48-49:

Delete the phrase "$V_m{}^r$ and eigenvalues $\Sigma_m{}^r$ using two-steps. First, $S, V_m{}^r, \Sigma_m{}^r, e, b, d$," and replace with -- $V_m^r$ and eigenvalues $\Sigma_m^r$ using two-steps. First, $S, V_m^r, \Sigma_m^r, e, b, d$ --.

CERTIFICATE OF CORRECTION (continued)

U.S. Pat. No. 11,151,463 B2

Column 17, Lines 65-66:
Delete the phrase "$C_1(\alpha_k) = e_k \|V_m{}^r \alpha_k - y_k\|_2{}^2 + \lambda_2 \sum_{i=1}^{m}((\Sigma_{ii}{}^r)^{0.5} \alpha_{i,k})^2$, and $C_2(\alpha) = \lambda_1 \sum_{i=1}^{m}((\Sigma_{ii}{}^r)^{0.5} |\alpha_{i,k}|)$"
and replace with
--$C_1(\alpha_k) = e_k \|V_m^r \alpha_k - y_k\|_2^2 + \lambda_2 \sum_{i=1}^{m}((\Sigma_{ii}^r)^{0.5} \alpha_{i,k})^2$, and $C_2(\alpha) = \lambda_1 \sum_{i=1}^{m}((\Sigma_{ii}^r)^{0.5} |\alpha_{i,k}|)$--.

Column 18, Line 1:
Delete the phrase "$\alpha_k, S, V_m{}^r, \Sigma_m{}^r, e, b, d$" and replace with --$\alpha_k, S, V_m^r, \Sigma_m^r, e, b, d$--.

Column 18, Lines 10-15:
Delete the phrase "$\sum_{k=1}^{c} e_k \|V_m^r \alpha_k - y_k\|_2^2 + \sum_{i=1}^{N} b_i \|L_m - V_m^r \Sigma_m^r (V_m^r)^\tau\|_2^2 + \lambda_3 \sum_{i=1}^{N} \sum_{j \in NN(x_i)} s_{i,j} d_{i,j} \|V_m^r (\Sigma_m^r (V_m^r)^\tau)_i - V_m^r (\Sigma_m^r (V_m^r)^\tau)_j\|_2^2$" and replace with --$\sum_{k-1}^{c} e_k \|V_m^r \alpha_k - y_k\|_2^2 + \sum_{i-1}^{N} b_i \|L_m - V_m^r \Sigma_m^r (V_m^r)^\mathsf{T}\|_2^2 + \lambda_3 \sum_{i=1}^{N} \sum_{j \in NN(x_i)} s_{i,j} d_{i,j} \|V_m^r (\Sigma_m^r (V_m^r)^\mathsf{T})_i - V_m^r (\Sigma_m^r (V_m^r)^\mathsf{T})_j\|_2^2$--.

Column 18, Line 21:
Delete the phrase "$(V_m{}^r)^\tau V_m{}^r = I$ and $\sum_{i=1}^{N} 1 = 1$." and replace with --$(V_m^r)^\mathsf{T} V_m^r = I$ and $\sum_{i=1}^{N} s_i^\mathsf{T} \mathbf{1} = 1$.--.

Column 18, Lines 26-27:
Delete the phrase "$V_m{}^r \alpha_k - y_k, L_m - V_m{}^r \Sigma_m{}^r (V_m{}^r)^\tau$, and $V_m{}^r (\Sigma_m{}^r (V_m{}^r)^\tau)_i - V_m{}^r (\Sigma_m{}^r (V_m{}^r)^\tau)_j$," and replace with --$V_m^r \alpha_k - y_k, L_m - V_m^r \Sigma_m^r (V_m^r)^\mathsf{T}$, and $V_m^r (\Sigma_m^r (V_m^r)^\mathsf{T})_i - V_m^r (\Sigma_m^r (V_m^r)^\mathsf{T})_j$,--.

Column 18, Line 34:
Delete the phrase "$S, V_m{}^r$, and $\Sigma_m{}^r$" and replace with --$S, V_m^r$, and $\Sigma_m^r$--.

Column 18, Line 55:
Delete the phrase "$\nabla_{a_{p,k}} \left( C_1(\alpha_{p,k}) \right) = C_{3,i} + 2\lambda_2 (\Sigma_{pp}{}^r)^{0.5} \sum_{i=1}^{m}((\Sigma_{ii}{}^r)^{0.5} \alpha_{i,k})$," and replace with --$\nabla_{a_{p,k}} \left( C_1(\alpha_{p,k}) \right) = C_{3,i} + 2\lambda_2 (\Sigma_{pp}^r)^{0.5} \sum_{i=1}^{m}((\Sigma_{ii}^r)^{0.5} \alpha_{i,k})$,--.

Column 18, Lines 57-58:
Delete the phrase "$C_3 = 2e_k(V_m{}^r)^\tau (V_m{}^r \alpha_k - y_k)$ where $C_3$ is an $m$x1 vector, $C_{3,i}$ is an $i^{th}$ element of $C_3$, and T indicates a transpose." and replace with --$C_3 = 2e_k(V_m^r)^\mathsf{T}(V_m^r \alpha_k - y_k)$ where $C_3$ is an $m$x1 vector, $C_{3,i}$ is an $i^{th}$ element of $C_3$, and T indicates a transpose.--.

Column 18, Line 67:
Delete the phrase "$\|V_m{}^r\|_s$ is a spectral norm of the matrix $V_m{}^r$." and replace with --$\|V_m^r\|_s$ is a spectral norm of the matrix $V_m^r$--.

Column 19, Lines 23-24:
Delete the phrase "$cv_\alpha = cv_\alpha + \alpha_{p,k} - \alpha_{p,k}{}'$", where $\alpha_{p,k}{}'$" and replace with --$cv_\alpha = cv_\alpha + \alpha_{p,k} - \alpha'_{p,k}$, where $\alpha'_{p,k}$--.

Column 19, Line 49:
Delete the phrase "If $cv_\alpha < c_{th,\alpha}$" and replace with --If $cv_\alpha \leq c_{th,\alpha}$--.

Column 20, Line 40:
Delete the phrase "$V_m{}^r$" and replace with --$V_m^r$--.

Column 20, Lines 44-50:
Delete the phrase
"$V_m{}^r$ is computed using $V_m{}^r = V_m{}^r + \eta g(V_m{}^r)$, where $g(V_m{}^r)$ indicates a value of a gradient of $V_m{}^r$. For example, $g(V_m{}^r) = \sum_{k=1}^c 2e_k\alpha_k(V_m{}^r\alpha_k - y_k) + 2\sum_{i=1}^{N_b} b_i(\Sigma_m{}^r(V_m{}^r)^\tau(L_m - V_m{}^r\Sigma_m{}^r(V_m{}^r)^\tau) + 2\lambda_3 \sum_{i=1}^{N_b} \sum_{j \in NN(x_i)} s_{i,j} d_{i,j}(\Sigma_m{}^r((V_m{}^r)^\tau)_i - \Sigma_m{}^r((V_m{}^r)^\tau)_j)(V_m{}^r\Sigma_m{}^r((V_m{}^r)^\tau)_i - V_m{}^r\Sigma_m{}^r((V_m{}^r)^\tau)_j)$," and replace with
--$V_m^r$ is computed using $V_m^r = V_m^r + \eta g(V_m^r)$, where $g(V_m^r)$ indicated a value of a gradient of $V_m^r$. For example, $g(V_m^r) = \sum_{k=1}^c 2e_k\alpha_k(V_m^r\alpha_k - y_k) + 2\sum_{i=1}^{N_b} b_i(\Sigma_m^r(V_m^r)^\top(L_m - V_m^r\Sigma_m^r(V_m^r)^\top) + 2\lambda_3 \sum_{i=1}^{N_b} \sum_{j \in NN(x_i)} s_{i,j} d_{i,j}(\Sigma_m^r((V_m^r)^\top)_i - \Sigma_m^r((V_m^r)^\top)_j)(V_m^r\Sigma_m^r((V_m^r)^\top)_i - V_m^r\Sigma_m^r((V_m^r)^\top)_j)$,--.

Column 20, Line 55:
Delete the phrase "$E_m{}^r$" and replace with --$\Sigma_m^r$--.

Column 20, Lines 59-64:
Delete the phrase
"$E_m{}^r$ is computed using $\Sigma_m{}^r = \Sigma_m{}^r + \eta g(\Sigma_m{}^r)$, where $g(\Sigma_m{}^r)$ indicates a value of a gradient of $\Sigma_m{}^r$. For example $g(\Sigma_m{}^r) = -2\sum_{i=1}^{N_b} b_i(V_m{}^r(V_m{}^r)^\tau(L_m - V_m{}^r\Sigma_m{}^r(V_m{}^r)^\tau) + 2\lambda_3 \sum_{i=1}^{N_b} \sum_{j \in NN(x_i)} s_{i,j} d_{i,j}(V_m{}^r((V_m{}^r)^\tau)_i - V_m{}^r((V_m{}^r)^\tau)_j)(V_m{}^r\Sigma_m{}^r((V_m{}^r)^\tau)_i - V_m{}^r\Sigma_m{}^r((V_m{}^r)^\tau)_j)$," and replace with
--$\Sigma_m^r$ is computed using $\Sigma_m^r = \Sigma_m^r + \eta g(\Sigma_m^r)$, where $g(\Sigma_m^r)$ indicates a value of gradient of $\Sigma_m^r$. For example, $g(\Sigma_m^r) = -2\sum_{i=1}^{N_b} b_i(V_m^r(V_m^r)^\top(L_m - V_m^r\Sigma_m^r(V_m^r)^\top) + 2\lambda_3 \sum_{i=1}^{N_b} \sum_{j \in NN(x_i)} s_{i,j} d_{i,j}(V_m^r((V_m^r)^\top)_i - V_m^r((V_m^r)^\top)_j)(V_m^r\Sigma_m^r((V_m^r)^\top)_i - V_m^r\Sigma_m^r((V_m^r)^\top)_j)$,--.

Column 21, Line 10:

CERTIFICATE OF CORRECTION (continued)
U.S. Pat. No. 11,151,463 B2

Delete the phrase "$s_{i,j} = -\frac{\lambda_3 d_{i,j}}{2\lambda_4 \|V_m^r \Sigma_m^r ((V_m^r)^\intercal)_i - V_m^r \Sigma_m^r ((V_m^r)^\intercal)_j\|_2^2}$," and replace with
--$s_{i,j} = -\frac{\lambda_3 d_{i,j}}{2\lambda_4 \|V_m^r \Sigma_m^r ((V_m^r)^\intercal)_i - V_m^r \Sigma_m^r ((V_m^r)^\intercal)_j\|_2^2}$,--.

Column 21, Lines 17-19:
Delete the phrase
"$v = \phi(e) - \phi(e)' + \phi(b) - \phi(b)' + \phi(d) - \phi(d)' + V_m^r - V_m^{r\prime} + \Sigma_m^r - \Sigma_m^{r\prime} + S - S'$, where $\phi(e)', \phi(b)', \phi(d)', V'^r_m, \Sigma'^r_m, S'$ are values of $\phi(e), \phi(b), \phi(d), V_m^r, \Sigma_m^r S$," and replace with
--$v = \phi(e) - \phi(e)' + \phi(b) - \phi(b)' + \phi(d) - \phi(d)' + V_m^r - V_m^{r\prime} + \Sigma_m^r - \Sigma_m^{r\prime} + S - S'$, where $\phi(e)', \phi(b)', \phi(d)', V_m^{\prime r}, \Sigma_m^{\prime r}, S'$ are values of $\phi(e), \phi(b), \phi(d), V_m^r, \Sigma_m^r, S$--.

Column 21, Line 33:
Delete the phrase "$F = V_m^r \alpha_k, k = 1, \ldots, c$." and replace with --$F = V_m^r \alpha_k, k = 1, \ldots, c$.--.

Column 23, Lines 24-25:
Delete the phrase "indicated by N." and replace with --indicated by $N_s$.--.

Column 23, Line 32:
Delete the phrase "$N_s$ th" and replace with --$N_s^{th}$--.

Column 23, Line 38:
Delete the phrase "$N_s$ th" and replace with --$N_s^{th}$--.

Column 23, Line 61:
Delete the phrase "$N_s$ th" and replace with --$N_s^{th}$--.

Column 24, Line 15:
Delete the phrase "$N_s$ th" and replace with --$N_s^{th}$--.

Column 24, Line 39:
Delete the phrase "$N_s$ th" and replace with --$N_s^{th}$--.

Column 29, Line 12:
Delete the phrase "the first regularization parameter value $\lambda_4$," and replace with --the first regularization parameter value $\lambda_1$,--.

Column 34, Line 10:
Delete the phrase "centers n, is" and replace with --centers $n_c$ is--.

Column 34, Line 16:

Delete the phrase "includes n, number" and replace with --includes $n_c$ number--.

Column 36, Lines 4-7:
Delete the phrase "$\min_{y \in \mathcal{T}_\rho} f(y) \geq f(\rho) - \beta \Delta_\rho^2, \ f(\rho) - \beta \Delta_\rho^2$ processing" and replace with --$\min_{y \in \mathcal{T}_\rho} f(y) \geq f(\rho) - \beta \Delta_\rho^2,$ processing--.

Column 36, Lines 14-15:
Delete the phrase "configuration p was unsuccessful, and $\Delta_p = \Delta_p/2$ such that the step size for hyperparameter configuration p is" and replace with --configuration $\rho$ was unsuccessful, and $\Delta_\rho = \Delta_\rho/2$ such that the step size for hyperparameter configuration $\rho$ is--.

Column 36, Line 24:
Delete the phrase "whether $|\mathcal{R} \leq n_b,$" and replace with --whether $|\mathcal{R}| \leq n_b$,--.

Column 36, Line 34:
Delete the phrase "$\{s^o, m^o, \lambda_1^o, \lambda_2^o, \lambda_3^o, \lambda_4^o\}$" and replace with --$\{s^o, m^o, \lambda_1^o, \lambda_2^o, \lambda_3^o, \lambda_4^o\}$--.

Column 36, Lines 39-40:
Delete the phrase "$\{s^o, m^o, \lambda_1^o, \lambda_2^o, \lambda_3^o, \lambda_4^o\}$" and replace with --$\{s^o, m^o, \lambda_1^o, \lambda_2^o, \lambda_3^o, \lambda_4^o\}$--.

Column 36, Line 49:
Delete the phrase "$\{s^o, m^o, \lambda_1^o, \lambda_2^o, \lambda_3^o, \lambda_4^o\}$" and replace with --$\{s^o, m^o, \lambda_1^o, \lambda_2^o, \lambda_3^o, \lambda_4^o\}$--.

Column 36, Lines 55-56:
Delete the phrase "$\{s^o, m^o, \lambda_1^o, \lambda_2^o, \lambda_3^o, \lambda_4^o\}$" and replace with --$\{s^o, m^o, \lambda_1^o, \lambda_2^o, \lambda_3^o, \lambda_4^o\}$--.

Column 37, Line 28:
Delete the phrase "$C = \sum_{i=1}^{M} C_{sw,i}$" and replace with --$C = \sum_{i=1}^{M} C_{sw,i}$--.

Column 38, Line 9:
Delete the phrase "diagonal matrix E and" and replace with --diagonal matrix $\Sigma$ and--.

Column 38, Line 10:
Delete the phrase "$L_m = V_m \Sigma_m V_m^\intercal$" and replace with --$L_m = V_m \Sigma_m V_m^\intercal$--.

Column 38, Line 16:
Delete the phrase "$S, V_m^r,$ and $\Sigma_m^r$" and replace with --$S, V_m^r,$ and $\Sigma_m^r$--.

Column 39, Line 12:
Delete the phrase "$V_m^r$" and replace with --$V_m^r$--.
Column 39, Line 15:

Delete the phrase "$\Sigma_m{}^r$" and replace with --$\Sigma_m^r$--.

Column 39, Lines 31-39:
Delete the phrase
"$C_{sw} = J_1(\alpha) + J_2(S, V_m{}^r, \Sigma_m{}^r, e, b, d)$, where $J_1(\alpha) = \sum_{k=1}^{c}[e_k\|V_m{}^r\alpha_k - y_k\|_2^2 + \lambda_1 \sum_{i=1}^{m}((\Sigma_{ii}^r)^{0.5}|\alpha_{i,k}|) + \lambda_2 \sum_{i=1}^{m}((\Sigma_{ii}^r)_{.05}\alpha_{i,k})^2]$, and
$J_2(S, V_m{}^r, \Sigma_m{}^r, e, b, d) = \sum_{k=1}^{c} e_k\|V_m{}^r\alpha_k - y_k\|_2^2 + \sum_{i=1}^{N} b_i\|L_m - V_m{}^r\Sigma_m{}^r(V_m{}^r)^\tau\|_2^2 + \lambda_3 \sum_{i=1}^{N}\sum_{j\in NN(x_i)} s_{i,j}\, d_{i,j}\|V_m{}^r(\Sigma_m{}^r(V_m{}^r)^\tau)_i - V_m{}^r(\Sigma_m{}^r(V_m{}^r)^\tau)_j\|_2^2 + \phi(e) + \phi(b) + \phi(d) + \lambda_4 \sum_{i=1}^{N}\|s_i\|_2^2$." and replace with
--$C_{sw} = J_1(\alpha) + J_2(S, V_m^r, \Sigma_m^r, e, b, d)$, where $J_1(\alpha) = \sum_{k=1}^{c}[e_k\|V_m^r\alpha_k - y_k\|_2^2 + \lambda_1 \sum_{i=1}^{m}((\Sigma_{ii}^r)^{0.5}|\alpha_{i,k}|) + \lambda_2 \sum_{i=1}^{m}((\Sigma_{ii}^r)^{0.5}\alpha_{i,k})^2]$, and
$J_2(S, V_m^r, \Sigma_m^r, e, b, d) = \sum_{k=1}^{c} e_k\|V_m^r\alpha_k - y_k\|_2^2 + \sum_{i=1}^{N} b_i\|L_m - V_m^r\Sigma_m^r(V_m^r)^\mathsf{T}\|_2^2 + \lambda_3 \sum_{i=1}^{N}\sum_{j\in NN(x_i)} s_{i,j}\, d_{i,j}\|V_m^r(\Sigma_m^r(V_m^r)^\mathsf{T})_i - V_m^r(\Sigma_m^r(V_m^r)^\mathsf{T})_j\|_2^2 + \phi(e) + \phi(b) + \phi(d) + \lambda_4 \sum_{i=1}^{N}\|s_i\|_2^2$--.

Column 39, Line 41:
Delete the phrase "$F = V_m{}^r\alpha_k$." and replace with --$F = V_m^r\alpha_k$--.

In the Claims

Claim 1, Column 47, Lines 1-2:
Delete the phrase "the trained semi-supervised trained machine learning classification model;" and replace with --the trained semi-supervised machine learning classification model;--.

Claim 1, Column 47, Lines 3-4:
Delete the phrase "the trained semi-supervised trained machine learning classification model," and replace with --the trained semi-supervised machine learning classification model,--.

Claim 5, Column 47, Lines 34-35:
Delete the phrase "$L_2 = 2\lambda_2(\Sigma_{pp}{}^r)^{0.5} \sum_{i=1}^{m}((\Sigma_{ii}{}^r)^{0.5}\alpha_{i,k})$," and replace with --$L_2 = 2\lambda_2(\Sigma_{pp}^r)^{0.5} \sum_{i=1}^{m}((\Sigma_{ii}^r)^{0.5}\alpha_{i,k})$,--.

Claim 5, Column 47, Lines 38-39:
Delete the phrase "$\Sigma_{i=1}{}^m$ indicates a summation from 1 to $m$, and $\Sigma_{ii}{}^r$ indicates" and replace with --$\Sigma_{i=1}^m$ indicates a summation from 1 to $m$, and $\Sigma_{ii}^r$ indicates--.

Claim 6, Column 47, Line 46:
Delete the phrase "$C_3 = 2e_k(V_m{}^r)^\tau(V_m{}^r\alpha_k - y_k)$" and replace with --$C_3 = 2e_k(V_m^r)^\mathsf{T}(V_m^r\alpha_k - y_k)$--.

Claim 6, Column 47, Line 51:

Delete the phrase "τ indicates a transpose." and replace with --T indicates a transpose.--.

Claim 8, Column 47, Lines 65-67:
Delete the phrase
"$C = \sum_{k=1}^{c=} [e_k \|V_m{}^r \ \alpha_k - y_k\|_2{}^2 + \lambda_1 \sum_{i=1}^{m}((\Sigma_{ii}{}^r)^{0.5} |\alpha_{i,k}|) + \lambda_2 \sum_{i=1}^{m}((\Sigma_{ii}{}^r)^{0.5} \alpha_{i,k})^2]$,"
and replace with
--$C = \sum_{k=1}^{c}[e_k\|V_m^r \alpha_k - y_k\|_2^2 + \lambda_1 \sum_{i=1}^{m}((\Sigma_{ii}^r)^{0.5}|\alpha_{i,k}|) + \lambda_2 \sum_{i=1}^{m}((\Sigma_{ii}^r)^{0.5}\alpha_{i,k})^2]$,--.

Claim 8, Column 48, Line 2:
Delete the phrase "$V_m{}^r$" and replace with --$V_m^r$--.

Claim 8, Column 48, Line 6:
Delete the phrase "$\Sigma_{ii}{}^r$" and replace with --$\Sigma_{ii}^r$--.

Claim 10, Column 48, Lines 29-30:
Delete the phrase "$C_{sw} = J_1(\alpha) + J_2(S, V_m{}^r, \Sigma_m{}^r, e, b, d)$," and replace with
--$C_{sw} = J_1(\alpha) + J_2(S, V_m^r, \Sigma_m^r, e, b, d)$,--.

Claim 10, Column 48, Line 32:
Delete the phrase "$J_2(S, V_m{}^r, \Sigma_m{}^r, e, b, d)$" and replace with -- $J_2(S, V_m^r, \Sigma_m^r, e, b, d)$ --.

Claim 10, Column 48, Line 35:
Delete the phrase "$S, V_m{}^r, \Sigma_m{}^r, e, b, d$" and replace with --$S, V_m^r, \Sigma_m^r, e, b, d$--.

Claim 14, Column 49, Lines 19-20:
Delete the phrase "$C_{sw} = J_1(\alpha) + J_2(S, V_m{}^r, \Sigma_m{}^r, e, b, d)$," and replace with
--$C_{sw} = J_1(\alpha) + J_2(S, V_m^r, \Sigma_m^r, e, b, d)$,--.

Claim 14, Column 49, Line 22:
Delete the phrase "$J_2(S, V_m{}^r, \Sigma_m{}^r, e, b, d)$" and replace with -- $J_2(S, V_m^r, \Sigma_m^r, e, b, d)$ --.

Claim 14, Column 49, Line 24:
Delete the phrase "$S, V_m{}^r, \Sigma_m{}^r, e, b, d$" and replace with --$S, V_m^r, \Sigma_m^r, e, b, d$--.

Claim 15, Column 49, Lines 28-29:
Delete the phrase
"$J_1(\alpha) = \sum_{k=1}^{c}[e_k\|V_m{}^r \alpha_k - y_k\|_2{}^2 + \lambda_1 \sum_{i=1}^{m}(\Sigma_{ii}{}^r)^{0.5}|\alpha_{i,k}|) + \lambda_2 \sum_{i=1}^{m}((\Sigma_{ii}{}^r)^{0.5}\alpha_{i,k})^2]$,"
and replace with
-- $J_1(\alpha) = \sum_{k=1}^{c}[e_k\|V_m^r\alpha_k - y_k\|_2^2 + \lambda_1 \sum_{i=1}^{m}((\Sigma_{ii}^r)^{0.5}|\alpha_{i,k}|) + \lambda_2 \sum_{i=1}^{m}((\Sigma_{ii}^r)^{0.5}\alpha_{i,k})^2]$, --.

Claim 15, Column 49, Line 31:

Delete the phrase "$V_m{}^r$" and replace with --$V_m^r$--.

Claim 15, Column 49, Line 34:
Delete the phrase "$\Sigma_{ii}{}^r$" and replace with --$\Sigma_{ii}^r$--.

Claim 15, Column 49, Line 37:
Delete the phrase "$\| \|_2{}^2$" and replace with --$\| \|_2^2$--.

Claim 16, Column 49, Lines 41-43:
Delete the phrase

"$J_2(S, V_m{}^r, \Sigma_m{}^r, e, b, d) = \sum_{k=1}^c e_k \|V_m{}^r \alpha_k - y_k\|_2{}^2 + \sum_{i=1}^N b_i \|L_m - V_m{}^r \Sigma_m{}^r (V_m{}^r)^\tau\|_2{}^2 +$
$\lambda_3 \sum_{i=1}^N \sum_{j \in NN(x_i)} s_{i,j} d_{i,j} \|V_m{}^r(\Sigma_m{}^r(V_m{}^r)^\tau)_i - V_m{}^r(\Sigma_m{}^r(V_m{}^r)^\tau)_j\|_2^2 + \phi(e) + \phi(b) +$
$\phi(d) + \lambda_4 \sum_{i=1}^N \|s_i\|_2{}^2$,"

and replace with

--$J_2(S, V_m^r, \Sigma_m^r, e, b, d) = \sum_{k=1}^c e_k \|V_m^r \alpha_k - y_k\|_2^2 + \sum_{i=1}^N b_i \|L_m - V_m^r \Sigma_m^r (V_m^r)^\intercal\|_2^2 +$
$\lambda_3 \sum_{i=1}^N \sum_{j \in NN(x_i)} s_{i,j} d_{i,j} \|V_m^r(\Sigma_m^r(V_m^r)^\intercal)_i - V_m^r(\Sigma_m^r(V_m^r)^\intercal)_j\|_2^2 + \phi(e) + \phi(b) + \phi(d) +$
$\lambda_4 \sum_{i=1}^N \|s_i\|_2^2$,--.

Claim 16, Column 49, Line 46:
Delete the phrase "$\Sigma_m{}^r$" and replace with --$\Sigma_m^r$--.

Claim 21, Column 50, Line 36:
Delete the phrase "$F = V_m{}^r a$, where $F$ is the classification matrix, $V_m{}^r$ is the" and replace with --$F = V_m^r a$, where $F$ is the classification matrix, $V_m^r$ is the--.

Claim 22, Column 50, Line 40:
Delete the phrase "$V_m{}^r$" and replace with --$V_m^r$--.

Claim 25, Column 51, Lines 35-36:
Delete the phrase "the trained semi-supervised trained machine learning classification model;" and replace with --the trained semi-supervised machine learning classification model;--.

Claim 25, Column 51, Lines 37-38:
Delete the phrase "the trained semi-supervised trained machine learning classification model," and replace with --the trained semi-supervised machine learning classification model,--.

Claim 26, Column 52, Lines 21-23:
Delete the phrase "(F) determining the target variable value for each observation vector of the plurality of unclassified observation vectors from the defined classification matrix using" and replace with --(F) determining the target variable value for each observation vector of the plurality of unclassified observation vectors using--.

Claim 26, Column 52, Lines 24-25:

Delete the phrase "the trained semi-supervised trained machine learning classification model;" and replace with --the trained semi-supervised machine learning classification model;--.

Claim 26, Column 52, Lines 26-27:
Delete the phrase "the trained semi-supervised trained machine learning classification model," and replace with --the trained semi-supervised machine learning classification model,--.